(12) United States Patent
Kawamoto

(10) Patent No.: US 8,439,750 B2
(45) Date of Patent: May 14, 2013

(54) STORAGE MEDIUM STORING GAME PROGRAM, GAME APPARATUS AND GAME CONTROLLING METHOD

(75) Inventor: Kouichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 387 days.

(21) Appl. No.: 12/756,410

(22) Filed: Apr. 8, 2010

(65) Prior Publication Data

US 2011/0045904 A1   Feb. 24, 2011

(30) Foreign Application Priority Data

Aug. 20, 2009  (JP) ................. 2009-190883

(51) Int. Cl.
  *A63F 9/24*  (2006.01)
(52) U.S. Cl.
  USPC ........................................................ 463/30
(58) Field of Classification Search ...... 345/626; 463/30
  See application file for complete search history.

(56) References Cited

U.S. PATENT DOCUMENTS

| 6,392,613 | B1 * | 5/2002 | Goto ............................. 345/30 |
| 6,394,904 | B1 * | 5/2002 | Stalker ........................... 463/23 |
| 2002/0171746 | A1 * | 11/2002 | Stephany et al. ............ 348/239 |
| 2002/0173360 | A1 * | 11/2002 | Tanaka et al. ................ 463/44 |

FOREIGN PATENT DOCUMENTS

JP   07-213737   8/1995

OTHER PUBLICATIONS

"How Do I . . . ? A M.U.G.E.N. primer Tutorial Part 1". www.packetsniffers.org. Online. Retrieved from the Internet. Retrieved May 14, 2012. <URL: http://www.packetsniffers.org/projects/geeks_unleashed/tutorial/tutorial1.html>.*
"How Do I . . . ? A M.U.G.E.N. primer Tutorial Part 2". www.packetsniffers.org. Online. Retrieved from the Internet. Retrieved May 14, 2012. <URL: http://www.packetsniffers.org/projects/geeks_unleashed/tutorial/tutorial2.html>.*
"How Do I . . . ? A M.U.G.E.N. primer Tutorial Part 3". www.packetsniffers.org. Online. Retrieved from the Internet. Retrieved May 14, 2012. <URL: http://www.packetsniffers.org/projects/geeks_unleashed/tutorial/tutorial3.html>.*
"How Do I . . . ? A M.U.G.E.N. primer Tutorial Part 4". www.packetsniffers.org. Online. Retrieved from the Internet. Retrieved May 14, 2012. <URL: http://www.packetsniffers.org/projects/geeks_unleashed/tutorial/tutorial4.html>.*
"Geeks Unleashed Assault and Batteries". www.packetsniffers.org. Online. Retrieved from the Internet. Retrieved May 14, 2012. <URL: http://www.packetsniffers.org/projects/geeks_unleashed/#GIVEIT-TOME>.*
Roxas King. "Creating custom mugen characters for beginers". Mugen Paradise. Online. Retrieved from the Internet. Retrieved May 14, 2012. <URL: http://mugenpl.own0.com/t25-creating-custom-mugen-characters-for-beginers>.*

(Continued)

*Primary Examiner* — Dmitry Suhol
*Assistant Examiner* — Carl V Larsen
(74) *Attorney, Agent, or Firm* — Nixon & Vanderhye P.C.

(57) ABSTRACT

A game apparatus includes a camera, and with this camera, images in a plurality of poses decided in advance are imaged. From the imaged image in the plurality of poses, an image of a game character in each pose is created. In a battle game and a match-up game, the image in the pose corresponding to a motion according to an operation by a player is read, and by utilizing the read image in the pose, a character is displayed on a battle screen and a match-up screen.

19 Claims, 42 Drawing Sheets

OTHER PUBLICATIONS

StarXS. "Samus's Stage Creation Tutorial". Mugen Battle Network. Online. Retrieved from the Internet. Retrieved May 14, 2012. <URL: http://mugenbattle.blogspot.com/2007/10/samuss-stage-creation-tutorial.html>.*

Ricano9. "Mkp 4.3 game and links". YouTube.com. Online. Retrieved from the Internet. Retrieved May 14, 2012. <URL: http://www.youtube.com/watch?v=37sBCXKTHnQ>.*

"Overview" Elecbyte.com. Online. Retrieved from the Internet. Retrieved May 14, 2012. <URL: http://web.archive.org/web/20031008224842/http://mugen.elecbyte.com/docs/overview.html>.*

"M.U.G.E.N" Wikipedia.org. Online. Retrieved from the Internet. Retrieved May 14, 2012. <URL: http://web.archive.org/web/20071223194115/http://en.wikipedia.org/wiki/M.U.G.E.N>.*

* cited by examiner

FIG. 2
(A) TOP VIEW (FOLDED STATE)
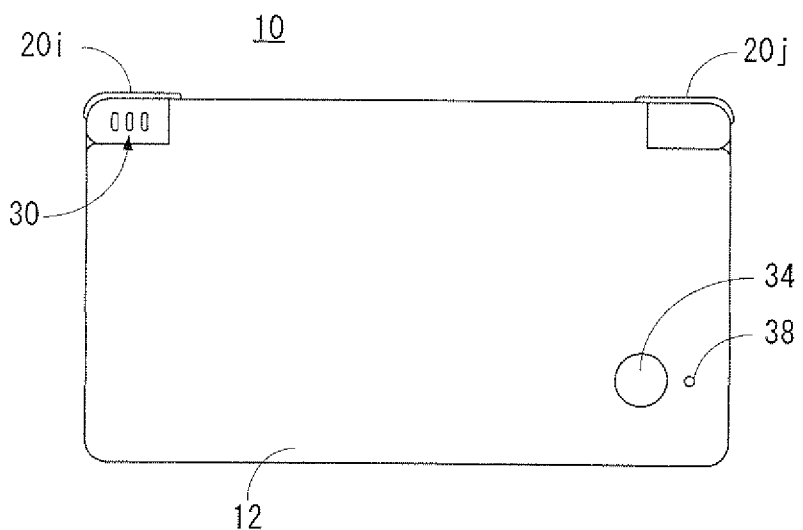
(B) LEFT SIDE VIEW (FOLDED STATE)
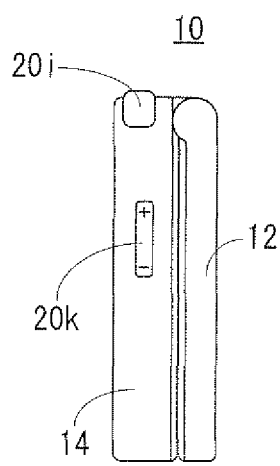

FIG. 5
(A) PUNCHING POSE IMAGING SCREEN 200
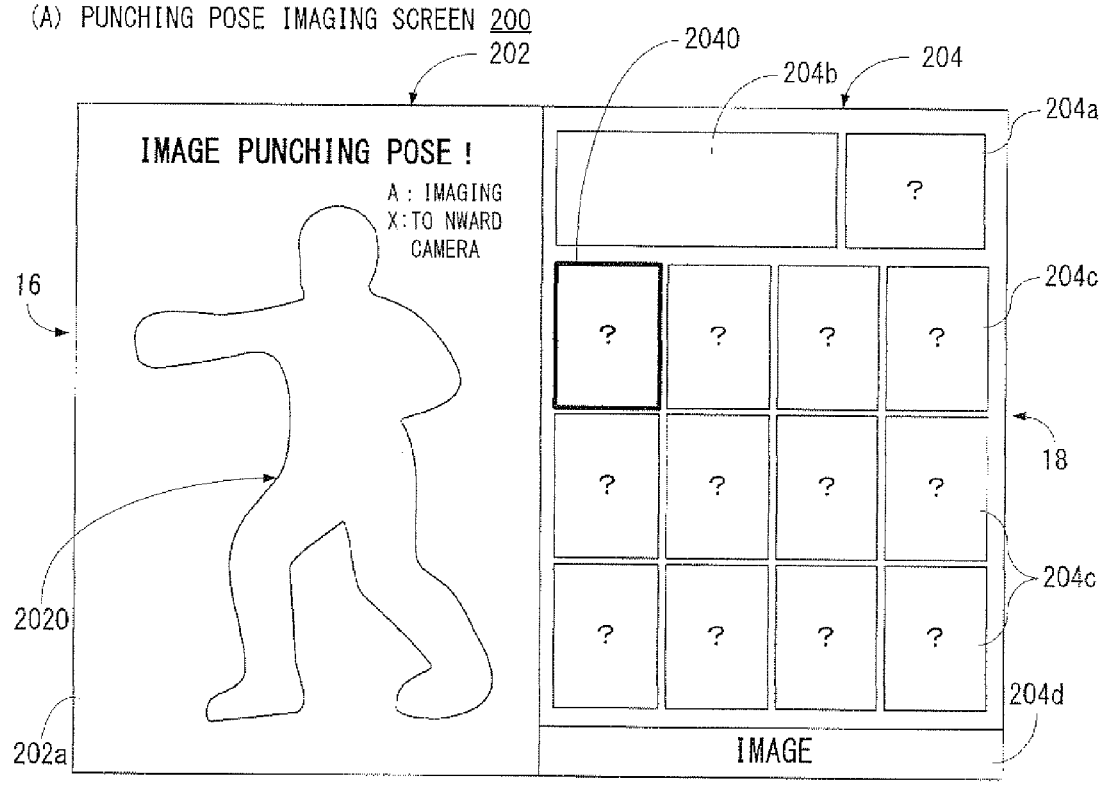
(B) PUNCHING MASK IMAGE (FOR IMAGING)
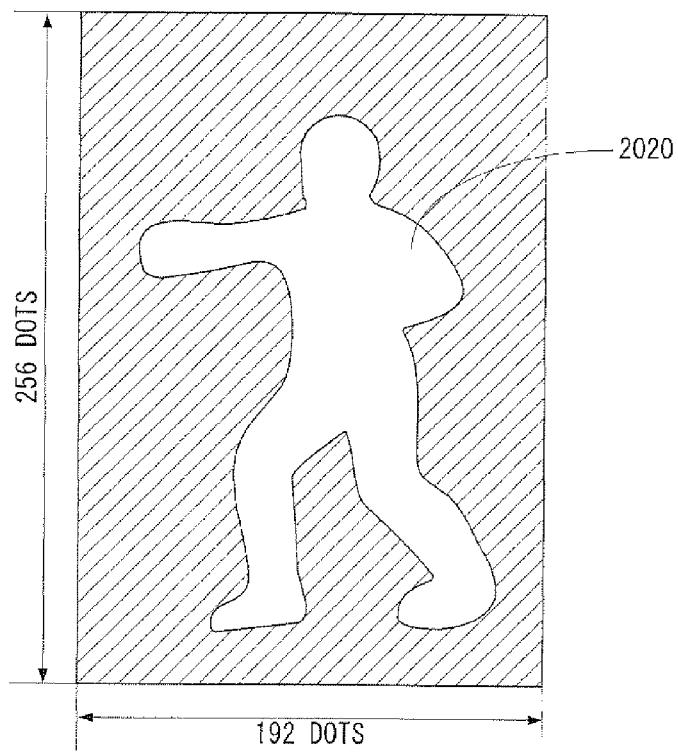

FIG. 6
(A) POSE IMAGE CONFIRMING SCREEN 220
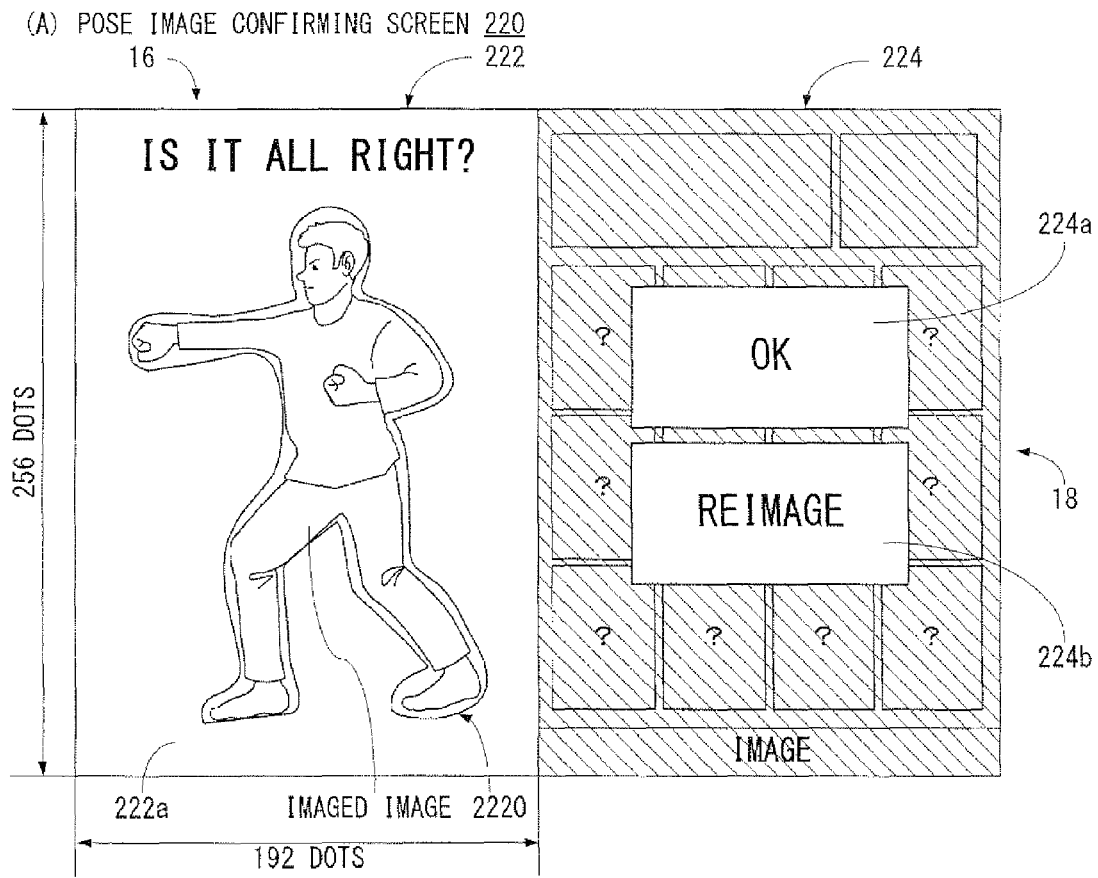
(B) PUNCHING MASK IMAGE (FOR CUT-OUT)
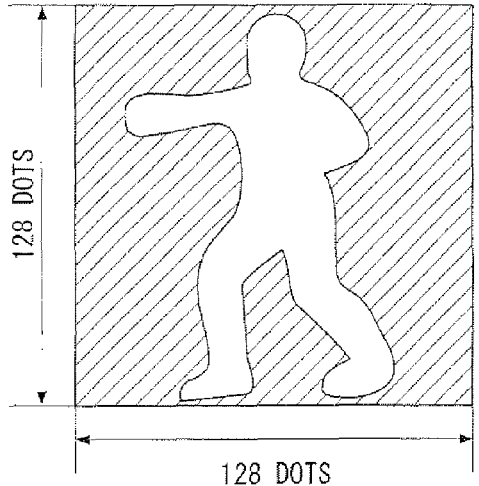
(C) PUNCHING POSE IMAGE
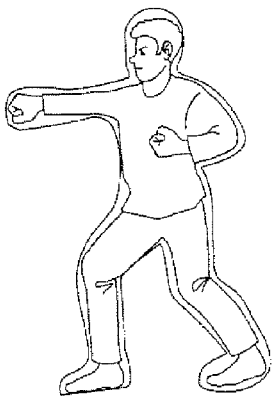

FIRST CHARACTER IMAGE DATA 920b

| INDEX NUMBER | IMAGE DATA |
|---|---|
| 1 | FIRST IMAGE DATA |
| 2 | SECOND IMAGE DATA |
| ⋮ | ⋮ |
| i | i-TH IMAGE DATA |

(B)

FIRST CHARACTER SOUND DATA 920c

| INDEX NUMBER | RECORDING DATA |
|---|---|
| 1 | FIRST RECORDING DATA |
| 2 | SECOND RECORDING DATA |
| ⋮ | ⋮ |
| j | j-TH RECORDING DATA |

(C)

MOTION DATA (PUNCHING MOTION) 92h

| THE NUMBER OF FRAMES | INDEX NUMBER OF IMAGE | INDEX NUMBER OF VOICE | INDEX NUMBER OF HIT JUDGING AREA |
|---|---|---|---|
| 1 | INDEX NUMBER OF FIGHTING STANCE POSE IMAGE | NULL | INDEX NUMBER OF HIT JUDGING AREA OF FIGHTING STANCE POSE |
| 8 | INDEX NUMBER OF PUNCHING POSE IMAGE | INDEX NUMBER OF VOICE IN PUNCHING | INDEX NUMBER OF HIT JUDGING AREA OF PUNCHING POSE |
| 16 | INDEX NUMBER OF FIGHTING STANCE POSE IMAGE | NULL | INDEX NUMBER OF HIT JUDGING AREA OF FIGHTING STANCE POSE |

FGI. 24
(A) PUNCHING POSE IMAGE
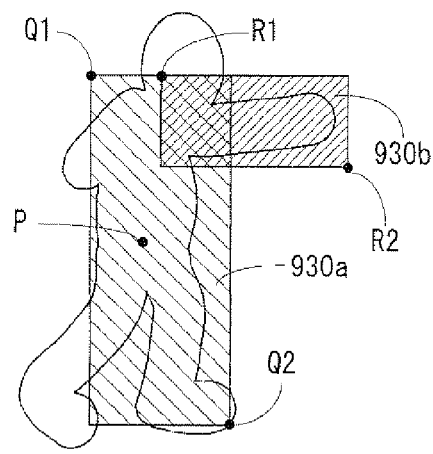
(B) FIGHTING STANCE POSE IMAGE
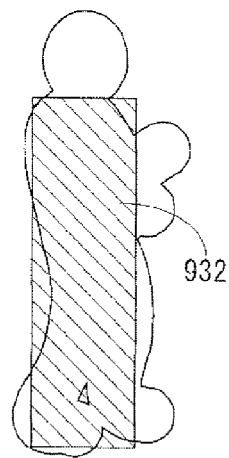
(C) KICKING POSE IMAGE
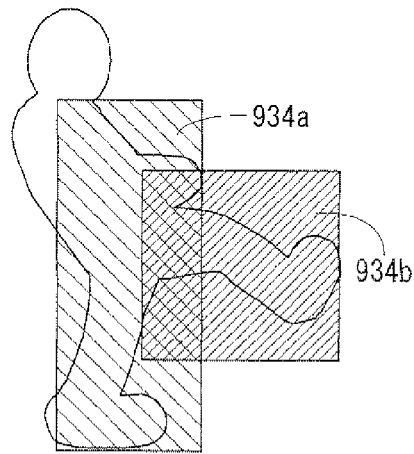
(D) WALKING POSE IMAGE
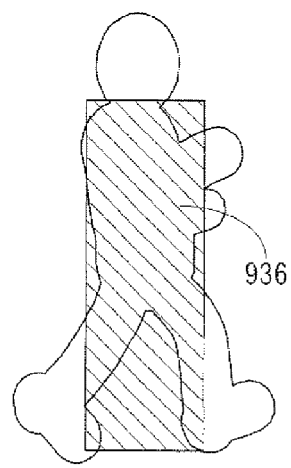

FIG. 25
(A) SPECIAL WEAPON POSE IMAGE
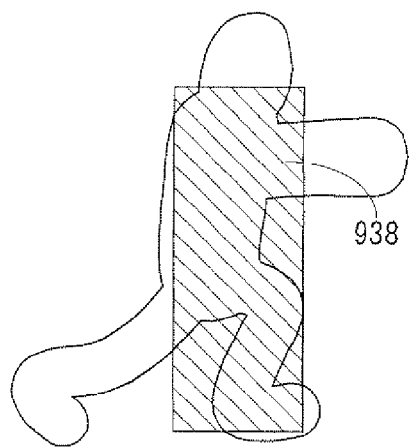
(B) SITTING POSE IMAGE
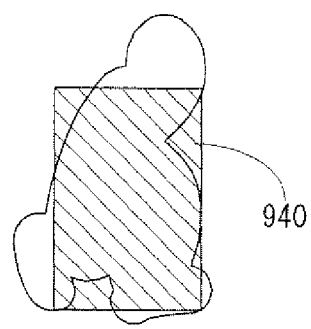
(C) JUMPING POSE IMAGE
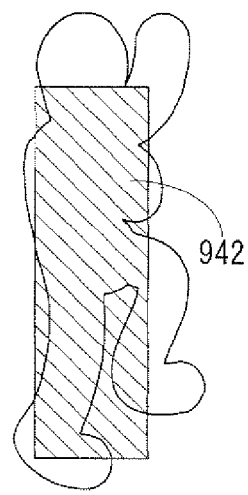

FIG. 42
(A) PUNCHING MASK IMAGE (FOR IMAGING)
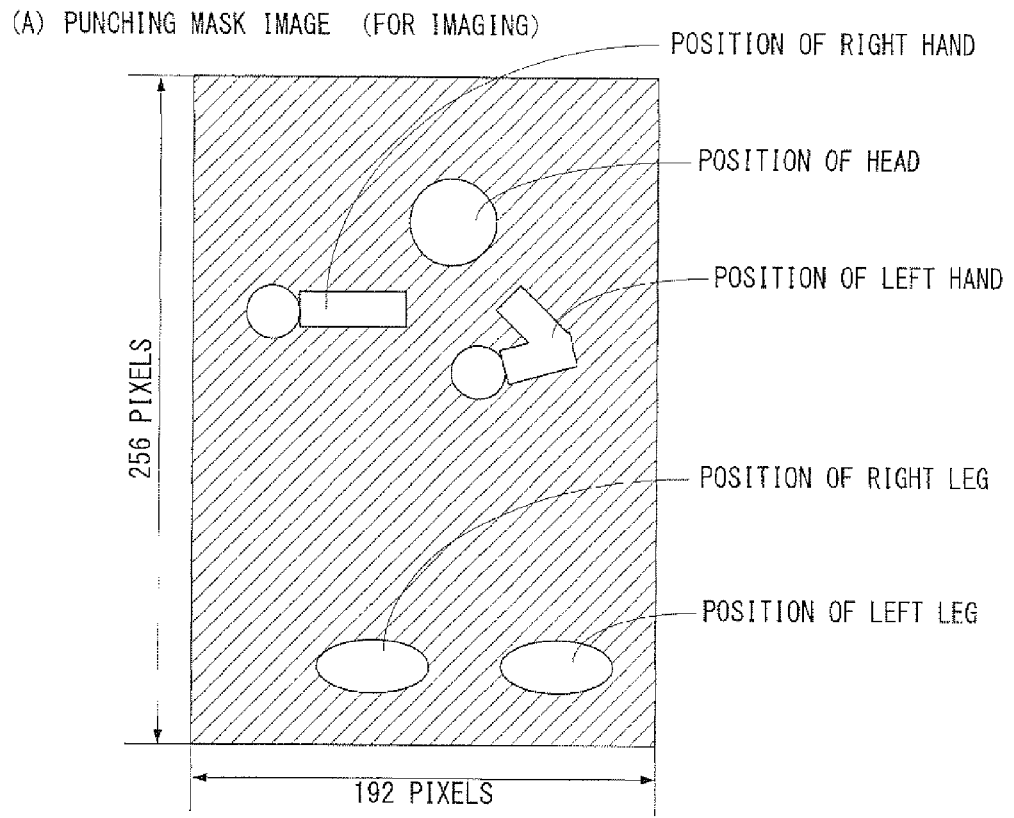
(B) PUNCHING GUIDE IMAGE (FOR IMAGING)
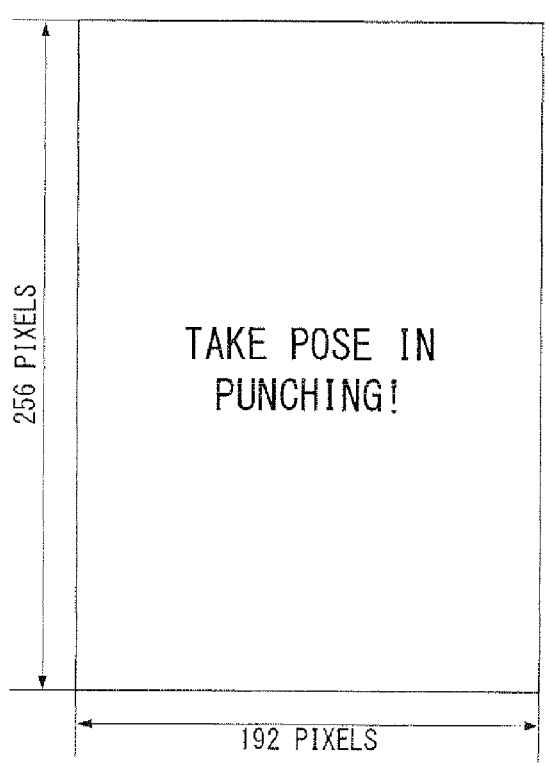

STORAGE MEDIUM STORING GAME PROGRAM, GAME APPARATUS AND GAME CONTROLLING METHOD

CROSS REFERENCE OF RELATED APPLICATION

The disclosure of Japanese Patent Application No. 2009-190883 is incorporated herein by reference.

BACKGROUND

1. Technical Field

The technology presented herein relates to a storage medium storing a game program, a game apparatus and a game controlling method. More specifically, the present technology relates to a storage medium storing a game program, a game apparatus and a game controlling method which perform game processing by utilizing an image obtained by imaging a subject.

2. Description of the Related Art

One example of a game apparatus of the related art is disclosed in Japanese Patent Laid-open No. 7-213737 [A63F 9/22, A63B 69/00, A63B 69/20, A63B 69/32] (Document 1) laid-open on Aug. 15, 1995. In the punching game machine of the Document 1, a face image of a player is imaged and stored in advance, and when a punching pad is beaten, the aforementioned image is displayed on a display so as to be changed in correspondence with the strength of the beating and the beaten part.

However, in the punching game machine disclosed in Document 1, the face image of the player which has been imaged in advance is transformed in progress of the game, and therefore, there are problems of less variation in displayed content and timing of the subject images imaged in advance, and lack of an interest of the game.

SUMMARY

Therefore, it is a primary feature of the example embodiments presented herein to provide a novel storage medium storing a game program, a novel game apparatus, and a novel game controlling method.

Furthermore, another feature of the present embodiments are to provide a storage medium storing a game program, a game apparatus and a game controlling method which are able to increase an interest of the game.

A first embodiment is a storage medium storing a game program causing a computer of a game apparatus to function as an imager, an image selector, and a selected image displayer. The imager is caused to image a subject corresponding to each of a plurality of postures. The image selector selects at least one image out of the plurality of subject images which the imager is caused to image on the basis of operation information according to an operation by a user. The selected image displayer displays the subject image selected by the image selector on a display.

According to the first embodiment, from the plurality of subject images which the imager is caused to image, the subject image selected according to an operation by the user is displayed, and therefore, it is possible to make greater variation in display contents and display timings of the subject images obtained through the imaging. Accordingly, it is possible to heighten the interest of the game.

In a second embodiment the game program causes a computer as a motion selector, and the motion selector selects one motion from a plurality of motions on the basis of the operation information according to the operation by the user. Accordingly, the image selector selects the image corresponding to the motion selected by the motion selector out of the plurality of subject images which the imager is caused to image.

According to the second embodiment, the image corresponding to the motion selected according to an operation by the user is selected out of the plurality of subject images which the imager is caused to image, so that similar to the first invention, it is possible to make greater variation in display contents and display timings of the subject images obtained through the imaging.

In a third embodiment the game program causes the computer to further function as a game processing executer, and the game processing executor executes predetermined game processing. The image selector selects at least one image out of the plurality of subject images which the imager is caused to image on the basis of the operation information according to the operation by the user during execution of the predetermined game.

According to the third embodiment, during execution of the predetermined game processing, one image is selected from the plurality of subject images according to the operation by the user, so that it is possible to display the image according to the operation by the user in correspondence with the operation timing by the user. That is, it is possible to make greater variation in display contents and display timings of the subject images obtained through the imaging.

A fourth embodiment causes the imager to image the plurality of postures for each person of the plurality of subjects. Accordingly, the image selector selects one person being the subject from persons being the plurality of subjects, and selects at least one image from the subject images in correspondence with the plurality of postures which the imager is caused to image as to the one selected person being the subject. That is, for each person of the subject, the images corresponding to the plurality of postures are imaged, and selecting and displaying the image are performed.

According to the fourth embodiment, the images in the plurality of postures are imaged, and selecting and displaying the image are performed for each person of the subject, thus, it is possible to make greater variation in display contents of the subject images obtained through the imaging.

In a fifth embodiment the game program causes the computer to further function as a notifier which notifies the user of an instruction corresponding to each of the plurality of postures when the imager is caused to image the subject.

According to the fifth embodiment, the instruction corresponding to each of the plurality of postures to be imaged is notified to the user, capable of easily imaging an image in a desired posture.

In a sixth embodiment the notifier displays a guide image corresponding to each of the plurality of postures on the display. For example, the posture is shown by illustrations and line drawing.

According to the sixth embodiment, the posture to be imaged is shown by the guide image, capable of making it easy to understand the posture which the imager is caused to image.

In a seventh embodiment the guide image includes a mask image which transmits a part corresponding to each of the plurality of postures. The game program causes the computer to further function as a through image displayer. The through image displayer displays a through image of the subject which the imager is caused to image at the back of the mask image on the display. Accordingly, the part is transmitted in correspondence with the posture out of the through image can be viewed through the mask image.

According to the seventh embodiment, the through image is displayed at the back of the mask image, and therefore, if imaging is made such that the posture of the subject in the through image is fit into the shape of the part which is transmitted through the mask image, it is possible to obtain an image of the subject in a desired posture. Thus, it is possible to easily image the subject image in the desired posture.

In an eighth embodiment the game program causes the computer to further function as an imaged image displayer. The imaged image displayer displays the subject image which the imager is caused to image on the display.

According to the eighth embodiment, the imaged subject image is displayed, so that it is easily confirm the imaged image. According to circumstances, it is possible to restart the imaging.

In a ninth embodiment the game program causes the computer to further function as a sound storage and a sound outputter. The sound storage stores a voice corresponding to each of the plurality of postures, and the sound outputter, when the image of the subject is displayed on the display by the selected image displayer, reads the voice corresponding to the posture indicated by the image from the sound storage and outputs the same.

According to the ninth embodiment, a voice corresponding to each posture as well as the image of the posture is stored, and when the subject image is displayed, the corresponding voice is output, capable of making an expression with realistic sensation.

In a tenth embodiment the game program causes the computer to further function as a voice inputter. The voice inputter inputs the voice corresponding to each of the plurality of postures by using a microphone. The sound storage stores the voice input by the voice inputter.

According to the tenth embodiment, a voice corresponding to each posture is input by using the microphone, so that it is possible to output the recorded voice when the image is displayed.

In an eleventh embodiment the game program causes the computer to further function as a background imager and an index displayer. The background imager images a background representing a background image (stage background) to be displayed on the display together with the image of said subject when the image of said subject is displayed on said display by said selected image displayer. The index displayer displays an index as to a reference position for displaying the image of the subject on the display, that is, a position corresponding to a ground or a floor of the battle game and the match-up game, for example, when the background is imaged by the background imager.

According to the eleventh embodiment, the imaged background image is displayed, so that it is possible to further heighten the interest of the game. In addition, when the background image is imaged, the index indicating the reference position to display the subject image is displayed, so that it is possible to image the background image in view of the position where the image is displayed.

In a twelfth embodiment the game apparatus comprises a hit judging area storage which stores a hit judging area set to each subject images in advance in correspondence with each of the plurality of postures. The game program causes the computer to further function as a hit judger. The hit judger executes hit judging processing by utilizing the hit judging area set to the posture corresponding to the one image selected by the image selector on the basis of the operation information according to the operation by at least the user. For example, when an instruction for attacking is input in the battle game and the match-up game, the hitting with the object to be attacked is judged by using the hit judging area set in the image corresponding to the attacking posture.

According to the twelfth embodiment, the hit judging area set in advance for each of the subject images is stored, and the hit judging processing is executed by utilizing the hit judging area set to the posture corresponding to the image selected according to an operation by the user, so that it is possible to accurately make the hitting judging for each image.

In a thirteenth embodiment the hit judging area includes a first judging area and a second judging area. The first judging area is used in a case that a hit judging is made on the basis of the operation information according to the operation by the user. The second judging area is used in a case that a hit judging is made on the basis of the operation information according to an operation by a different user or an operation by the computer. For example, in a case that the player character of the user makes an attack, whether or no the attack hits the enemy or a player character of another user is judged by utilizing the first judging area. Furthermore, in a case that the character to be operated by another user or the computer makes an attack, whether or not the attack hits the player character of the user is judged by utilizing the second judging area.

According to the thirteenth embodiment, the different judging areas are used between when the user performs an operation and when another user or the computer performs an operation, capable of accurately making a hit judging in individual cases.

In a fourteenth embodiment the hit judging area is changed in at least one of a position, a shape and a size depending on a display manner (displayed direction, for example) of the image. That is, depending on the display manner of the image, the hit judging area is variably set.

According to the fourteenth embodiment, at least one of the position, the shape and the size of the hit judging area is adequately changed according to the display manner of the image, so that it is possible to accurately make the hit judging in individual cases.

In a fifteenth embodiment the game program causes the computer to further function as a game processor and a changer. The game processor executes a one-player game or a two-player game according to a selection by the user. The changer changes a content of an instruction to be input by the inputter between the one-player game and the two-player game. For example, the function of the operation button is changed.

According to the fifteenth embodiment, the function of the operation button is changed between the one-player game and the two-player game, so that it is possible to play the game by one player or play the game by two players at the same time, by using one game apparatus.

In a sixteenth embodiment the image of the subject which the imager is caused to image is a portrait image. The game program causes the computer to further function as an image processor. The image processor performs image processing for displaying the portrait image on the landscape display.

According to the sixteenth embodiment, the image processing for displaying the portrait image on the landscape display is performed, making it easy to image the portrait subject such as a person.

In a seventeenth embodiment the game program causes the computer to further function as a through image displayer. The through image displayer displays the through image of the subject which the imager is caused to image on the display.

According to the seventeenth embodiment, the through image of the portrait subject such as a person, for example, is displayed on the display, capable of easily imaging the person being a desired subject.

An eighteenth embodiment is a game apparatus, and comprises an imager which is caused to image a subject corresponding to each of a plurality of postures; an image selector which selects at least one image out of the plurality of subject images which the imager is caused to image on the basis of operation information according to an operation by a user; and a selected image displayer which displays the subject image selected by the image selector on a display.

In the eighteenth embodiment as well, similar to the first embodiment, it is possible to heighten the interest of the game.

A nineteenth embodiment is game controlling method comprising following steps of: (a)being caused to image a subject corresponding to each of a plurality of postures, (b) selecting at least one image out of the plurality of subject images which the step (a) is caused to image on the basis of operation information according to an operation by a user, and (c) displaying the subject image selected by the step (b) on a display.

In the nineteenth embodiment as well, similar to the first embodiment, it is possible to heighten the interest of the game.

The above described features, aspects and advantages of the present embodiments will become more apparent from the following detailed description of the present embodiments when taken in conjunction with the accompanying drawings.

BRIEF DESCRIPTION OF THE DRAWINGS

FIG. 2 is an illustrative view showing a top and a left side surface in a state the game apparatus shown in FIG. 1 is folded;

FIG. 5 is an illustrative view showing an example of a punching pose imaging screen and a mask image for imaging a punching pose which are to be displayed on a first LCD and a second LCD of the game apparatus shown in FIG. 4;

FIG. 6 is an illustrative view showing one example of a pose image confirming screen which is to be displayed on the first LCD and the second LCD of the game apparatus shown in FIG. 4, a mask image for cutting out a punching pose, and a punching image;

FIG. 23 is an illustrative view showing a concrete example of first character image data, first character sound data and motion data (punching motion) shown in FIG. 22;

FIG. 24 is an illustrative view explaining an example of a hit judging area indicated by hit judging data in FIG. 22;

FIG. 25 is an illustrative view explaining another example of the hit judging area indicated by the hit judging data in FIG. 22;

FIG. 26 is a flowchart showing a part of entire processing by the CPU shown in

FIG. 3;

FIG. 42 is an illustrative view shown another example of the mask image for imaging and a guide image of the imaging screen shown in FIG. 5.

DETAILED DESCRIPTION OF THE PREFERRED EMBODIMENTS

Figure 1:
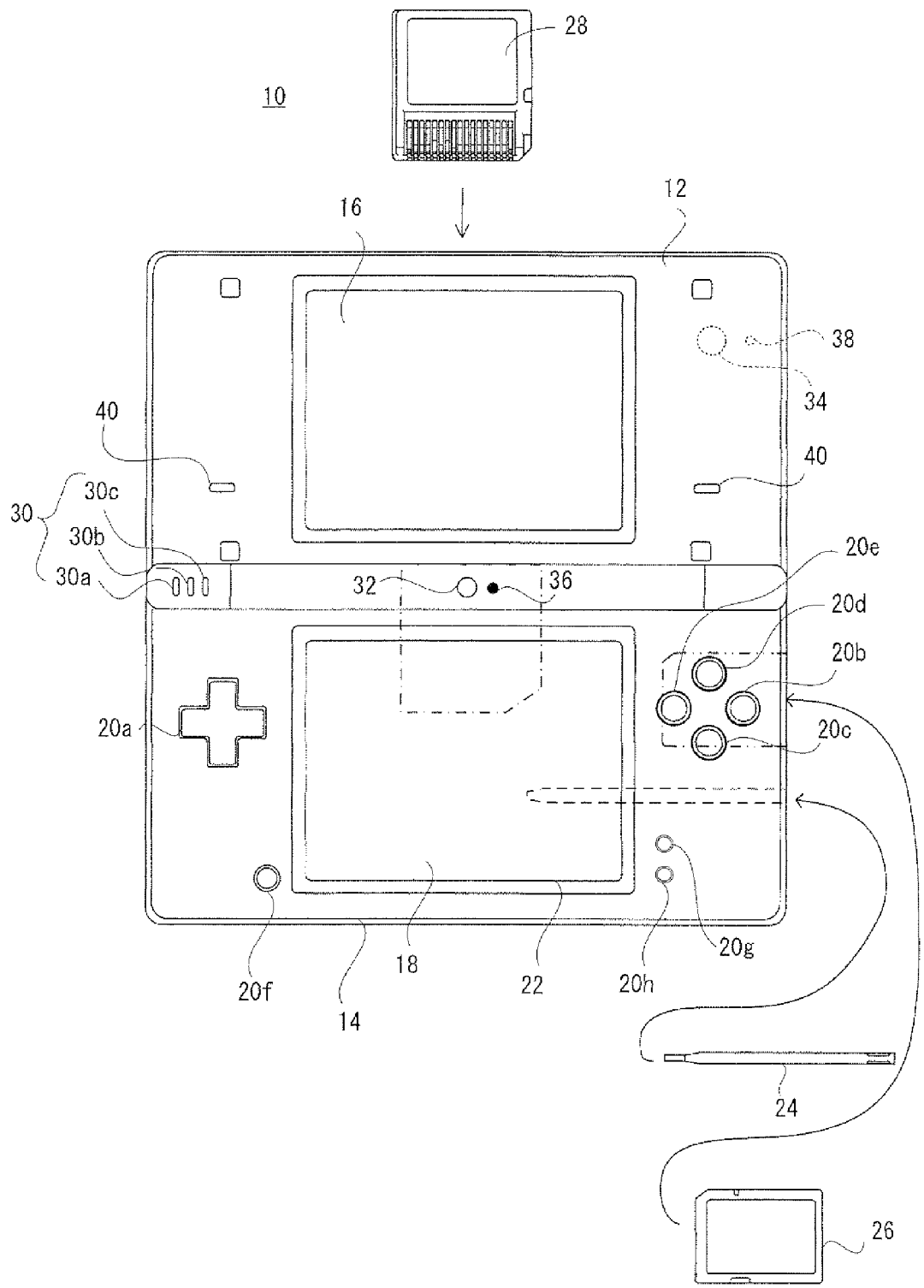
FIG. 1 is an illustrative view showing one embodiment of an external configuration of a game apparatus.

Referring to FIG. 1, a game apparatus 10 of one embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at an arbitrary angle.

Additionally, the game apparatus 10 is mounted with a camera (32, 34) described later, and functions as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

As shown in FIG. 1 and FIG. 2, the lower housing 14 is provided with respective operation buttons 20a-20k as an input device. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot for the touch pen 24 and the housing portion need not to be provided.

Moreover, on the right side surface of the lower housing 14, a loading slot for housing a memory card 26 (represented by a chain double-dashed line in FIG. 1) is provided. At the inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot, a connector (not illustrated) for electrically connecting the game apparatus 10 and the memory card 28 is provided. The memory card 28 is a recording medium of recording an information processing programs such as a game program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are the opposite direction with each other. For example, the user holding the game apparatus 10 can image a landscape (including the user, for example) as the user is seen from the game apparatus 10 with the inward camera 32, and can image a landscape (including other user, for example) as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position of housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image and the first LCD 16 as a display means for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a display means for mainly displaying an operation explaining screen and a game screen. Accordingly, the game apparatus 10 has two screens (16, 18) and two kinds of operating portions (20, 22).

Figure 3:
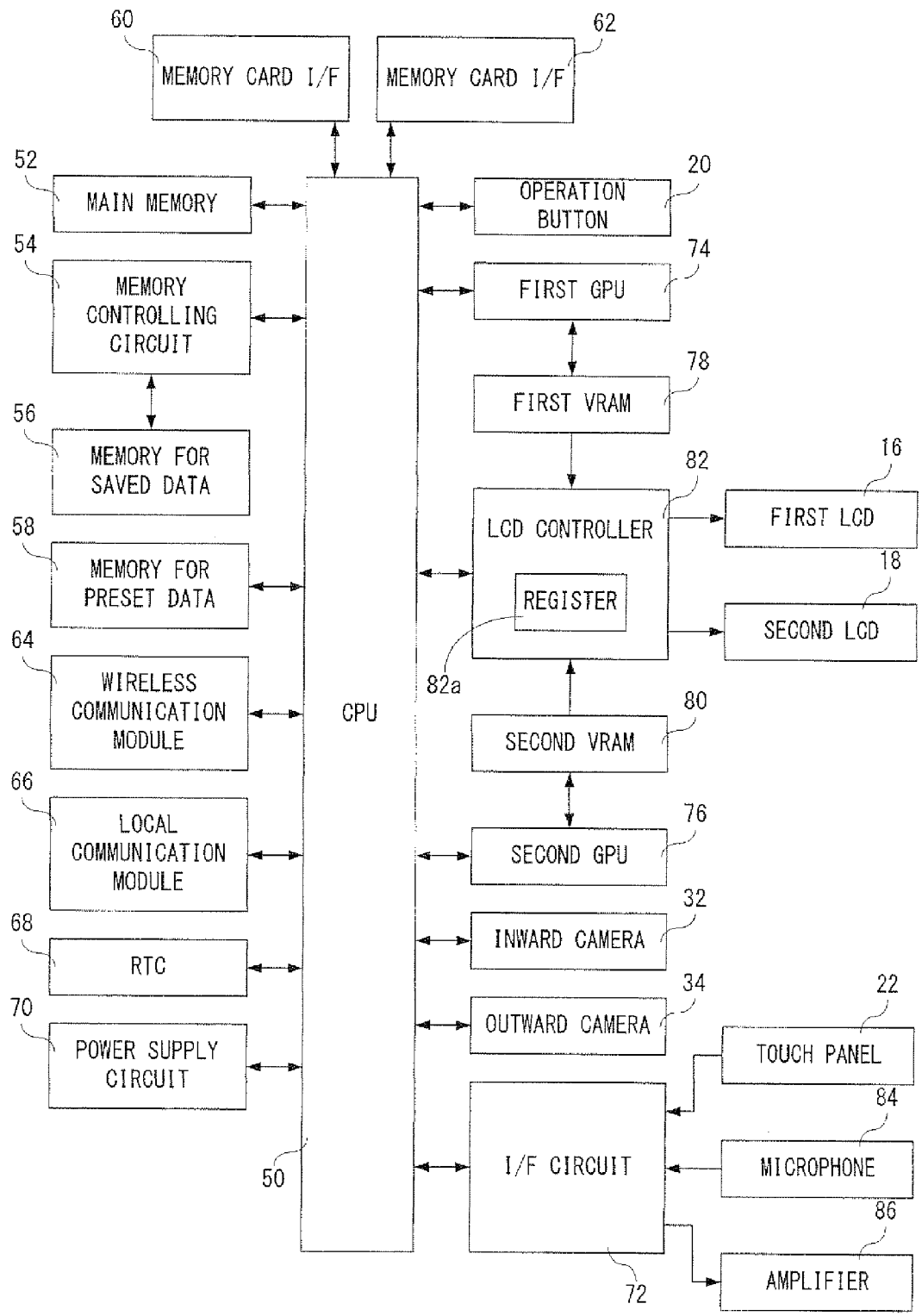
FIG. 3 is a block diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, and an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing (game processing) described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the RTC 68 and the power supply circuit 70. The RTC 68 counts a time to output the same to the CPU 50. For example, the CPU 50 can calculate a date and a current time, etc. on the basis of the time counted by the RTC 68. The power supply circuit 70 controls power supplied from the power supply (typically, a battery accommodated in the lower housing 14) included in the game apparatus 10, and supplies the power to the respective circuit components within the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where the input is made.

The operation button 20 is made up of the aforementioned respective operation buttons 20a-20k, and connected to the CPU 50. The operation data indicating a input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to an instruction from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and sends the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78.

The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82*a*. The register 82*a* stores a value of "0" or "1" according to an instruction from the CPU 50. In a case that the value of the register 82*a* is "0", the LCD controller 82 outputs the first display image drawn in the first VRAM 78 to the second LCD 18, and outputs the second display image drawn in the second VRAM 80 to the first LCD 16. Furthermore, in a case that the value of the register 82*a* is "1", the LCD controller 82 outputs the first display image drawn in the first VRAM 78 to the first LCD 16, and outputs the second display image drawn in the second VRAM 80 to the second LCD 18.

Figure 4:
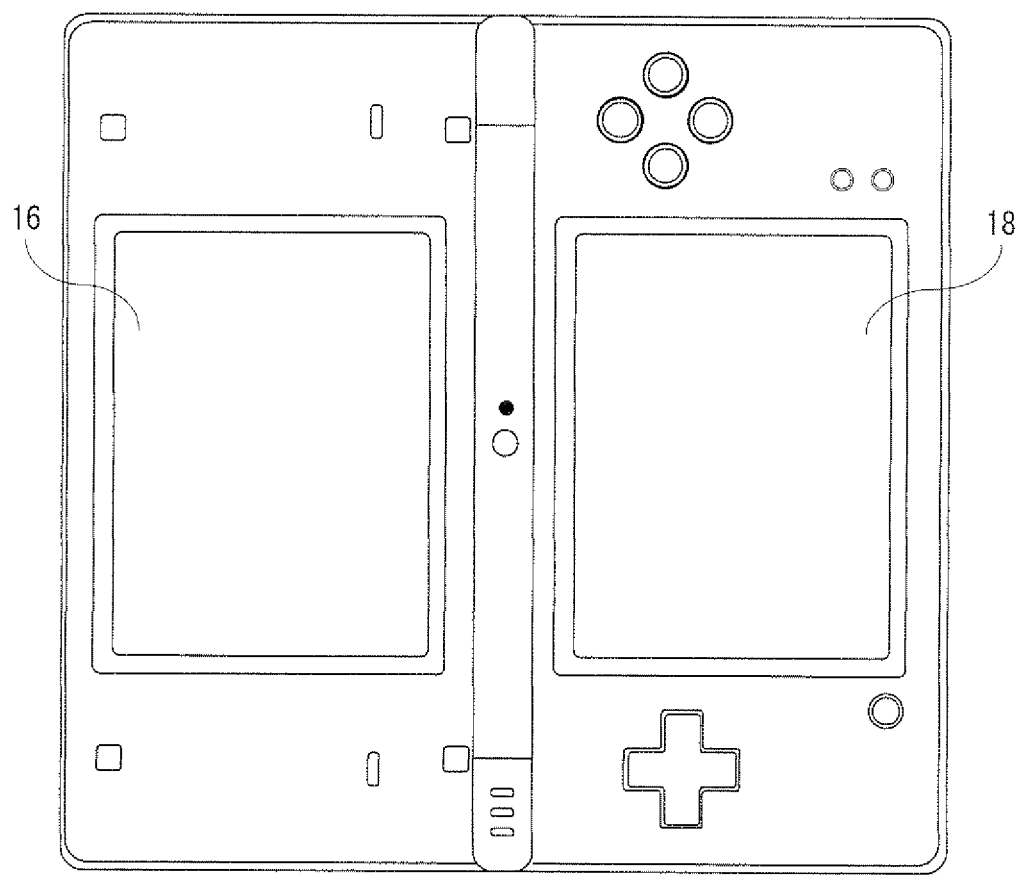
FIG. 4 is an illustrative view showing the game apparatus shown in FIG. 1 in a vertical position.

FIG. 4 shows an example in a case that the game apparatus 10 shown in FIG. 1 is used with its orientation changed. In what follows, a state shown in FIG. 1 is referred as "the game apparatus 10 being used horizontally (transversely)" and a state shown in FIG. 4 is referred as "the game apparatus 10 being used vertically (longitudinally)". For example, when the game apparatus 10 is rotated counterclockwise by about 90° from the horizontal state shown in FIG. 1, it is turned to the vertical state. Accordingly, in a case that the game apparatus 10 is vertically used as shown in FIG. 4, the first LCD 16 and the second LCD 18 are arranged side by side. Here, as shown in FIG. 4, the first LCD 16 is arranged on a left side, and the second LCD 18 is arranged on a right side.

Furthermore, in a case that the game apparatus 10 is horizontally used, the display screen of the first LCD 16 is called an upper screen, and the display screen of the second LCD 18 is called a lower screen whereas in a case that the game apparatus 10 is vertically used, the display screen of the first LCD 16 is called a left screen, and the display screen of the second LCD 18 is called a right screen.

In the game apparatus 10 (virtual game) of this embodiment, the player or the user (hereinafter referred to as "player") plays a battle game in which a player character beats an enemy character and a match-up game in which a player character battles with another player character by utilizing images imaged by means of the cameras 32, 34 and voices recorded through the microphone 84.

Before the battle game and the match-up game are performed, by imaging images of a subject by utilizing cameras 32, 34 and by recording voices, a new character is first created.

As shown in FIG. 5(A), a punching pose imaging screen 200 is displayed on the first LCD 16 and the second LCD 18. On the punching pose imaging screen 200, a left screen 202 is displayed on the first LCD 16, and a right screen 204 is displayed on the second LCD 18.

It should be noted from FIG. 5 onward, various screens to be displayed during execution of the virtual game are shown, but in order to clearly show each screen, only the display screens of the first LCD 16 and the second LCD 18 out of the game apparatus 10 are shown, and these display screens are shown in an unified manner.

Returning to FIG. 5(A), on the left screen 202, a guide image 202*a* for imaging a punching pose (posture) on the entire surface is displayed. The guide image 202*a* includes a mask image for imaging shown in FIG. 5(B). As shown in FIG. 5(B), on the mask image, a cut-out portion 2020 which is cut out in a shape of a punching pose (is transmitted) is provided. Furthermore, as to the mask image, for example, a predetermined color is given to the area except for the cut-out portion 2020. However, for the purpose of drawing, the colored part is shown by the hatch lines in FIG. 5(B). In FIG. 5(A), for the purpose of the clear understanding, the mask image (guide image 202*a*) is not hatched.

Furthermore, as to the guide image 202*a*, a message to prompt the user to image an image in a punching pose and explanations for button operations are displayed above the cut-out portion 2020. That is, the message, etc. is drawn at a front of the mask image above the cut-out portion 2020. This makes it possible to easily judge what pose the subject to be imaged should take. Here, the explanations for the button operation describes that the A button 20*b* is turned on to execute imaging processing, and the X button 20*d* is turned on to start up the inward camera 32 in place of the outward camera 34. In FIG. 5(A), for the purpose of clear understanding, no description is made on the cut-out portion 2020, but the imaged image (through image) imaged by the camera (outward camera 34, here) is displayed at the back of the mask image (this may be true for the inward camera 32). Accordingly, the part corresponding to the cut-out portion 2020 out of the imaged image can be viewed by the player. That is, as described above, by using the first LCD 16 as a viewfinder, the player images an image in a punching pose. In what follows, this is true for execution of the imaging.

On the right screen 204, a display area 204*a* for displaying the image of the imaged face (cool face here) is provided at the upper right portion. At the left of the display area 204*a*, a display area 204*b* for displaying a name and a title of a character which is being created is provided. Furthermore, below the display area 204*a* and the display area 204*b*, twelve display areas 204*c* are provided so as to be arranged in the form of grid. In the display area 204*c*, a reduced image (thumbnail image) of each imaged image (imaged image in each pose and imaged image of each face, etc.) is to be displayed. In this embodiment, before the reduced image is displayed, that is, the imaged image is stored, a symbol "?" is displayed in the display area 204*c*. However, there is no need of being restricted thereto, and information for identifying a pose and a face to be imaged may be displayed in text format, or a blank may be applied. This is true for other imaging screens below. Additionally, in the display area 204*c* at the upper left, a cursor 2040 of a bold quadrangle frame is displayed so as to be superimposed on the frame. The cursor 2040 indicates the display area 204*c* where the reduced image as to the imaged image in a punching pose is displayed. In this embodiment, the poses and the facial expressions to be imaged are decided in advance, and an imaging order thereof is decided in advance. In addition, the display area 204*a* and the display area 204*c* where the reduced images of the imaged images are to be displayed are decided in advance, and the cursor 2040 is moved (displayed) to the display areas 204*a*, 204*c* which are decided in advance according to the imaging order.

Furthermore, below the display area 204*c*, a button image 204*d* is provided. When the button image 204*d* is turned on, imaging processing is executed. That is, as to the punching pose imaging screen 200, by turning the A button 20b on or turning the button image 204d on, the imaging processing is executed to thereby obtain a still image (imaged image) at this point. This is true for the other imaging screens.

Additionally, in a case that the player himself or herself is imaged as well, a screen similar to the punching pose imaging screen 200 shown in FIG. 5(A) is displayed. Although illustration is omitted, this screen is the same as the punching pose imaging screen 200 shown in FIG. 5(A) except for a description that when the X button 20d is turned on to start up the outward camera 34 in place of the inward camera 32 as a explanation for a button operation.

In a case that the punching pose imaging screen 200 shown in FIG. 5(A) is displayed on the first LCD 16 and the second LCD 18, when the A button 20b or the button image 204d is turned on, the imaging processing is executed to thereby display a pose image confirming screen 220 shown in FIG. 6(A) as to the punching pose on the first LCD 16 and the second LCD 18. On the pose image confirming screen 220, a left screen 222 is displayed on the first LCD 16, and the right screen 224 is displayed on the second LCD 18. On the left screen 222, a guide image 222a including a cut-out portion 2220 is displayed, and a current imaged image is displayed at the back of the guide image 222a. Furthermore, as to the guide image 222a, a message to confirm whether or not the imaged image is to be stored is displayed above the cut-out portion 2220.

On the right screen 224, a button image 224a and a button image 224b are arranged up and down at approximately the center at the front of the right screen 204 shown in FIG. 5(A). As shown in FIG. 6(A), a translucent mask image is at the front of the right screen 204 shown in FIG. 5(A) and at the back of the button image 224a and the button image 224b. However, it may be possible that without displaying the right screen 204 shown in FIG. 5(A), only the button image 224a and the button image 224b may be provided. When the button image 224a is turned on, storing processing of the imaged image is executed. When the button image 224b is turned on, imaging processing is executed again. That is, imaging the image is restarted.

When the button image 224a is turned on on the pose image confirming screen 220 to execute storing the imaged image, the image data of the pose image generated based on the current imaged image (punching image, here) is stored. In this embodiment, as shown in FIG. 6(A), by utilizing the imaged image imaged with the game apparatus 10 which is vertically positioned, the battle game and the match-up game are performed with the game apparatus 10 which is horizontally positioned as shown below. Thus, the image data of the pose image based on the imaged image is generated and stored in the following procedures.

First, the imaged image having a resolution of 256 dots in vertical×192 dots in horizontal (see FIG. 6(A)) is trimmed so as to become a square having a common center and having a size enough to include the cut-out portion (2220, here). Then, the trimmed imaged image is subjected to thinning-out processing so as to have a resolution of 128 dots in vertical×128 dots in horizontal. In this case, since the size of the imaged image is reduced, the above-described trimming processing and thinning-out processing may be called reduction processing and compression processing. As shown in FIG. 6(B), by reducing the cut-out portion 2220 shown in FIG. 6(A) to fit into the resolution of 128 dots in vertical×128 dots in horizontal, the mask image for punching is prepared in advance. Accordingly, the imaged image which is subjected to the thinning-out processing is cut out by utilizing the mask image to generate a punching pose image shown in FIG. 6(C). The image data corresponding to the punching pose image is stored corresponding to the character which is being created. This is applied to a case that image data of a pose image based on the imaged image in another pose is created and stored. That is, the mask image for generating the image in another pose is also prepared in advance.

Here, the reason why imaging is performed with the game apparatus 10 positioned vertically as in this embodiment is for mainly imaging a portrait subject, such as a person and for using the first LCD 16 as a viewfinder in a portrait manner. Thus, the guide image (202a) with a relatively large cut-out portion (2220) can be displayed, allowing the subject of the through image to easily fit into the cut-out portion (2220), resulting in easy imaging. Furthermore, in the battle game and the match-up game, the game apparatus 10 is used horizontally as described later, and therefore, the portrait imaged image is subjected to processing, such as trimming processing and thinning-out processing in order to be used in the landscape manner, to thereby generate a pose image.

Furthermore, when the button image 224b is turned on on the pose image confirming screen 220 to execute the imaging processing again, the image data corresponding to the current imaged image is erased, and the screen returns to the punching pose imaging screen 200 shown in FIG. 5(A). Here, as described later, the image data corresponding to the imaged image is stored in a buffer area (92b) of the main memory 52.

Figure 7:
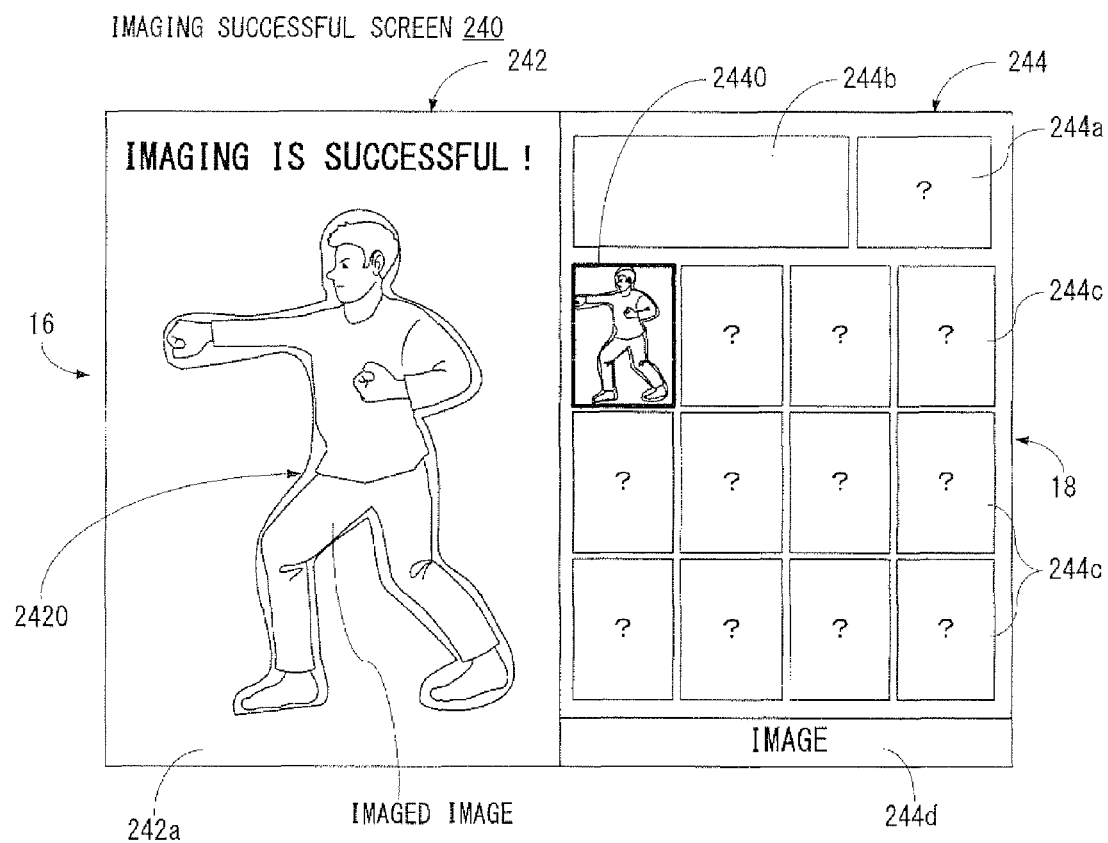
FIG. 7 is an illustrative view showing an example of an imaging successful screen to be displayed on the first LCD and the second LCD of the game apparatus shown in FIG. 4.

When the image data corresponding to the punching image is stored, an imaging successful screen 240 shown in FIG. 7 is displayed on the first LCD 16 and the second LCD 18. On the imaging successful screen 240 shown in FIG. 7, a left screen 242 is displayed on the first LCD 16, and a right screen 244 is displayed on the second LCD 18.

On the left screen 240, a guide image 242a including a cut-out portion 2420 is displayed, and the current imaged image is displayed at the back of the guide image 242a. Furthermore, as to the guide image 222a, a message to say that imaging is successful is displayed above the cut-out portion 2420.

On the right screen 244, a display area 244a, a display area 244b and a display area 244c are provided, and a button image 244d is displayed. Furthermore, on the display area 244c at the upper left, a cursor 2440 of a bold quadrangle frame is displayed. In the display area 244c designated by the cursor 2440, a reduced image of the imaged image (pose image) to be currently imaged and stored is displayed. However, the right screen 244 is the same as the right screen 204 of the above-described FIG. 5(A) except that the reduced image of the imaged image to be currently imaged and stored is displayed in the display area 244c designated by the cursor 2440, and therefore, a redundant explanation therefore is omitted.

Figure 8:
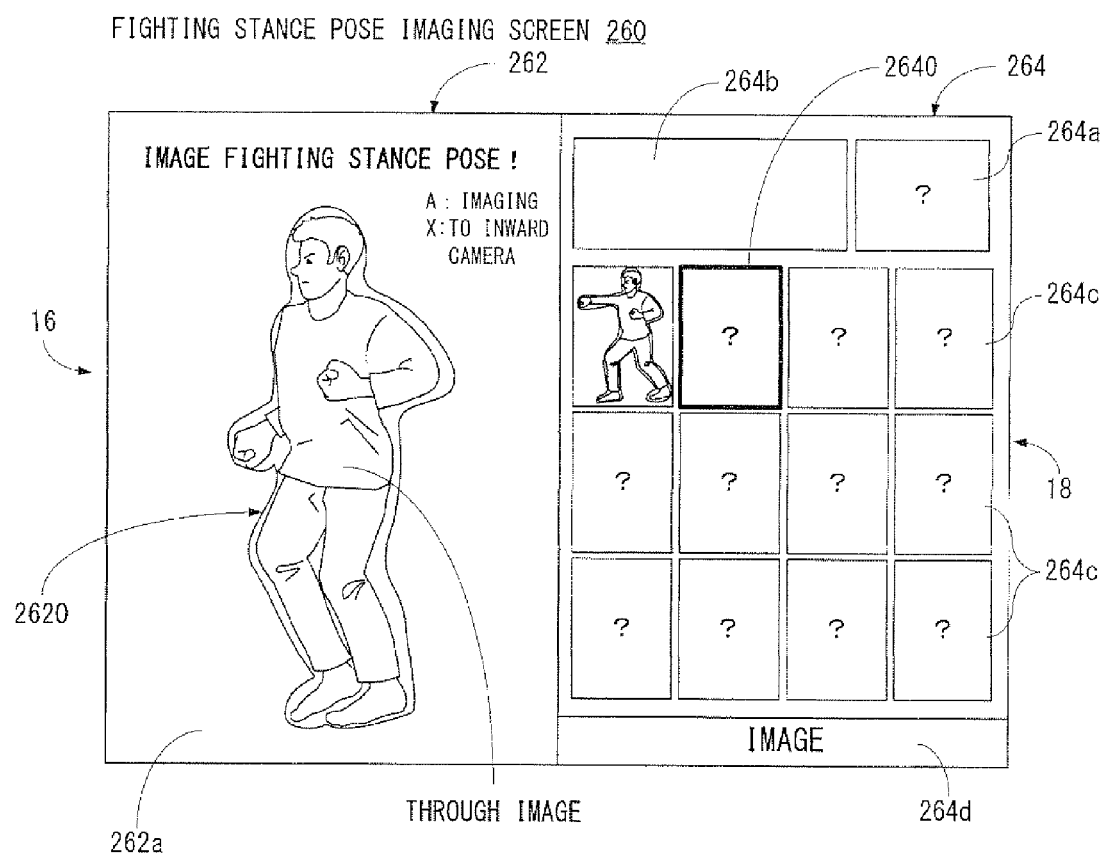
FIG. 8 is an illustrative view showing an example of a fighting stance pose imaging screen to be displayed on the first LCD and the second LCD of the game apparatus shown in FIG. 4.

When imaging the image in a punching pose is successful, the process shifts to image an image in a next pose (fighting stance pose in this embodiment). More specifically, a fighting stance pose imaging screen 260 shown in FIG. 8 is displayed on the first LCD 16 and the second LCD 18. On the fighting stance pose imaging screen 260, a left screen 262 is displayed on the first LCD 16, and a right screen 264 is displayed on the second LCD 18.

On the left screen 262, a guide image 262a for imaging a fighting stance pose is displayed, and a cut-out portion 2620 that is cut out in a shape of a fighting stance pose is formed on the guide image 262a. As described above, a through image (this is true for still image) imaged by the camera (outward camera 34 here) is displayed at the back of the guide image 262a. Accordingly, the through image can be viewed through the cut-out portion 2620. This is true for the following. Additionally, in the guide image 262a, above the cut-out portion 2620, a message to prompt the player to image the image in a fighting stance pose is displayed, and below the message, explanations for button operations are displayed.

On the right screen 264, display areas 264a, 264b, 264c are provided, and a button image 264d is provided. Since these are the same as those in the above-described punching pose imaging screen 200, redundant explanations are omitted. Here, the reduced image of the imaged image (punching pose image) which has already been imaged and stored is displayed in the display area 264c at the upper left. Furthermore, a cursor 2640 of a bold quadrangle frame is displayed on the display area 264c where a reduced image of the imaged image (fighting stance pose image) to be currently imaged and stored is displayed.

Although illustration is omitted, when the fighting stance pose imaging processing is executed, the pose image confirming screen shown in FIG. 6 is displayed on the first LCD 16 and the second LCD 18 to allow for a selection between storing of the imaged image and reimaging of the same. If the reimaging is made, the imaged data corresponding to the current imaged image is erased, and the screen returns to the fighting stance pose imaging screen 260 shown in FIG. 8. On the other hand, in a case that the imaged image is stored, the image data of the pose image based on the imaged image is generated and stored, and the imaging successful screen shown in FIG. 7 is displayed on the first LCD 16 and the second LCD 18. At this time, the reduced image of the pose image based on the imaged image (fighting stance pose image) to be currently imaged is displayed in the display area 264c designated by the cursor 2640.

Figure 9:
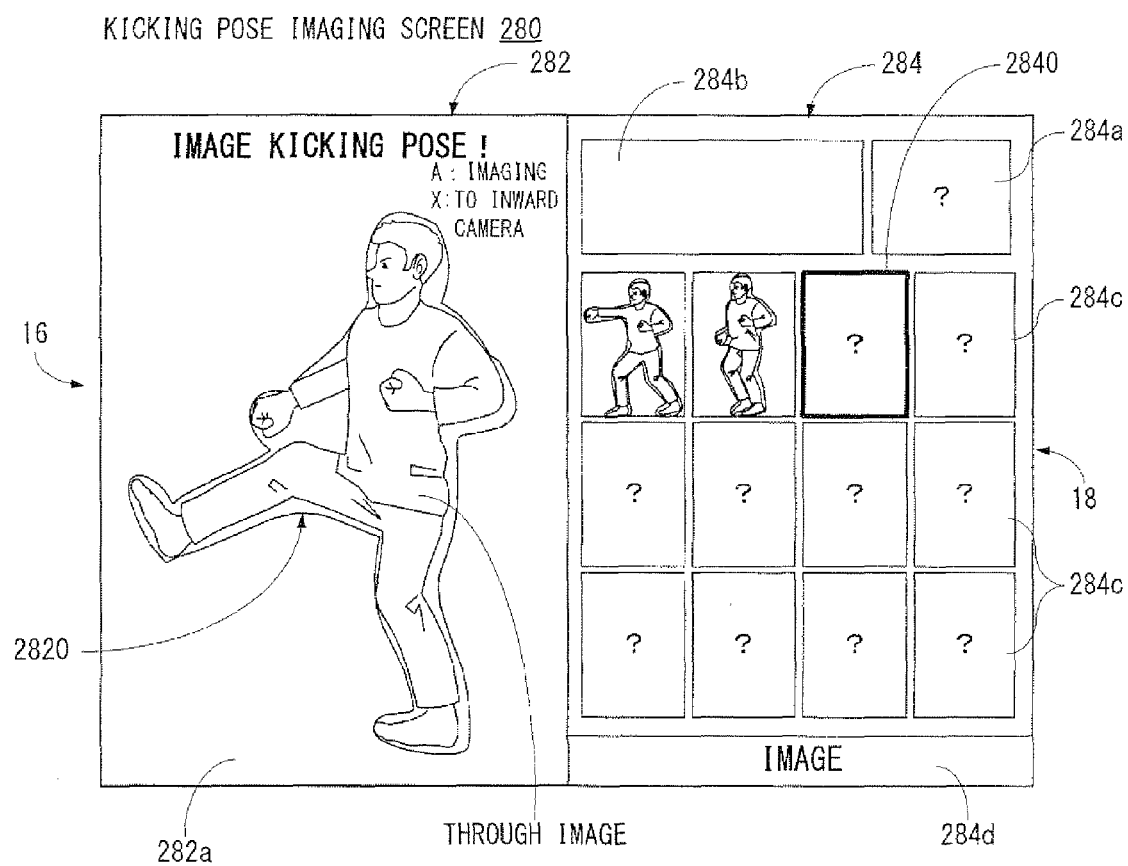
FIG. 9 is an illustrative view showing an example of a kicking pose imaging screen to be displayed on the first LCD and the second LCD of the game apparatus shown in FIG. 4.

When imaging the image in a fighting stance pose is successful, the process shifts to imaging of an image in a next pose (kicking pose in this embodiment). More specifically, a kicking pose imaging screen 280 shown in FIG. 9 is displayed on the first LCD 16 and the second LCD 18. On the kicking pose imaging screen 280, a left screen 282 is displayed on the first LCD 16, and a right screen 284 is displayed on the second LCD 18.

On the left screen 282, a guide image 282a for imaging a kicking pose is displayed, and in the guide image 282a, a cut-out portion 2820 that is cut out in a shape kicking pose is formed. As described above, a through image imaged by the camera (outward camera 34 here) can be viewed through the cut-out portion 2820. Furthermore, in the guide image 282a, a message to prompt the player to image an image in a kicking pose is displayed above the cut-out portion 2820, and below the message, explanations for button operations are displayed.

On the right screen 284, display areas 284a, 284b, 284c are provided, and a button image 284d is provided. Since these are the same as those on the above-described punching pose imaging screen 200, redundant explanations are omitted. Here, the reduced image of the punching pose image which has already been imaged and stored is displayed in the display area 284c at the upper left. Similarly, the reduced image of the fighting stance pose image which has already been imaged and stored is displayed in the display area 264c immediate right of the display area 284c at the upper left. Furthermore, a cursor 2840 of a bold quadrangle frame is displayed on the display area 284c where a reduced image of the imaged image (kicking pose image) to be currently imaged and stored is displayed.

Although illustration is omitted, when kicking pose imaging processing is executed, the pose image confirming screen shown in FIG. 6 is displayed on the first LCD 16 and the second LCD 18 to allow for a selection between storing the imaged image and reimaging of the same. In a case that reimaging the image is made, the imaged data corresponding to the current imaged image is erased, and the screen returns to the kicking pose imaging screen 280 shown in FIG. 9. On the other hand, in a case that the imaged image is stored, the image data of the pose image based on the imaged image is generated and stored, and the imaging successful screen shown in FIG. 7 is displayed on the first LCD 16 and the second LCD 18. At this time, the reduced image of the pose image based on the imaged image (kicking pose image) to be currently imaged is displayed in the display area 284c designated by the cursor 2840.

Although detailed explanation is omitted, imaging processing of other poses, such as an "attacked pose", a "killer technique putting out pose", a "sitting pose" and a "jumping pose" are subsequently executed. At this time, an imaging screen including a guide image having a cut-out portion corresponding to each pose is displayed on the first LCD 16 and the second LCD 18.

Figure 10:
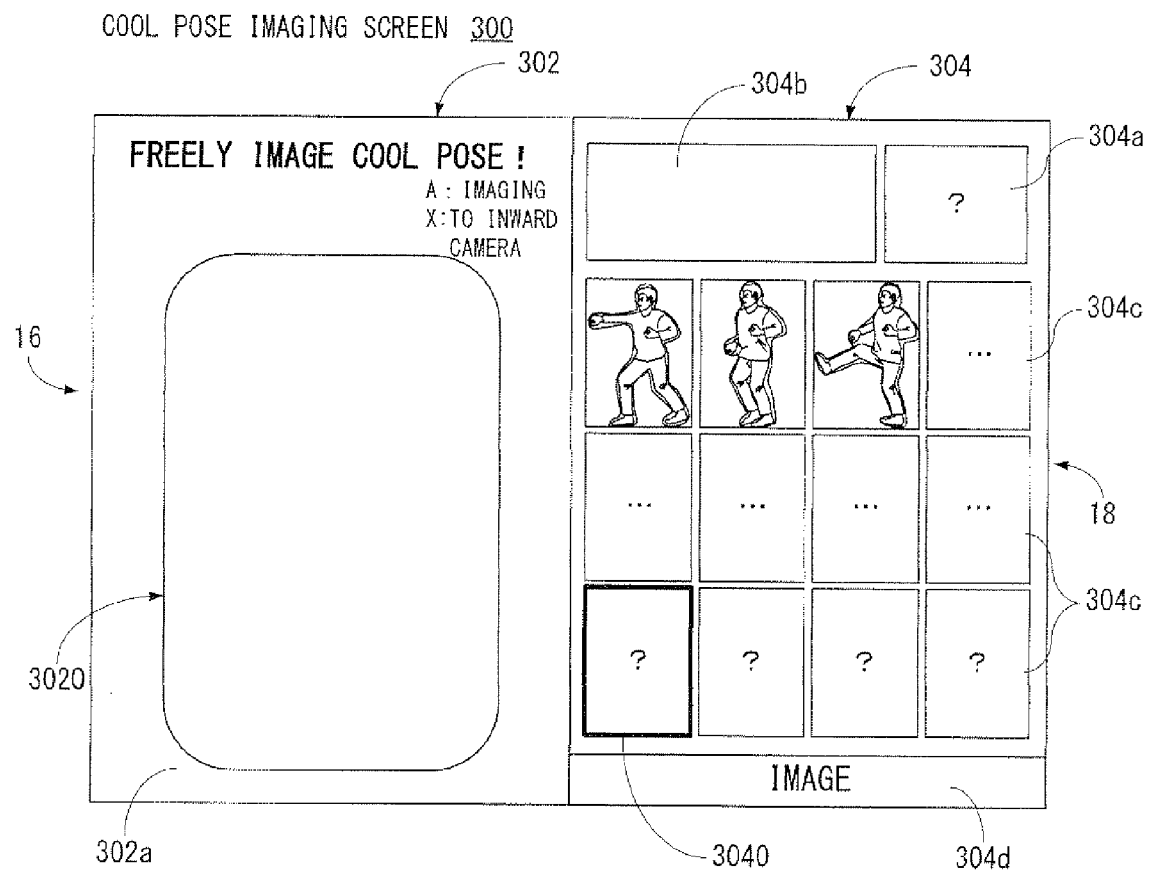
FIG. 10 is an illustrative view showing an example of a cool pose imaging screen to be displayed on the first LCD and the second LCD of the game apparatus shown in FIG. 4.

As described above, when imaging an mage in a pose for which positions of hands and legs are previously decided is completed (punching pose, fighting stance pose, kicking pose, walking pose, attacked pose, killer technique putting out pose, sitting pose, and jumping pose in this embodiment), imaging processing of the image in a pose for which positions of the hands and the legs are not especially decided is subsequently executed. In this embodiment, a "cool pose" and a "joyful pose" are imaged. In FIG. 10, a cool pose imaging screen 300 is displayed. For example, when imaging the jumping pose is successful, the cool pose imaging screen 300 is displayed on the first LCD 16 and the second LCD 18. On the cool pose imaging screen 300, a left screen 302 is displayed on the first LCD 16, and a right screen 304 is displayed on the second LCD 18.

On the left screen 302, a guide image 302a for imaging a cool pose is displayed, and in the guide image 302a, a cut-out portion 3020 formed by removing the angles of the quadrangle is provided. Although illustration is omitted, a through image imaged by the camera (outward camera 34 here) can be viewed through the cut-out portion 3020. Furthermore, in the guide image 302a, a message to prompt the player to image an image in a cool pose is displayed, and explanations for button operations are displayed above the cut-out portion 3020.

On a right screen 304, display areas 304a, 304b, 304c are provided, and a button image 304d is provided. Since these are the same as those in the punching pose imaging screen 200 shown in FIG. 5(A), redundant explanations are omitted. Here, the reduced images of the images in the various poses which have already been imaged and stored are displayed from the display area 304c at the upper left to the display area 304c at the right end in the middle line. It should be noted that for simplicity, " . . . " is displayed as to the parts of the reduced images in order to omit the illustrations. This is true for the below. Additionally, a cursor 3040 of a bold quadrangle frame is displayed on the display area 304c where a reduced image of the pose image (cool pose image) to be currently imaged and stored is displayed.

Although illustrations and detailed explanations are omitted, when imaging an image in the cool pose is successful, an imaging screen similar to the cool pose imaging screen 300 is displayed to thereby execute joyful pose imaging processing.

After completion of imaging the images in all the poses (10 poses in this embodiment), face image imaging processing is executed. The "cool face" imaging processing and the "sad face" imaging processing in this embodiment are performed sequentially.

Figure 11:
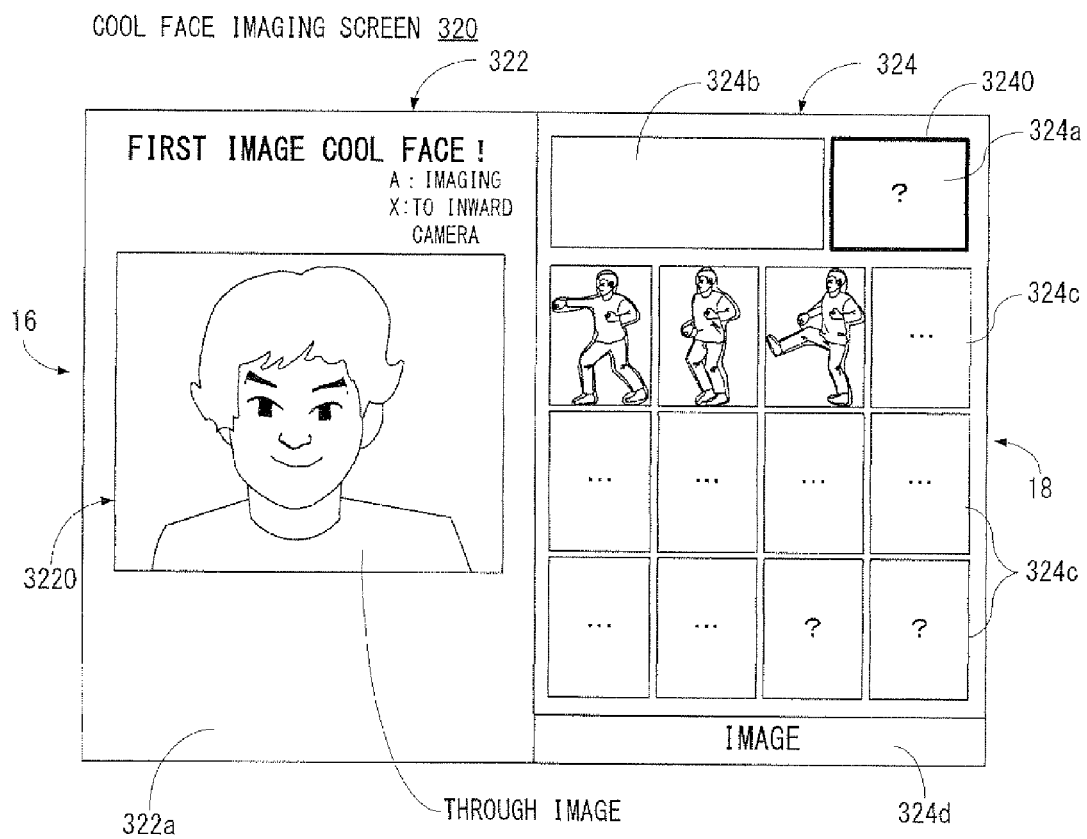
FIG. 11 is an illustrative view showing an example of a cool ace imaging screen to be displayed on the first LCD and the second LCD of the game apparatus shown in FIG. 4.

FIG. 11 shows a cool face imaging screen 320. When imaging a joyful pose is successful, the cool face imaging screen 320 is displayed on the first LCD 16 and the second LCD 18. On the cool face imaging screen 320, a left screen 322 is displayed on the first LCD 16, and a right screen 324 is displayed on the second LCD 18.

On the left screen 322, a guide image 322a for imaging a cool face is displayed, and in the guide image 322a, a quadrangle cut-out portion 3220 for imaging a face image is provided. On the cool face imaging screen 320 shown in FIG. 11, a through image imaged by the camera (outward camera 34 here) can be viewed through the cut-out portion 3220. Moreover, in the guide image 322a, a message to prompt the player to image an image in a cool face and explanations for button operations are displayed above the cut-out portion 3220.

On the right screen 324, display areas 324a, 324b, 324c are provided, and a button image 324d are provided. Since these are the same as those in the punching pose imaging screen 200 shown in FIG. 5(A), redundant explanations are omitted. In addition, a cursor 3240 of a bold quadrangle frame is displayed on the display area 324a where a reduced image of the cool face image to be currently imaged and stored is displayed.

Here, since the image of the cool face (this holds true for the image of the sad face) is not used for representing motions of characters in the battle game and the match-up game, the imaged image is trimmed within a range corresponding to the cut-out portion 3220, and the trimmed image is subjected to thinning-out processing so as to be 96 dots in vertical×128 dots in horizontal. This makes it possible to image data of the face image on the basis of the imaged image.

Although illustrations and detailed explanations are omitted, when imaging the cool face is successful, an imaging screen similar to the cool face imaging screen 320 is displayed to thereby execute sad face imaging processing. Similarly, although illustrations and detailed explanations are omitted, an imaging screen similar to the cool face imaging screen 320 is then displayed to execute imaging processing of an object to be used as an ammunition in the battle game and the match-up game, for example.

Although illustrations and detailed explanations are omitted, in the object imaging processing, a guide image for which a cut-out portion is set to be fit into a range (range defined by a circle) smaller than 128 dots in vertical×128 dots in horizontal is displayed, the imaged image is trimmed so as to conform to the shape of the range (circle), and the corresponding image data is stored.

Furthermore, in this embodiment, in imaging processing for creating a character, the punching pose, the fighting stance pose, the kicking pose, the walking pose, the attacked pose, the special weapon pose, the sitting pose, the jumping pose, the cool (provocation) pose, the joyful pose, the cool face, the sad face and the object are imaged in this order.

When imaging the object to be used as ammunition is successful, out of the new character creating processing, the image imaging processing is ended, and voice recording processing is started.

Figure 12:
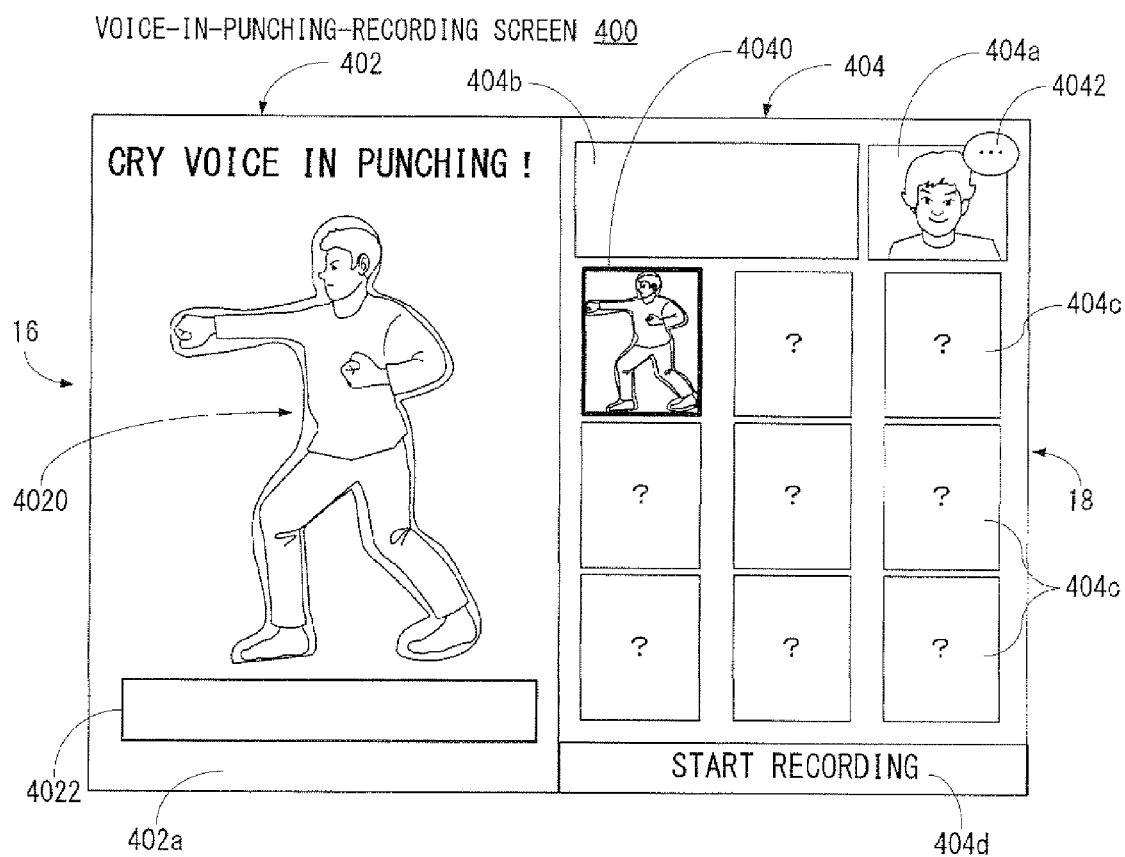
FIG. 12 is an illustrative view showing an example of a voice-in-punching-recording screen to be displayed on the first LCD and the second LCD of the game apparatus shown in FIG. 4.

In the voice recording processing, a voice-in-punching-recording screen 400 shown in FIG. 12 is displayed on the first LCD 16 and the second LCD 18. On the voice-in-punching-recording screen 400, a left screen 402 is displayed on the first LCD 16, and a right screen 404 is displayed on the second LCD 18. On the left screen 402, a guide image 402a for recording a voice in punching is displayed. In the guide image 402a, a cut-out portion 4020 is provided at approximately the center thereof, and at the cut-out portion 4020, the punching pose image is displayed. Here, the guide image 402a is approximately the same as that displayed on the first LCD 16 when the punching pose is imaged. In the guide image 402a, a message to prompt the player to record a voice when the player strikes the punch is displayed above the cut-out portion 4020, and a display area 4022 for displaying a recording time and a reproduction time are provided below the cut-out portion 4020.

Here, in the voice-in-punching-recording screen 400, the corresponding pose image is displayed in the cut-out portion 4020, but only the message may be displayed. Although illustration is omitted, this is true for a recording screen when another voice is recorded.

On the right screen 404, a display area 404a for displaying a reduced image as to the imaged image of the cool face is provided. Although illustrations are omitted, recording processing as to a voice of greeting corresponding to the cool face has already been executed, and a designation image 4042 like a speech balloon image (balloon) indicating thereof is displayed at the upper right of the display area 404a. This holds true for a case that recording processing as to other voices is executed (completed). For example, the designation image 4042 is a speech balloon image, but need not to be restricted thereto, and another image may be displayed. Furthermore, in place of the designation image 4042, a message to say that recording has been completed may be displayed at the front of the reduced image. This is true for the following.

At the left of the display area 404a, a display area 404b for displaying a name and a title of a character which is being created is provided. Furthermore, below the display area 404a and the display area 404b, nine display areas 404c for each displaying a reduced image as to a pose image and a face image corresponding to the recorded voice are provided so as to be arranged in the form of grid. In addition, below the display area 404c, a button image 404d is provided. When the button image 404d is turned on, recording a voice originated when the player strikes the punch is started. As can be understood from FIG. 12, a reduced image as to an image (punching image, here) corresponding to the voices to be currently recorded is displayed in the display area 404c at the upper left. Furthermore, on the display area 404c at the upper left, a cursor 4040 of a bold quadrangle frame is displayed.

Although illustration is omitted, when the button image (404d here) is turned on to start recording, a during-recording screen (not illustrated) is displayed on the first LCD 16 and the second LCD 18, to thereby record a voice (voice originated when a player strikes the punch, here) for a certain period of time (2 seconds, for example) in correspondence with one image (punching image, here). The recording time is represented by a bar to be displayed in the display area (display area similar to the display area 4022), for example. For example, the bar extends as time passes.

Furthermore, when the recording is started, a sound signal corresponding to a voice input through a microphone 84 is converted into audio data in the I/F circuit 74, and the audio data is applied to the CPU 50, and the CPU 50 stores the audio data in a buffer area of the main memory 52.

In addition, when the recording is completed, after lapse of a certain period of time (two seconds, for example), the voice (voice originated when a player strikes the punch) which is currently recorded is reproduced. That is, the CPU 50 reads the audio data that is currently stored in the main memory 52, converts the same into an analog sound signal in the I/F circuit 72, amplifies the analog sound signal in the amplifier 86 and then outputs the amplified sound signal from the speaker. Accordingly, the player can confirm the voice that is currently recorded. Although illustration is omitted, at this time, the during-voice reproducing screen is displayed on the first LCD 16 and the second LCD 18.

After completion of reproducing the recorded voice, a recording confirming screen not shown is displayed on the first LCD 16 and the second LCD 18. On the recording confirming screen, whether the voice recorded by the player is stored, rerecording is made, or the recorded voice is heard again is selected. For example, in a case that the recorded voice is stored, the audio data corresponding to the currently recorded voice is stored according to a recording order. Thereafter, a recording successful screen (not illustrated) is displayed on the first LCD 16 and the second LCD 18. On the recording successful screen, the left screen is displayed on the first LCD 16, and the right screen is displayed on the second LCD 18. On the left screen, the pose image and the face image corresponding to the currently recorded voice are displayed. The right screen is approximately the same as the right screen 404 shown in FIG. 12. However, a balloon is displayed at the right corner of the display area where the reduced images of the pose image and the face image corresponding to the currently recorded voice are displayed. Additionally, in a case the rerecording is made, the audio data corresponding to the currently recorded voice is erased, and the screen returns to the voice-in-punching-recording screen 400 shown in FIG. 12. In addition, in a case that the recorded voice is heard again, reproducing the currently recorded voice is started again, and the screen returns to the above-described during-reproducing screen (not illustrated).

After completion of recording a voice originated when the player strikes the punch, the process shifts to recording processing of a next voice (voices corresponding to other pose images and other face images). Although detailed explanation and illustrations are omitted, voices corresponding to other pose images and other face images are recorded in the same way as the voice recording processing as to the voice in punching. For example, a voice when the player is kicking, a voice when the player is attacked, a voice when the player puts out a killer technique (cries), a voice when the player is jumping, a voice when the player is tired from moving (sad), a voice when the player raises a cry of triumph (joy), a voice when the player is giving provocation (when the cool pose) are recorded. There is no need of recording voices corresponding to the pose images and the face images based on the imaged image, and voices which are independent of such images (one word voice for cheering a friend up in this embodiment) may be recorded.

Although detailed explanations are omitted, similar to a case that imaging is made, a guide image including the pose images and the face images in a decided order is displayed, and the corresponding voices are accordingly recorded in the decided order. In this embodiment, the greeting voice is recorded in correspondence with the image of the cool face, the voice when the player character strikes the punch is recorded in correspondence with the punching pose image, the voice when the player is kicking is recorded in correspondence with the kicking pose image, the voice when the player is attacked is recorded in correspondence with the attacked pose image, the voice when the player puts out the killer technique is recorded in correspondence with the special weapon pose image, the voice when the player is jumping is recorded in correspondence with the jumping pose image, a voice when the player is in sad is recorded in correspondence with the sad face image, the voice when the player raises a cry of triumph is recorded in correspondence with the joyful pose image, the voice when the player gives provocation is recorded in correspondence with the cool pose image, and the one word voice for cheering a fried up is recorded independent of the image. For example, the recording is executed according to the above-described order.

After completion of the entire voice recording processing, a recording end screen (not illustrated) is displayed on the first LCD 16 and the second LCD 18, and the data of the character that is currently created (character data: including image data, audio data, and attribute data) are stored, and the character creating processing is ended.

Next, the process shifts to imaging processing of a background of a stage (stage background) to be used in the battle game and the match-up game.

Figure 13:
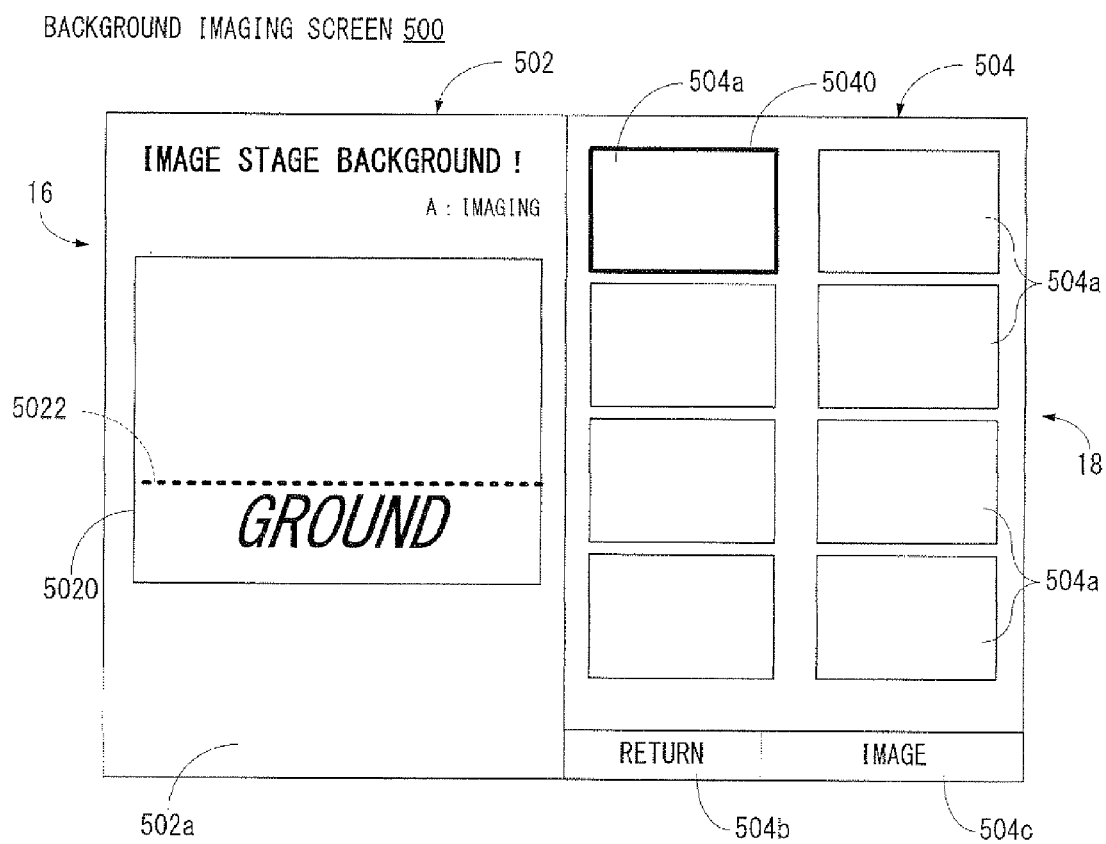
FIG. 13 is an illustrative view showing an example of a background imaging screen to be displayed on the first LCD and the second LCD of the game apparatus shown in FIG. 4.

When the stage background imaging processing is started, a background imaging screen 500 shown in FIG. 13 is displayed on the first LCD 16 and the second LCD 18. At this time, the outward camera 34 is started up. That is, in a case that the inward camera 32 is started up, it is switched to the outward camera 34. On the background imaging screen 500, a left screen 502 is displayed on the first LCD 16, and a right screen 504 is displayed on the second LCD 18.

On the left screen 502, a guide image 502*a* for imaging a stage background is displayed. In the guide image 502*a*, a quadrangle cut-out portion 5020 is provided at approximately the center thereof, and in the cut-out portion 5020, a dotted line (guide line) 5022 indicating a position of the ground in the stage is displayed. Although illustration is omitted, on the background imaging screen 500, a through image imaged by the outward camera 34 is displayed at the back of the guide image 502*a* until the imaging button (A button 20*b* or button image 504*c*) is turned on. Accordingly, the through image that is imaged by the outward camera 34 can be viewed through the cut-out portion 5020. In addition, as to the guide image 502*a*, a message to prompt the player to image a stage background and an explanation for a button operation are displayed above the cut-out portion 5020. The explanation for the button operation shows that the A button 20*a* is turned on to execute imaging processing.

On the right screen 504, a display area 504*a* for displaying a reduced image (thumbnail image) of an imaged image as to the background is displayed. In this embodiment, a plurality of display areas 504*a* (8) are provided. Furthermore, a cursor 5040 of a bold quadrangle frame is displayed on the display area 504*a* where the reduced image of the currently imaged image is displayed. Below the display area 504*a*, a button image 504*b* and a button image 504*c* are displayed. When the button image 504*b* is turned on, the background imaging processing is ended. When the button image 504*c* is turned on, imaging processing is executed. That is, the button image 504*c* functions as a shutter button.

Figure 14:
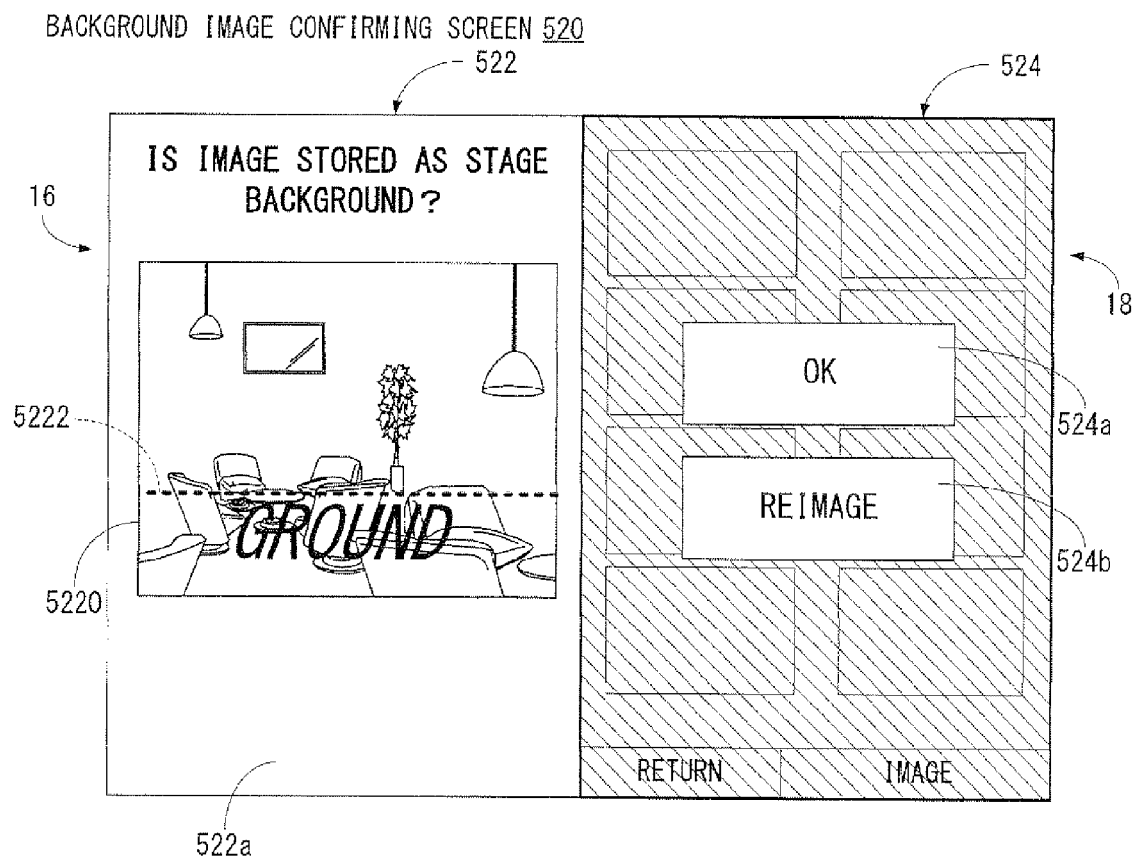
FIG. 14 is an illustrative view showing an example of a background image confirming screen to be displayed on the first LCD and the second LCD of the game apparatus shown in FIG. 4.

When the button image 504*c* is turned on on the background imaging screen 500, imaging processing is executed, a still image (imaged image) at this time is obtained, and a background image confirming screen 520 shown in FIG. 14 is displayed on the first LCD 16 and the second LCD 18. On the background image confirming screen 520, a left screen 522 is displayed on the first LCD 16, and a right screen 524 is displayed on the second LCD 18.

On the left screen 522, a guide image 522*a* for confirming whether or not the stage background is to be stored is displayed. In the guide image 522*a*, a quadrangle cut-out portion 5220 is provided at approximately the center thereof, and at the back of the guide image 522*a*, the currently imaged image is displayed. Accordingly, the imaged image can be viewed through the cut-out portion 5220. Furthermore, in the cut-out portion 5220, a guide line 5222 is displayed at the front of the imaged image. In addition, in the guide image 522*a*, a message to select whether or not the current imaged image is stored as a stage background is displayed above the cut-out portion 5220.

On the right screen 524, a button image 524a and a button image 524b are arranged up and down at approximately the center thereof. Furthermore, on the right screen 524, at the back of the button images 524a, 524b, the right screen 504 of the background imaging screen 500 shown in FIG. 13 is displayed, and a translucent mask image is displayed between the button images 524a, 524b and the right screen 504. When the button image 524a is turned on, the imaged data corresponding to the current imaged image is stored as a stage background. When the button image 524b is turned on, reimaging is made to thereby erase the imaged data corresponding to the current imaged image, and the screen returns to the background imaging screen 500 shown in FIG. 13.

Figure 15:
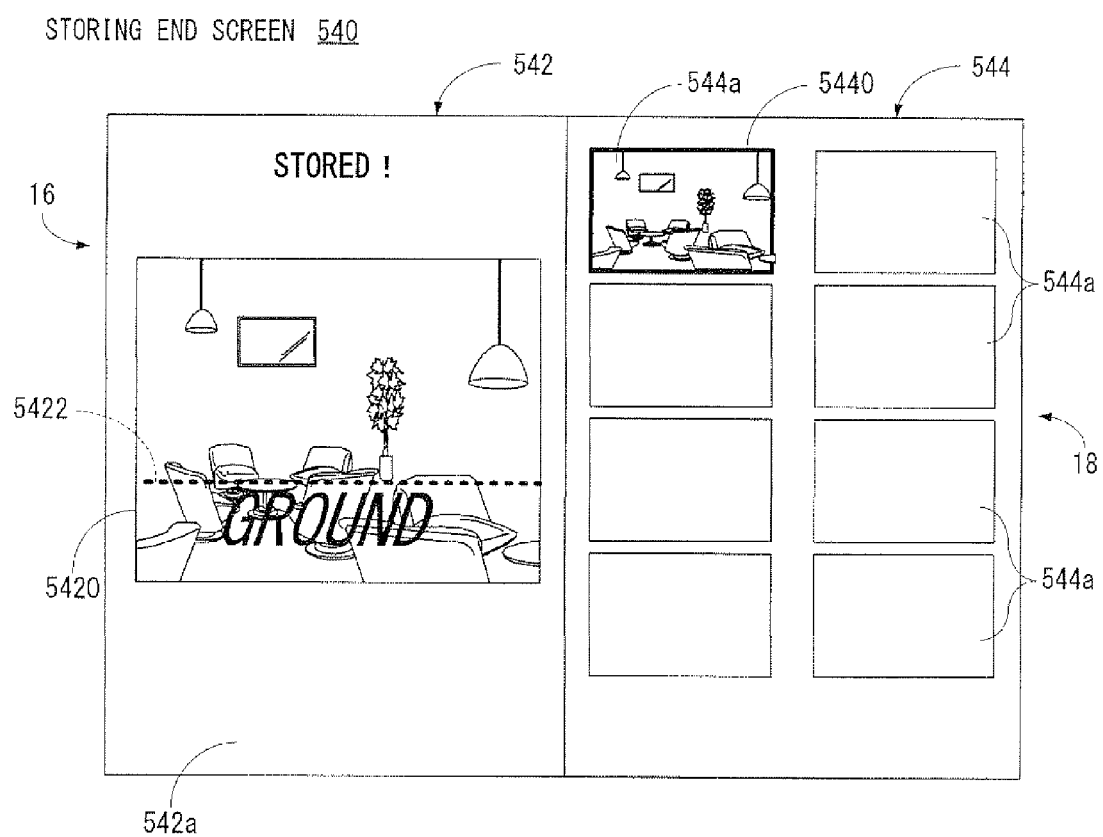
FIG. 15 is an illustrative view showing an example of a storing end screen to be displayed on the first LCD and the second LCD of the game apparatus shown in FIG. 4.

When the button image 524a is turned on on the background image confirming screen 520, the current imaged image is trimmed in a size corresponding to the cut-out portion 5220, and the image data corresponding to the trimmed imaged image is stored in the main memory 52. Then, a storing end screen 540 shown in FIG. 15 is displayed on the first LCD 16 and the second LCD 18. On the storing end screen 540, a left screen 542 is displayed on the first LCD 16, and a right screen 544 is displayed on the second LCD 18.

On the left screen 542, a guide image 542a for notifying that the imaged image is stored as a stage background is displayed. In the guide image 542a, a quadrangle cut-out portion 5420 is provided at approximately the center, and in the cut-out portion 5420, the imaged image that is currently stored is displayed. Furthermore, in the cut-out portion 5420, a guide line 5422 is displayed at the front of the imaged image. In addition, in the guide image 542a, above the cut-out portion 5420, a message to complete storing of the imaged image is displayed.

On the right screen 544, a plurality of display areas 544a (8) for displaying reduced images (thumbnail image) of the imaged images are displayed. Furthermore, on the right screen 544, the reduced image of the imaged image that is stored is displayed in the display area 544a designated by a cursor 5440 of a bold quadrangle frame.

By using the character and the background image of the stage that are created as described above, a one-player game (battle game) or a two-player game (match-up game) is performed.

First, the one-player game is explained.

Figure 16:
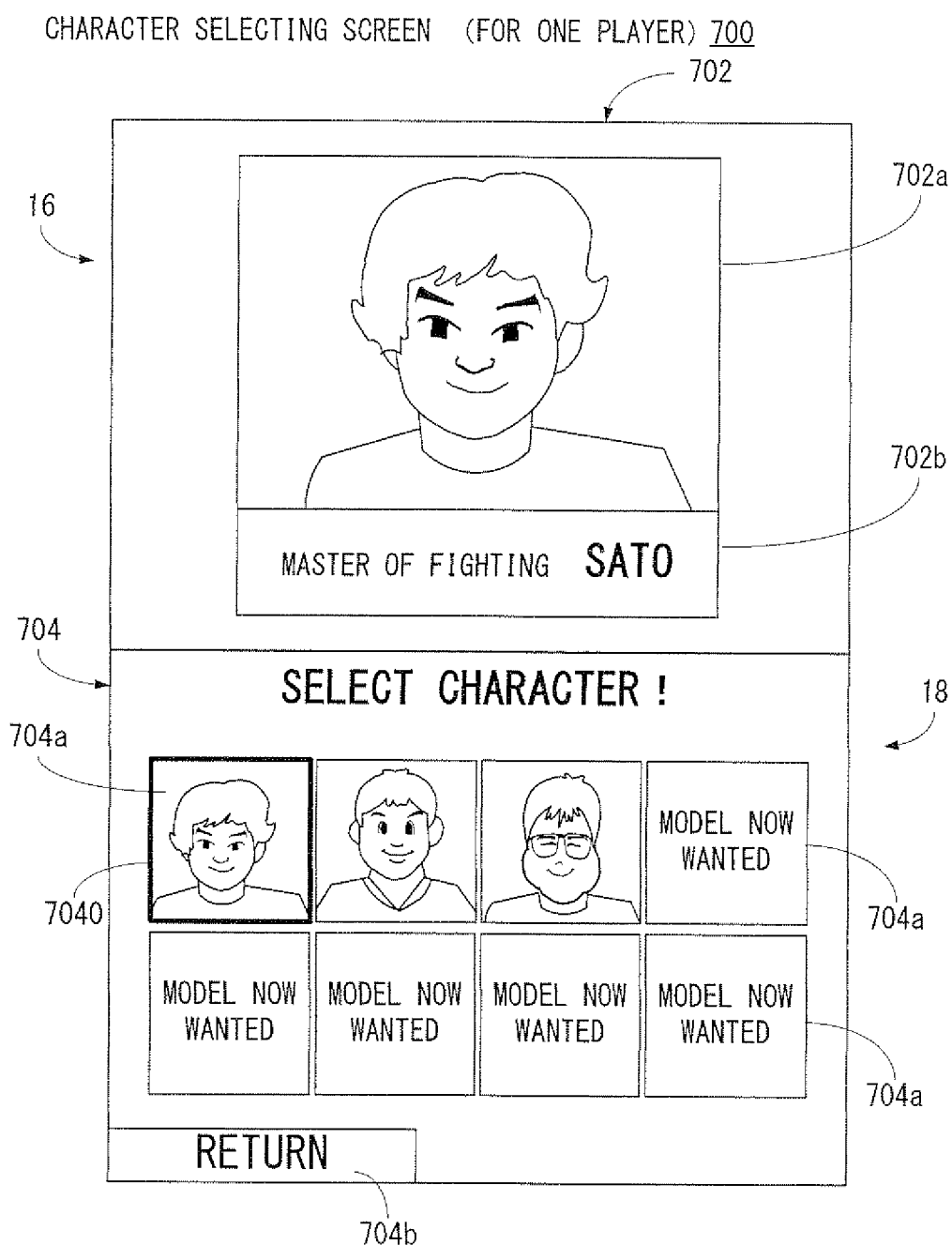
FIG. 16 is an illustrative view showing an example of a character selecting screen (for one player) to be displayed on the first LCD and the second LCD of the game apparatus shown in FIG. 4.

When the one-player game is started, a character selecting screen (for one player) 700 shown in FIG. 16 is displayed on the first LCD 16 and the second LCD 18. On the character selecting screen 700, an upper screen 702 is displayed on the first LCD 16, and a lower screen 704 is displayed on the second LCD 18.

On the upper screen 702, a display area 702a and a display area 702b are provided to be vertically adjacent with each other. In the display area 702a, a cool face image as to the character which is being designated on the lower screen 704 described later is displayed. Furthermore, in the display area 702b, a title and a name of the character as to the character which is being designated on the lower screen 704 are displayed.

On the lower screen 704, a plurality of display areas 704a (8 in this embodiment) are provided. Furthermore, at the bottom left corner of the lower screen 704, a button image 704b is provided. In addition, above the display area 704a, a message to prompt the player to select a character is displayed. Furthermore, a cursor 7040 of a bold quadrangle frame is displayed on the display area 704a where the reduced image of the cool face image of the character that is currently being designated is displayed. The cursor 7040 can be moved according to an operation by the cross key 20a. However, the cursor 7040 is not moved to the display area 704a where the reduced image of the cool face image of the character is not displayed. Although illustration is omitted, when cursor 7040 is moved, the reduced image to be designated changes, and the face image, the name and the title which are displayed on the upper screen 702 are accordingly changed as well. When a decision button (A button 20b) is turned on in a state that the reduced image of a desired character is designated with the cursor 7040, the character as to the selected reduced image is decided (selected) as a player character. Or, when the reduced image of the desired character is directly touched (on) with the touch pen 24, the character as to the touched reduced image is displayed as a player character. When the button image 704b is turned on, the screen returns to the game menu screen, for example, for making a selection between the one-player game and the two-player game.

Figure 17:
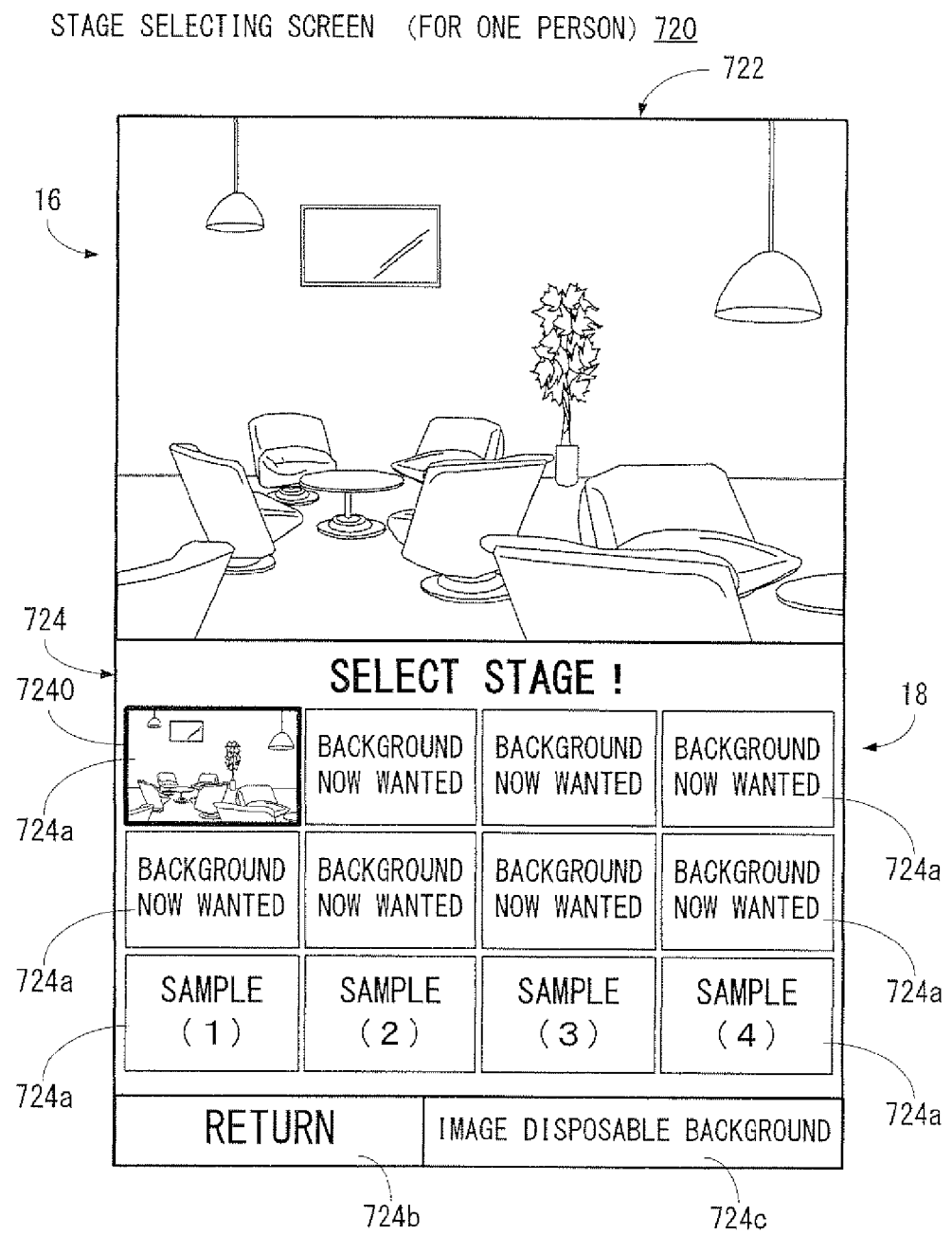
FIG. 17 is an illustrative view showing an example of a stage selecting screen (for one player) to be displayed on the first LCD and the second LCD of the game apparatus shown in FIG. 4.

When the player character is decided on the character selecting screen 700, a stage selecting screen (for one player) 720 shown in FIG. 17 is displayed on the first LCD 16 and the second LCD 18. On the stage selecting screen 720, an upper screen 722 is displayed on the first LCD 16, and a lower screen 724 is displayed on the second LCD 18.

On the upper screen 722, the imaged image of the stage background which is being designated on the lower screen 724 described later is displayed. On the lower screen 724, a plurality of display areas 724a (12 in this embodiment) for displaying reduced images of the imaged images of the stage backgrounds and reduced images as to the stage backgrounds (samples) created in advance are provided. For example, the stage background images as samples are created by developer or the like of the virtual game.

Furthermore, at the bottom end of the lower screen 724, a button image 724b and a button image 724c are provided. In addition, above the display area 724a, a message to prompt the player to select a stage background is displayed. Additionally, a cursor 7240 of a bold quadrangle frame is displayed on the display area 724a where the reduced image which is being selected is displayed. The cursor 7240 can be moved according to an operation by the cross key 20a. However, the cursor 7240 is not moved to the display area 724a where the reduced image is not displayed. The deciding method of the stage background is similar to the character deciding method as described above, and therefore, redundant explanations are omitted.

Alternatively, when the button image 724b is turned on, the screen returns to the character selecting screen 700 shown in FIG. 16. Furthermore, when the button image 724c is turned on, imaging processing as to a stage background to be temporarily used is executed. The imaging processing as to the stage background to be temporarily used is approximately the same as the stage background imaging processing in the above-described new character creating processing, and therefore, redundant explanations are omitted. The image data corresponding to the imaged image as to the stage background to be temporarily used is erased when a battle game, for example, is ended. Alternatively, the image data corresponding to the imaged image as to the stage background to be temporarily used may be stored (saved).

Figure 18:
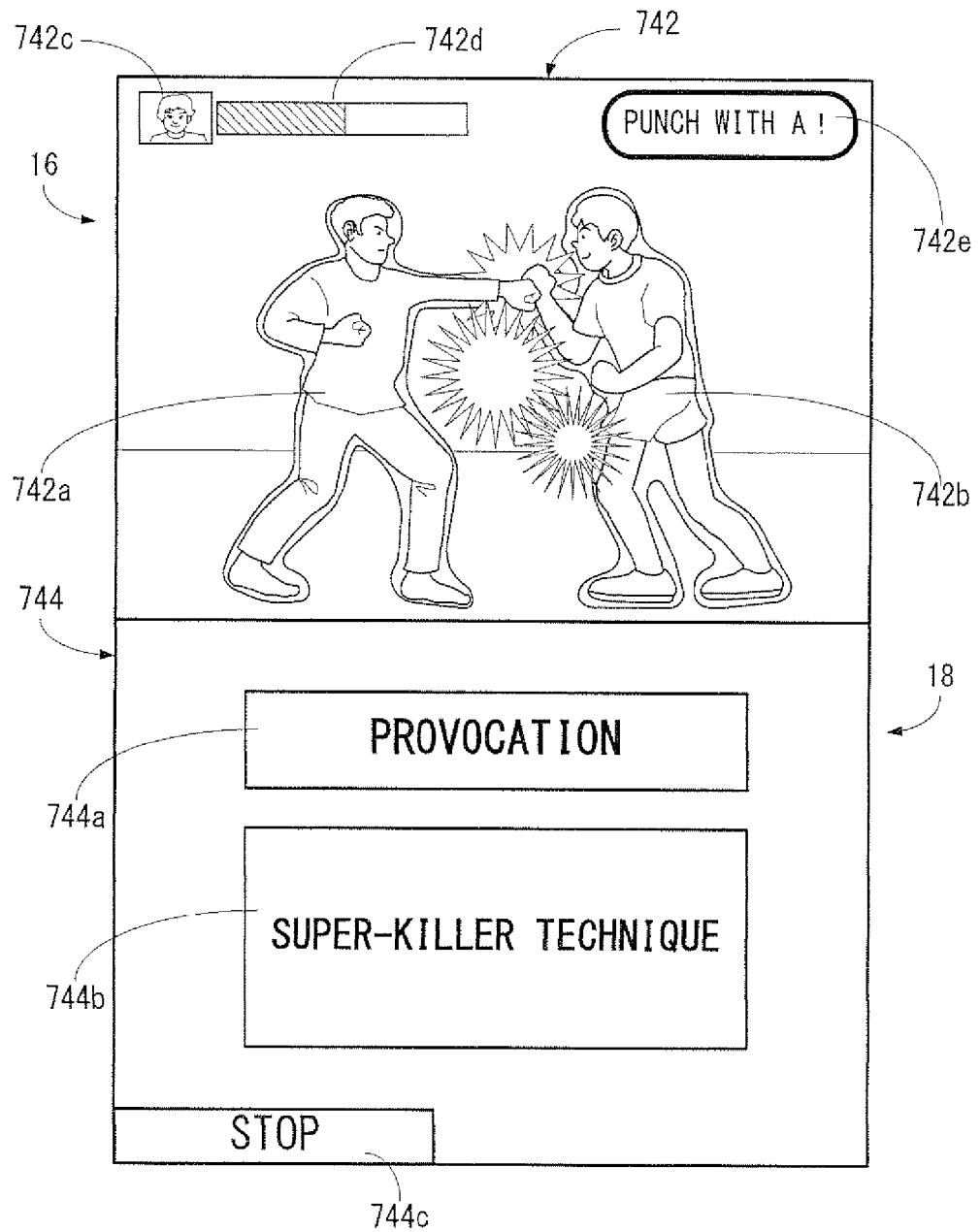
FIG. 18 is an illustrative view showing an example of a battle screen (for one player) to be displayed on the first LCD and the second LCD of the game apparatus shown in FIG. 4.

When the stage background is decided, a battle screen (for one player) 740 shown in FIG. 18 is displayed on the first LCD 16 and the second LCD 18. On the battle screen 740, an upper screen 742 is displayed on the first LCD 16, and a lower screen 744 is displayed on the second LCD 18. On the upper screen 742, a player character 742a and an enemy character 742b are displayed at approximately the center thereof. Here, the image of the player character 742a is displayed by use of the plurality of pose images stored in the character creating processing. The enemy character 742b is displayed by utilizing the images created in advance by the developer, or the like of this virtual game. Here, in a case that a plurality of characters are created, the character which is not selected as a player character 742a can be used as an enemy character 742b. In such a case, by utilizing a plurality of pose images stored as to the character as an enemy character 742b, the enemy character 742b is displayed. Furthermore, at the beginning of the battle screen 740 being displayed, the player character 742a and the enemy character 742b are displayed by use of the fighting stance pose images. In addition, on the upper screen 742, at the upper left corner, a display area 742c for displaying a face image of the player character 742a is provided, and at the right of the display area 742c, a display area 742d for displaying a physical strength value of the player character 742a is provided. In addition, on the upper screen 742, at the upper right corner, a display area 742e for displaying an explanation of a button operation is provided.

Although not illustrated, on the upper screen 742, the stage background selected on the stage selecting screen (for one player) 720 shown in FIG. 17 is displayed. Here, in the one-player game, the player character 742a moves to the right on the upper screen 742 to thereby advance the game. Accordingly, the stage background has to be scrolled to make the player perceive that the player character 742a moves to the right direction on the upper screen 742. At this time, in order that the image of the stage background is displayed so as to be moved from right to left on the upper screen 742, images in which stage background images are arranged side by side may be sequentially displayed, and the stage background image and the image obtained by reversing the image right to left may be sequentially displayed.

On the lower screen, a button image 744a and a button image 744b are provided at approximately the center thereof, and at the lower left corner, a button image 744c is provided. When the button image 744a is turned on, the player character 742a gives provocation to the enemy character 742b. Additionally, when the button image 744b is turned on, the player character 742a puts out super-killer technique. It should be noted that the button image 744b is not always placed in an on-state, and is placed in the on-state when a predetermined condition is satisfied. For example, the predetermined condition is that the physical strength value of the player character 742a (or enemy character 742b) becomes less than a constant value, that attacking is successful continuously at a predetermined number of times or more, or the like. When the button image 744c is turned on, the one-player game is ended, and the screen returns to the game menu screen.

In the one-player game, the player controls the movement, etc. of the player character 742a by using the cross key 20a, and causes the player character 742a to make an attack by using the A button 20b. For example, when the player pushes the left direction button or the right direction button of the cross key 20a, the player character 742a moves to the left direction (back away), or moves to the right direction (advance). Alternatively, when the player pushes the up direction button of the cross key 20a, the player character 742a jumps. Still alternatively, when the player pushes the down direction of the cross key 20a, the player character 742a sits. Or, when the player pushes the A button 20b, the player character 742a makes an attack according to the content displayed on the display area 742e. In FIG. 18 example, when the A button 20b is turned on, the player character 742a punches. Here, in a case that "kicking" is displayed in the display area 742e, when the A button 20b is turned on, the player character 742a kicks. Although detailed explanation is omitted, the content displayed in the display area 742e is changed during the battle game, and therefore, the technique that the player character 742a makes is changed depending on the timing when the A button 20b is turned on. Furthermore, when the player pushes the cross key 20a and the A button 20b at the same time or at approximately the same time, the player character 742a puts out a killer technique.

When the player character 742a is thus operated to execute each motion, the player character 742a is displayed by using each pose image as to the character selected as the player character 742a.

In this embodiment, data (motion data) as to an action (motion) of the player character 742a according to an operation by the player is stored. In the motion data, an index number of image data to be used and an index number of audio data to be used are described by bringing them into correspondence with the number of frames. In a case that no voice is output here, only the image data is described. Furthermore, as described later, in the motion data, an index number of a judging area for judging hitting is also described. That is, the number of frames described in the motion data indicates when the image data is to be updated, when the audio data is to be reproduced, and when the hit judging processing it to be made.

For example, in a punching motion (a series of motions), the character (742a, 742b, etc.) changes from the fighting stance pose to the punching pose, and then changes (returns) to the fighting stance pose. More specifically, assuming that the punching motion is represented by 16 frames (about 1 second), the fighting stance pose image is displayed in the first frame, the punching pose image is displayed in the eighth frame, and the fighting stance pose image is displayed in the sixteenth frame. Here, at the first frame, the eighth frame and the sixteenth frame, the pose images are updated. Thus, once the pose image is updated, the same pose image has been displayed until the next pose image is updated. Accordingly, in the aforementioned punching motion, the fighting stance pose image has been displayed from the first frame to the seventh frame, the punching pose image has been displayed from the eighth frame to the fifteenth frame, and the fighting stance pose image has been displayed from the sixteenth frame to an instruction of the next motion.

In addition, as to the punching motion, the index number when the player strikes the punch is described in correspondence with the eighth frame (the index number of the punching pose image), for example, and the voice in punching is output (reproduced) at the eighth frame from the start of the punching motion.

In addition, in a case that the punching pose image is displayed (from the eighth frame to the fifteenth frame, here), a hit judging area indicated by the index number of the hit judging area stored in correspondence with the eighth frame (the index number of the punching pose image) is set by being correspondence with the pose images of the player character 742a in order to execute the hit judging processing by the attack by the player character 742a, and it is determined whether or not the punch hits the enemy character 742b on the basis of the set hit judging area. At this time, a hit judging area according to the motion data which is brought into correspondence with each motion to be performed by the computer 50 is also set to the enemy character 742b.

On the other hand, in a case that the enemy character 742b makes an attack, a hit judging area indicated by the index number of the hit judging area stored in correspondence with the number of frames (index number of the pose image) at that time is set by being brought into correspondence with the pose image of the player character 742a, and it is determined whether or not the attack by the enemy character 742b hits the player character 742a on the basis of the set hit judging area. Similar to the above-described case, a hit judging area according to the motion data which is brought into correspondence with each motion to be performed by the computer 50 is also set to the enemy character 742b.

Although detailed explanations are omitted, motion data is similarly prepared in advance as to other motions, and according to the motion data, the motion of the player character 742a (display of the pose image), the sound output and the hit judging are executed. Accordingly, a battle scene with realistic sensation can be represented.

In the one-player game, when the player character 742a defeats the predetermined number of enemy characters 742b, the game is to be cleared. However, if the physical strength value of the player character 742a is equal to or less than 0 before the player character 742a defeats the predetermined number of enemy characters 742b, the game is over. During execution of the game, when the player character 742a attacks the enemy character 742b, the hit judging processing is executed as described above, and when the attack of the player character 742 hits the enemy character 742b, the physical strength value of the enemy character 742b is subtracted. For example, depending on the kind of the attacks, the magnitude of the physical strength value to be subtracted is different. On the other hand, in a case that the enemy character 742b attacks the player character 742a, the hit judging processing is executed as described above, and when the attack of the enemy character 742b hits the player character 742a, the physical strength value of the player character 742a is subtracted. In such a case as well, depending on the kind of the attacks, the magnitude of the physical strength value to be subtracted is different. When the game is to be cleared or the game is over, the screen returns to the game menu screen.

Next, the two-player game is explained.

Figure 19:
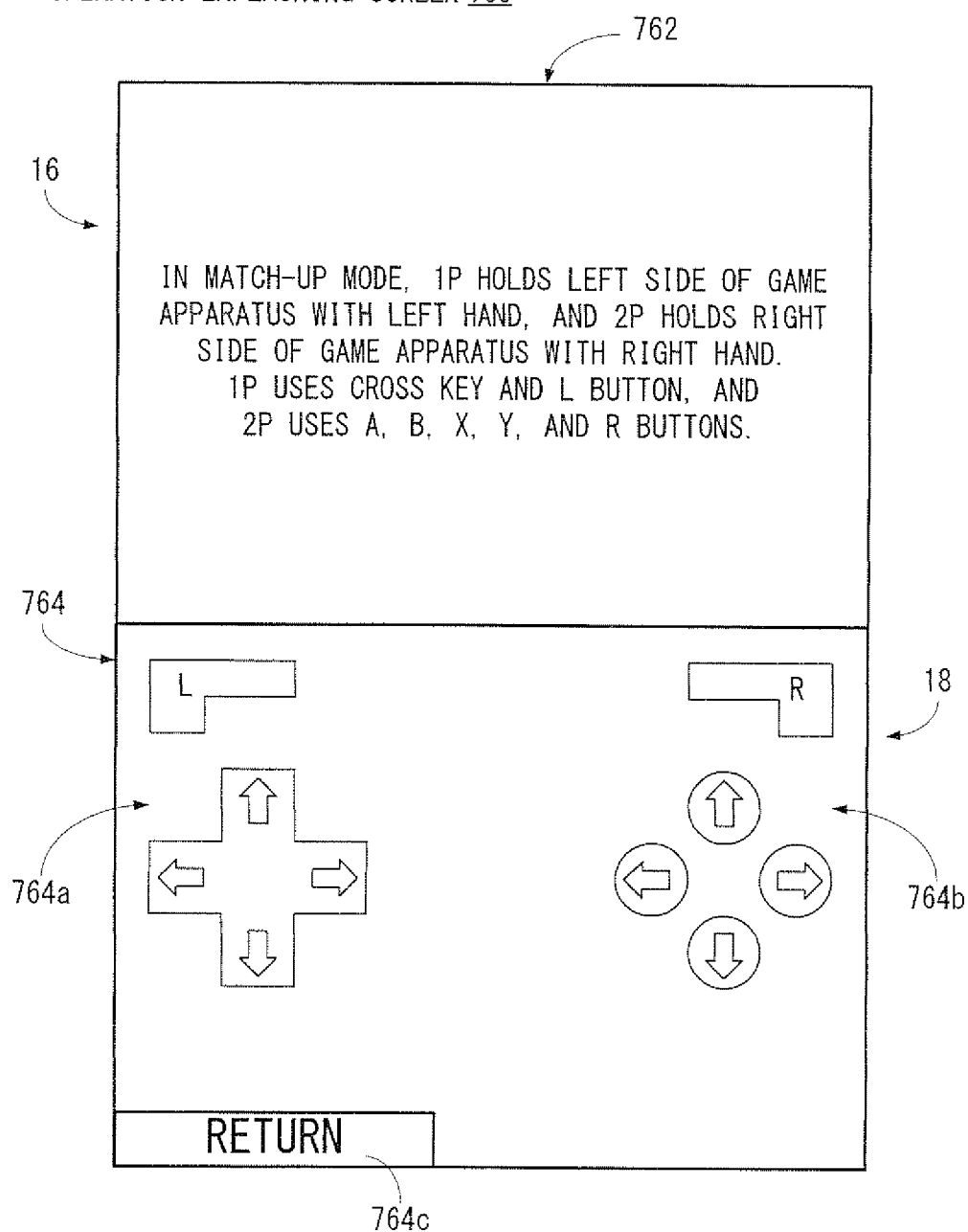
FIG. 19 is an illustrative view showing an example of an operation explaining screen to be displayed on the first LCD and the second LCD of the game apparatus shown in FIG. 4.

When the two-player game is started, an operation explaining screen 760 shown in FIG. 19 is displayed on the first LCD 16 and the second LCD 18. On the operation explaining screen 760, an upper screen 762 is displayed on the first LCD 16, and a lower screen 764 is displayed on the second LCD 18. On the upper screen 762, a message to say that the first player (1P) holds the left side of the game apparatus 10 with the left hand, and the second player (2P) holds the right side of the game apparatus 10 with the right hand, and explanations for the operation button (20a-20e, 20i, 20j) to be used by each player are displayed. It should be noted that in place of displaying the aforementioned message, a drawing in which two players hold the game apparatus 10 may be displayed.

On the lower screen 764, an image 764a as to the operation button (20a, 20i) to be utilized by the 1P and an image 764b as to the operation button (20b, 20c, 20d, 20e, 20j) to be utilized by the 2P are displayed. That is, in the two-player game, the 1P uses the cross key 20a as a direction instructing button, and uses the L button 20i as an attack button. On the other hand, the 2P uses the A button 20b, the B button 20c, the X button 20e and the Y button 20d as direction instructing buttons, and uses the R button 20j as an attack button. Here, the A button 20b used by the 2P is the downward button, the B button 20c used by the 2P is the right direction button, the X button 20e used by the 2P is the left direction button, and the Y button 20d used by the 2P is the upward button. Furthermore, at the lower left corner of the lower screen 764, a button image 764c is provided. When the button image 764c is turned on, the screen returns to the game menu screen.

When the area except for the button image 764e of the lower screen 764 on the operation explaining screen 760 is touched, or when the A button 20b is turned on, it is determined that the players (1P, 2P) read the message displayed on the upper screen 762 and the operation explanation, a character selecting screen (for two players) not shown is displayed on the first LCD 16 and the second LCD 18. Although detailed explanation is omitted, as to the two-player game, a character selecting screen (for two players) similar to the character selecting screen (for one player) 700 shown in FIG. 16 is displayed, and the 1P player character and the 2P player character are selected in order.

When the player characters 1P and 2P are selected (decided), a stage selecting screen (for two players) not shown is displayed on the first LCD 16 and the second LCD 18. Here, the stage selecting screen (for two players) is approximately the same as the stage selecting screen (for one player) 720 shown in FIG. 17.

Figure 20:
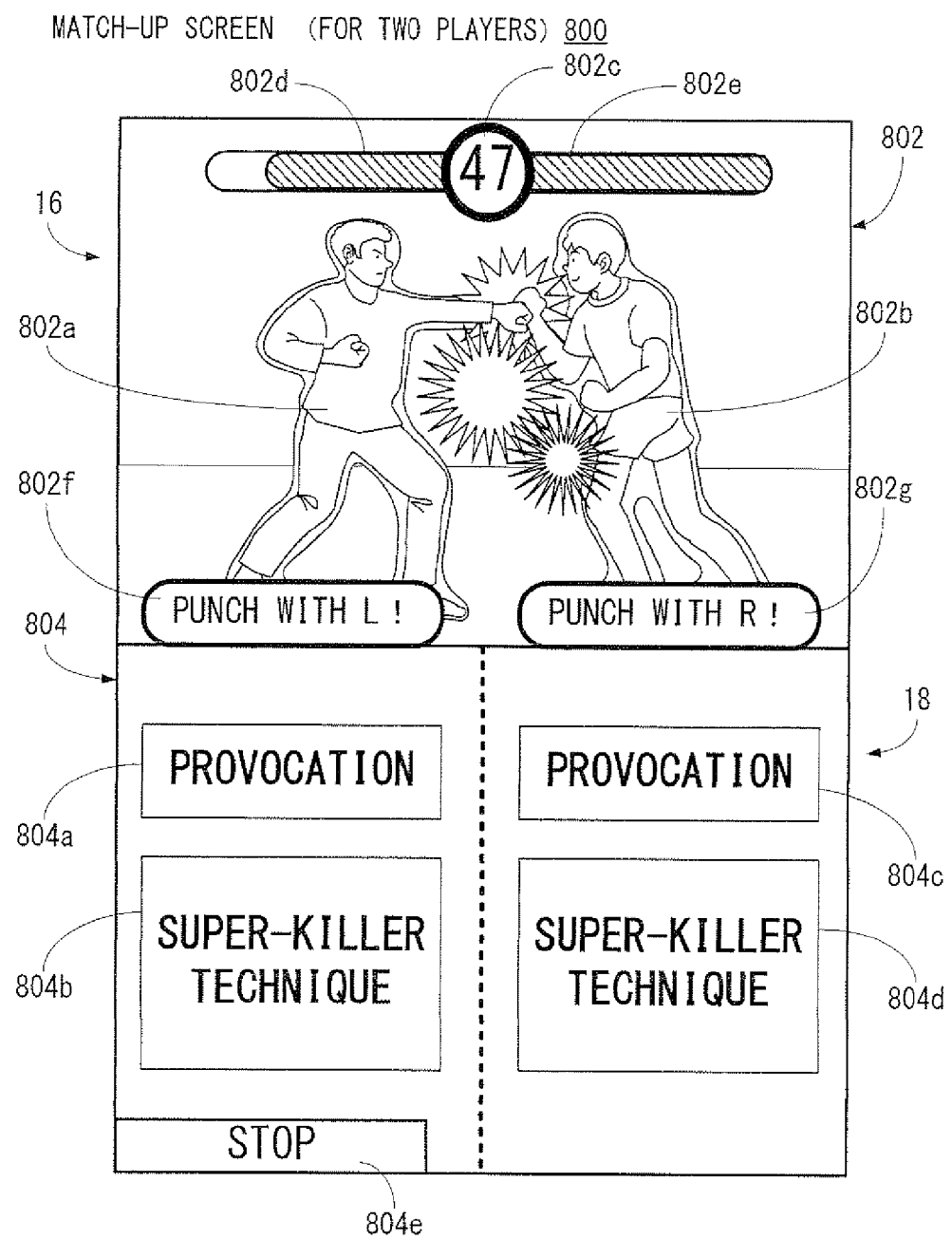
FIG. 20 is an illustrative view showing an example of a match-up screen (for two players) to be displayed on the first LCD and the second LCD of the game apparatus shown in FIG. 4.

When the stage background is selected, a match-up screen 800 shown in FIG. 20 is displayed on the first LCD 16 and the second LCD 18. On the match-up screen 800, an upper screen 802 is displayed on the first LCD 16, and a lower screen 804 is displayed on the second LCD 18. On the upper screen 802, a 1P player character 802a and a 2P player character 802b are displayed at approximately the center thereof. Here, at the beginning the match-up screen 800 being displayed, the 1P player character 802a and the 2P player character 802b are displayed by using the fighting stance pose images. Furthermore, at the upper end of the upper screen 802, a display area 802c, a display area 802d and a display area 802e are provided. In the display area 802c, a remaining time of the match-up game is displayed. In the display area 802d, a physical strength value of the 1P player character 802a is displayed by a bar. In the display area 802e, a physical strength value of the 2P player character 802b is displayed by a bar. Furthermore, at the lower end of the upper screen 802, a display area 802f and a display area 802g are provided. In the display area 802f, a content of the attack to be performed by the 1P player character 802a by turning the attack button (L button 20i) on is displayed. In the display area 802g, a content of the attack to be performed by the 2P player character 802b by turning the attack button (R button 20j) on is displayed.

On the left side of the lower screen 804, a button image 804a and a button image 804b are provided, and on the right side thereof, a button image 804c and a button image 804d are provided. Furthermore, on the lower screen 804, at the lower left corner, a button image 804e is provided. The button image 804a and button image 804b are used by the 1P whereas the button image 804c and the button image 804d are used by the 2P. When the button image 804a is turned on, the 1P player character 802a gives provocation to the 2P player character 802b. When the button image 804b is turned on, the 1P player character 802a puts out a super-killer technique. Alternatively, when the button image 804c is turned on, the 2P player character 802b gives provocation to the 1P player character 802a. When the button image 804d is turned on, the 2P player character 802b puts out a super-killer technique. The processing of giving provocation and putting out the killer technique are the same as those of the one-player game. Furthermore, when the button image 804e is turned on, the screen returns to the game menu screen.

The two-player game is explained below. In the one-player game, the computer (CPU 50) controls the enemy character 742b whereas in the two-player game, the player character 802b corresponding to the enemy character 742b is merely operated (controlled) by the 2P, so that redundant content is omitted and briefly explained.

As described above, in the two-player game, the 1P uses the cross key 20a the L button 20i, and the 2P uses the A button 20b, the B button 20c, the X button 20e, the Y button 20d and the R button 20j. Accordingly, the 1P in the two-player game is the same as that in the one-player game except that the 1P uses the L button 20i as an attack button. Furthermore, the 2P uses the A button 20b, the B button 20c, the X button 20e, and the Y button 20d as a direction instructing button, and uses the R button 20j as an attack button. The 2P player character 802b is the same as the 1P player character except for that its orientation is directed to left, and this is true for the operating method. That is, as to the 2P player character 802b, moving to the left means advancing, and moving to the right means going back.

Furthermore, during the game, similar to the one-player game, respective pose images according to the motion data corresponding to the motions of the player characters 802a, 802b are displayed. At this time, image data of a pose image as to each player characters 802a, 802b is utilized. When the pose image is updated, the voice corresponding to the pose image is output as necessary. In addition, when the 1P player character 802a makes an attack, hit judging processing as to the attack is executed, when the 2P player character 802b makes an attack, hit judging processing as to the attack is executed. In a case that the attack is hit, a physical strength value of the attacked player characters 802a or 802b is subtracted. For example, depending on the kind of the attacks, the magnitude of the physical strength value to be subtracted is different. It should be noted that similar to the one-player game, the pose image displaying, the voice outputting, and the hit judging processing are executed on the basis of the motion data.

In the two-player game, when the remaining time is lost, or when the physical strength value of any one of the player characters 802a, 802b is equal to or less than 0, the game is over. When the game becomes over, a match-up result screen not shown is displayed on the first LCD 16 and the second LCD 18. For example, on the match-up result screen, the victory or defeat of the match-up game, etc. is displayed.

Figure 21:
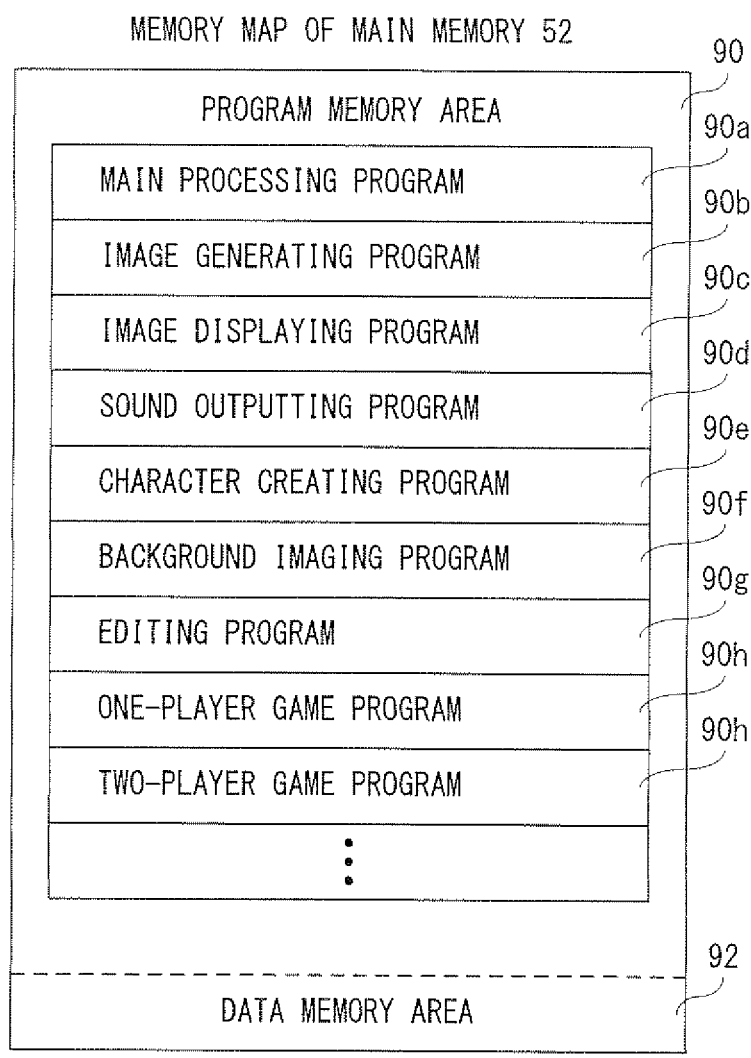
FIG. 21 is an illustrative view showing an example of a memory map of a main memory shown in FIG. 3.

FIG. 21 is an illustrative view showing a memory map of the main memory 52 shown in FIG. 3. As shown in FIG. 21, the main memory 52 includes a program memory area 90 and a data memory area 92. In the program memory area 90, the game program of the virtual game of this embodiment is stored, and the game program is made up of a main processing program 90a, an image generating program 90b, an image displaying program 90c, a sound outputting program 90d, a character creating program 90e, a background imaging program 90f, an editing program 90g, a one-player game program 90h, a two-player game program 90i, etc.

The main processing program 90a is a program for processing a main routine of the virtual game of this embodiment. The image generating program 90b is a program for generating a game image by using image data (92d, 92e, 92f, 920b, etc.) described later. The image displaying program 90c is a program for displaying the game image generated according to the image generating program 90b on the first LCD 16 and the second LCD 18 as game screens (200, 220, 240, 260, 280, 300, 320, 400, 500, 520, 540, 700, 720, 740, 760, 800, etc.). The sound outputting program 90d is a program for outputting sound necessary for the game, such as voices or onomatopoeic sounds of the player character, sound effect and game music (BGM) by using sound (voice) data (920c, etc.) from the speaker.

The character creating program 90d is a program for executing the character creating processing. In this embodiment, the character creating program 90d creates character data 92g (including image data, audio data, attribute data) described later. The background imaging program 90e is a program for imaging a stage background. The editing program 90g is a program for converting or modifying the created character data 92g.

The one-player game program 90h is a program for processing a main routine as to the one-player game. The two-player game program 90i is a program for processing a main routine as to the two-player game.

Although illustration is omitted, in the program memory area 90, a backup program, etc. is stored. The backup program is a program for saving (storing) the game data (proceeding data, result data) in the memory card 26 and the memory for saved data 56.

Figure 22:
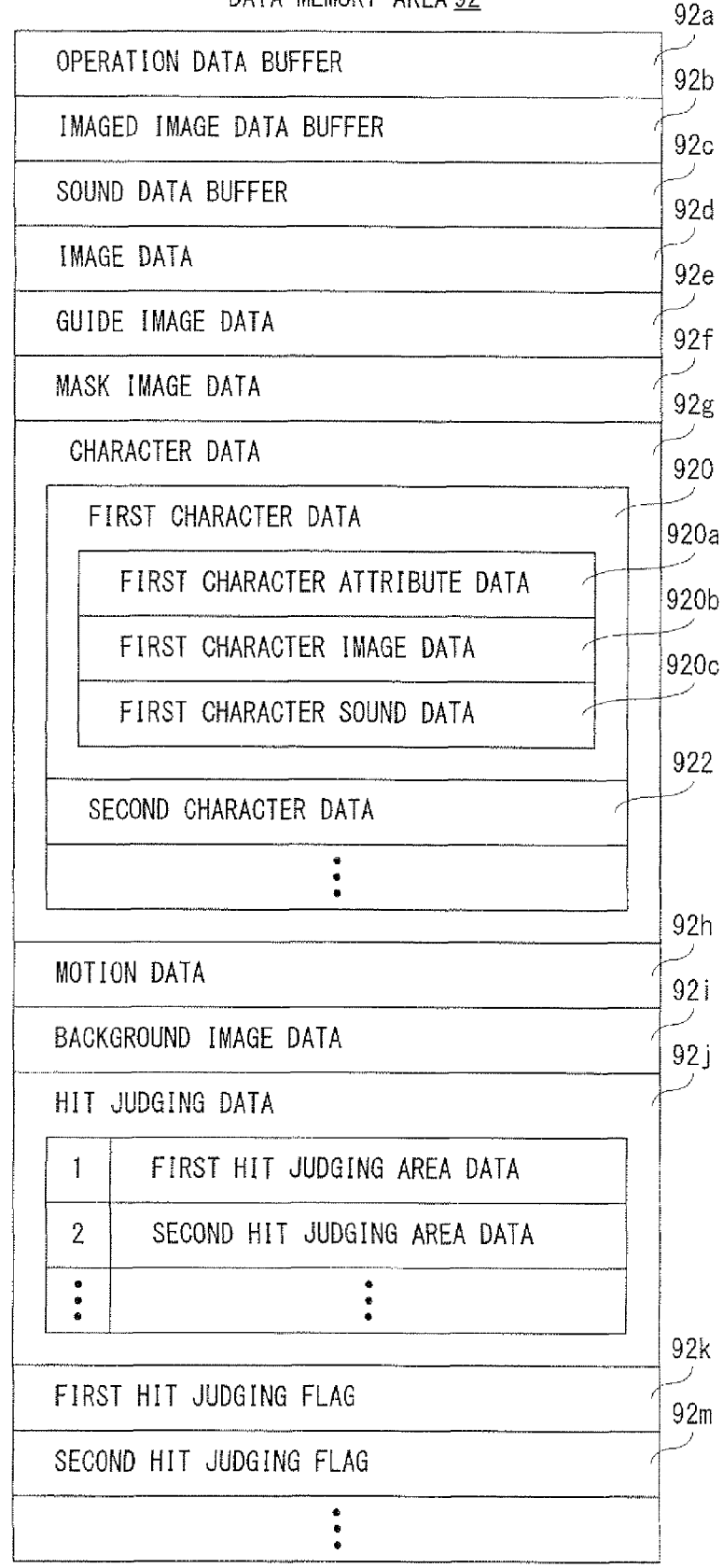
FIG. 22 is an illustrative view showing a detailed content of a data memory area shown in FIG. 21.

As shown in FIG. 22, in the data memory area 92, an operation data buffer 92a, an imaged image data buffer 92b and a sound data buffer 92c are provided. Furthermore, in the data memory area 92, image data 92d, guide image data 92e, mask image data 92f, character data 92g, motion data 92h, background image data 92i and hit judging data 92j are stored. In addition, in the data memory area 92, a first hit judging flag 92k and a second hit judging flag 92m are provide.

The operation data buffer 92a stores (temporarily stores) operation data indicating an input state (whether pushed or not) as to each operation button 20a-20k and touch position data from the touch panel 22. The imaged image data buffer 92b stores (temporarily stores) image data corresponding to the imaged image imaged by the cameras 32, 34. The sound data buffer 92c stores (temporarily stores) audio data corresponding to the voice input through the microphone 84.

The image data 92d is polygon data and texture data for creating game images. The guide image data 92e is data for displaying the above-described guide images (202a, 222a, 242a, 262a, 282a, 302a, 322a, 402a, 502a, 522a, 542a). The mask image data 92f is data as to the mask image (mask image for imaging) being made up of the guide image of each imaging screen, and data as to the mask image (mask image for creating a pose image) for cutting out each pose image from the image obtained by performing predetermined imaging processing (trimming and thinning-out processing) on imaged image.

The character data 92g is data (image data, audio data, and attribute data) as to the character created according to the character creating program 90d by the player. For example, the character data 92g is stored for every created character, and includes first character data 920, second character data 922, . . . . It should be noted that the character data of the character generated in advance by the programmer or the developer is also included. The first character data 920 includes first character attribute data 920a, first character image data 920b, and first character sound data 920c. The first character attribute data 920a is data as to an attribute (name and title) of the first character.

The first character image data 920b is image data of each pose image created from the imaged image in the character (first character) creating processing, and as shown in FIG. 23(A), the data of the pose image (first image data, second image data, . . . , i-th image data) is stored by being brought into correspondence with the index number. For example, the index number corresponds to an imaging order of the pose images, the face images, etc. However, there is no need of being restricted thereto, and it is only necessary to specify the kind of the image by utilizing the identifying information such as index numbers.

Furthermore, the first character sound data $920c$ is data as to each voice recorded in the character (first character) creating processing, and as shown in FIG. 23(B), voice data (first recording data, second recording data, . . . , j-th recording data) is stored by being brought into correspondence with the index numbers. For example, the index numbers correspond to the order of recording the voices. However, there is no need of being restricted thereto, and the kind of the voice may be specified by using identification information such as index numbers.

Here, the second character data $922$, . . . is similar to the first character data $920$, so that illustrations and detailed explanations are omitted.

The motion data $92h$ includes motion data as to each motion to be executed during the game by player character ($742a$, $802a$, $802b$, etc.), and in each motion data, the index number of the image data, the index number of the audio data and the index number of the hit judging area data are described by being brought into correspondence with the number of frames. Here, the enemy character ($742b$, etc.) also executes each motion according to the motion data. For example, in FIG. 23(C), one example of the motion data $92h$ as to the punching motion is shown. Referring to FIG. 23(C), as described above, the punching motion is executed by 16 frames, for example, and in the first frame, the index number of the fighting stance pose image is described and the index number of the hit judging area set to the fighting stance pose is described. Here, in the first frame, "null" is described as an index number of the voice. That is, in the first frame, the voice is not output. Next, in the eighth frame, the index number of the punching pose image, the index number of the voice in punching, and the index number of the hit judging area which are set to the punching pose are described. Then, in the sixteenth frame, the index number of the fighting stance pose image and the index number of the hit judging area of the fighting stance pose are described, and "null" is described as an index number of the voice. Here, in the eighth frame, the index number of the hit judging area when the player character attacks, and the index number of the hit judging area when the player character is attacked.

Returning to FIG. 22, the background image data $92i$ is image data corresponding to the imaged image as to the stage background imaged by the player. In this embodiment, up to eight stage backgrounds can be imaged, and the image data corresponding to the imaged image of each stage background is stored. The hit judging data $92j$ is data for judging the hitting during execution of the battle game and the match-up game. The hit judging data $92j$ is prepared in plurality kinds depending on the set pose image and timing. Accordingly, in the hit judging data $92j$, first hit judging area data, second hit judging area data, . . . are described in correspondence with the index number. The index number is described in the above-described motion data. Furthermore, the index numbers are given for identifying each hit judging area. Thus, in place of the index numbers, other identification information may be described.

As shown in FIG. 24 and FIG. 25, for example, the hit judging area to be set in correspondence with each pose image is shown. As described above, in the pose image in which the player character makes an attack (the punching pose image and the kicking pose image, here), in order to judge whether or not an attack by the opponent hits as well as whether or not its own attack hits the opponent, the hit judging area when the player character attacks and the hit judging area when the player character is attacked are set. Here, the hit judging area when the player character attacks and the hit judging area when the player character is attacked are not simultaneously set, but are selectively set according to the hit judging.

For example, as shown in FIG. 24(A), as to the punching pose image, in a case that the player character is attacked, a hit judging area $930a$ is set, and in a case that the player character attacks (punches), a hit judging area $930b$ is set. Furthermore, as shown in FIG. 24(B), as to the fighting stance pose image, in a case that the player character is attacked, a hit judging area $932$ is set. In addition, as shown in FIG. 24(C), as to the kicking pose image, in a case that the player character is attacked, a hit judging area $934a$ is set, and in a case that the player character attacks (kicks), a hit judging area $934b$ is set. Moreover, as shown in FIG. 24(D), as to the walking pose image, in a case that the player character is attacked, a hit judging area $936$ is set.

Furthermore, as shown in FIG. 25(A), as to the killer technique pose image, in a case that the player character is attacked, a hit judging area $938$ is set. Here, if the killer technique is put out, a so called ammunition flies toward the opponent (enemy character or the opponent player character), so that as to the special weapon pose image, the hit judging area when the player character attacks need not to be set. In addition, as shown in FIG. 25(B), as to the sitting pose image, in a case that player character is attacked, a hit judging area $940$ is set. In addition, as shown in FIG. 25(C), as to the jumping pose image, in a case that the player character is attacked, a hit judging area $942$ is set.

Returning to FIG. 24(A), the hit judging area $930a$ and the hit judging area $930b$ each is set in a predetermined position and a size (shape) corresponding to a pose image. Accordingly, in this embodiment, the positions of the vertex Q1 and the vertex Q2 (horizontal length, vertical length) of the hit judging area $930a$ when the player character is attacked with the center or the barycenter P of the pose image taken as a reference are stored. Similarly, the positions of the vertex R1 and the vertex R2 (horizontal length, vertical length) of the hit judging area $930b$ when the player character attacks with the center or the barycenter P of the pose image taken as a reference are stored. That is, the data as to the horizontal length (distance) and the vertical distance with respect to the center or the barycenter P of the pose image correspond to the above-described hit judging area data.

Although illustration is omitted, this holds true for the hit judging areas $932$, $934a$, $934b$, $936$, $938$, $940$, and $942$ of the other pose images. It should be noted that hit judging areas shown in FIG. 24 and FIG. 25 is one example, and the hit judging area indicated by the motion data is set by being correspondence with the pose image indicated by the motion data.

Furthermore, in the example shown in FIG. 24 and FIG. 25, the hit judging area is set by a rectangle, and the distances between the vertexes being pairs of opposite angles and the barycenter of the pose image are stored, but there is no need of being restricted thereto. For example, a distance between each vertex of the rectangle (quadrangle) hit judging area and the barycenter of the pose image may be stored. Furthermore, in a case that the shape of the hit judging area is not fixed, the distance between the center of the hit judging area and the barycenter of the pose image, the shape of the hit judging area, and the size of the hit judging area may be stored.

Returning to FIG. 22, the first hit judging flag $92k$ is a flag for judging whether or not the hit judging processing is to be executed when the 1P (the player of the one-player game or the first player of the two-player game) player character makes an attack. The first hit judging flag $92k$ is made up of one bit register. When the first hit judging flag 92k is established (turned on), a data value "1" is set to the register, and when the first hit judging flag 92k flag is not established (turned off), a data value "0" is set. Here, the first hit judging flag 92k is turned on in a case that the 1P player character makes an attack, and it is turned off in a case that the 1P player does not make an attack.

The second hit judging flag 92m is a flag for judging whether or not the hit judging processing is to be executed when the 2P (the computer (CPU 50) of the one-player game or the second player of the two-player game) player character (enemy character of the one-player game) makes an attack. In other words, it is a flag for judging whether or not the hit judging processing is to be executed in a case that the 1P player character is attacked. The second hit judging flag 92m is made up of one bit register. When the second hit judging flag 92m is turned on, the data value "1" is set to the register, and when the second hit judging flag 92m is turned off, the data value "0" is set to the register. Here, the second hit judging flag 92m is turned on in a case that the 2P player character makes an attack, and it is turned off in a case that the 2P player does not make an attack.

Although illustration is omitted, in the data memory area 92, other data necessary for the game is also stored, and other flags and counters (timers) necessary for the game are also provided.

Figure 26:
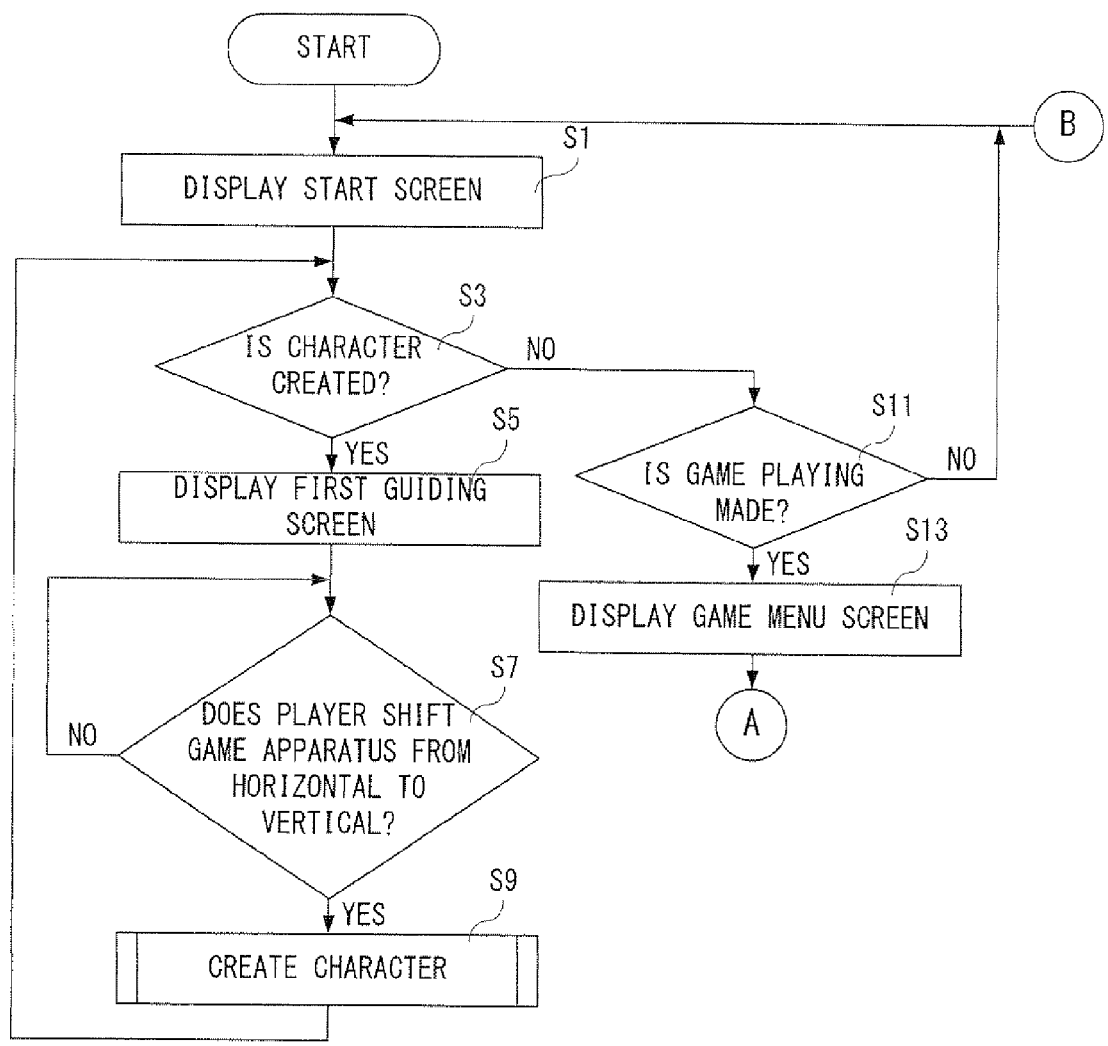
Figure 27:
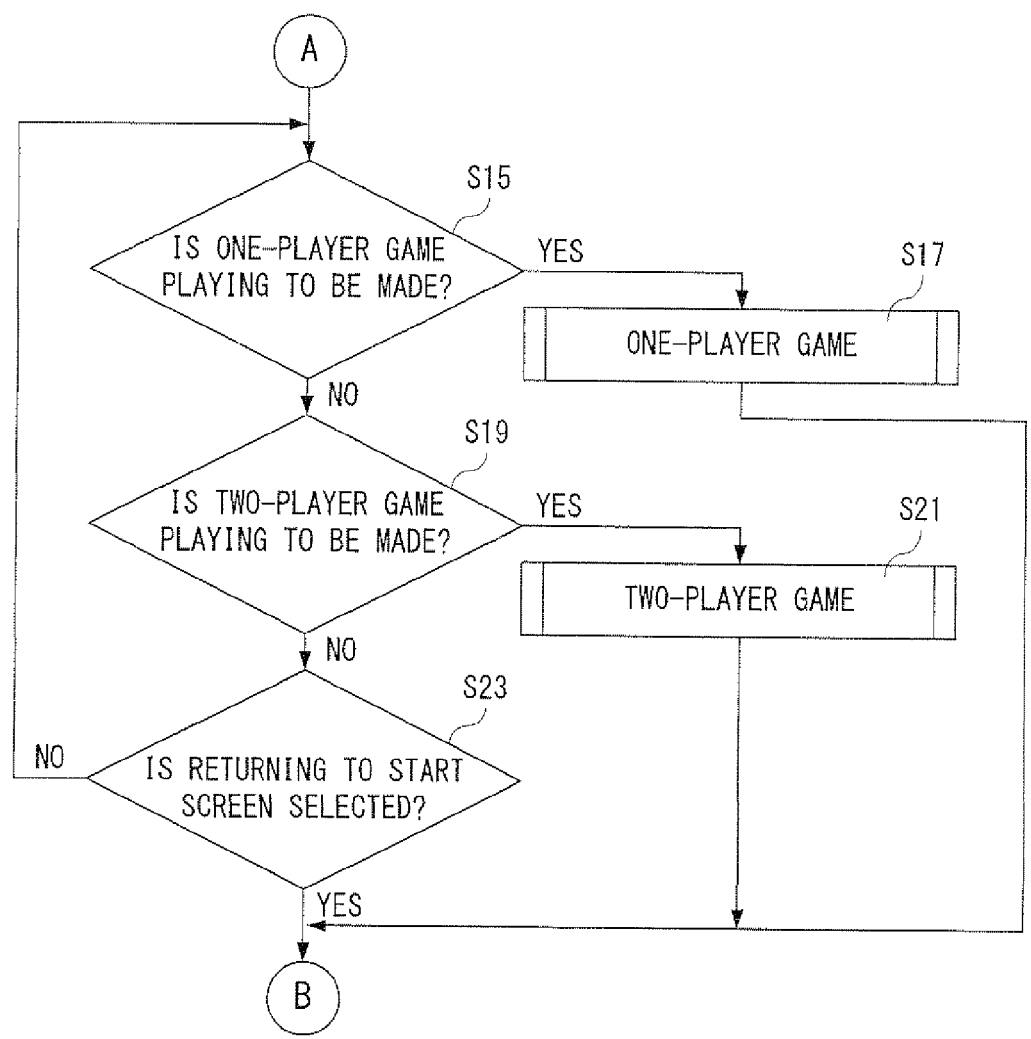
FIG. 27 is a flowchart showing another part of the entire processing by the CPU shown in FIG. 3, and being sequel to FIG. 26.

FIG. 26 and FIG. 27 shows a flowchart of entire processing by the CPU 50 shown in FIG. 3. As shown in FIG. 26, when starting the entire processing, the CPU 50 displays a start screen (not illustrated) on the first LCD 16 and the second LCD 18 in a step S1. In a next step S3, it is determined whether or not a character is to be created. That is, the CPU 50 determines whether or not the character creating processing is selected on the start screen.

Although illustration is omitted, before the entire processing is started, initialization processing is executed to load the game programs and various data into the main memory 52. Furthermore, the first hit judging flag 92k and the second hit judging flag 92m are turned off.

If "YES" in the step S3, that is, if the character creating processing is selected, it is determined that the character is created, and the first guiding screen (not illustrated) for prompting the player to shift the game apparatus 10 from horizontal to vertical is displayed on the first LCD 16 and the second LCD 18 in a step S5. In a next step S7, it is determined whether or not the player shifts the game apparatus 10 from horizontal to vertical. That is, the CPU 50 determines whether or not the button image for notifying that the game apparatus 10 is shifted from horizontal to vertical is turned on.

If "NO" in the step S7, that is, if the game apparatus 10 is not shifted from horizontal to vertical, the process returns to the step S7 as it is. On the other hand, if "YES" in the step S7, that is, if the game apparatus 10 is shifted from horizontal to vertical, character creating processing (see FIG. 28-FIG. 33) described later is executed in a step S9, and the process returns to the step S3.

Furthermore, if "NO" in the step S3, that is, if no character is created, it is determined whether or not game playing is made (plays the battle game or the match-up game) in a step S11. If "NO" in the step S11, that is, if game playing is not made, the process returns to the step S1 as it is.

On the other hand, if "YES" in the step S11, that is, if game playing is made, a game menu screen is displayed on the first LCD 16 and the second LCD 18 in a step S13. Succeedingly, in a step S15 shown in FIG. 27, it is determined whether or not one-player-game playing is to be made. That is, the CPU 50 determines whether or not a one-player game is selected on the game menu screen.

If "YES" in the step S15, that is, if the one-player-game playing is selected, one-player game processing (see FIG. 34-FIG. 36) described later is executed in a step S17, and then, the process returns to the step S1 shown in FIG. 26. On the other hand, if "NO" in the step S15, that is, if not the one-player-game playing, it is determined whether or not two-player-game playing is to be made in a step S19. That is, the CPU 50 determines whether or not the two-player game is selected on the game menu screen.

If "YES" in the step S19, that is, if the two-player-game playing, two-player game processing (see FIG. 37-FIG. 41) described later is executed in a step S21, and the process returns to the step S1. On the other hand, if "NO" in the step S19, that is, if not the two-player-game playing, it is determined whether or not to return to the start screen in a step S23. That is, the CPU 50 determines whether or not returning to the start screen is selected on the game menu screen.

If "NO" in the step S23, that is, if returning to the start screen is not selected, it is determined that the game menu is being selected, and the process returns to the step S15. On the other hand, if "YES" in the step S23, that is, if returning to the start screen is selected, the process returns to the step S1.

Figure 28:
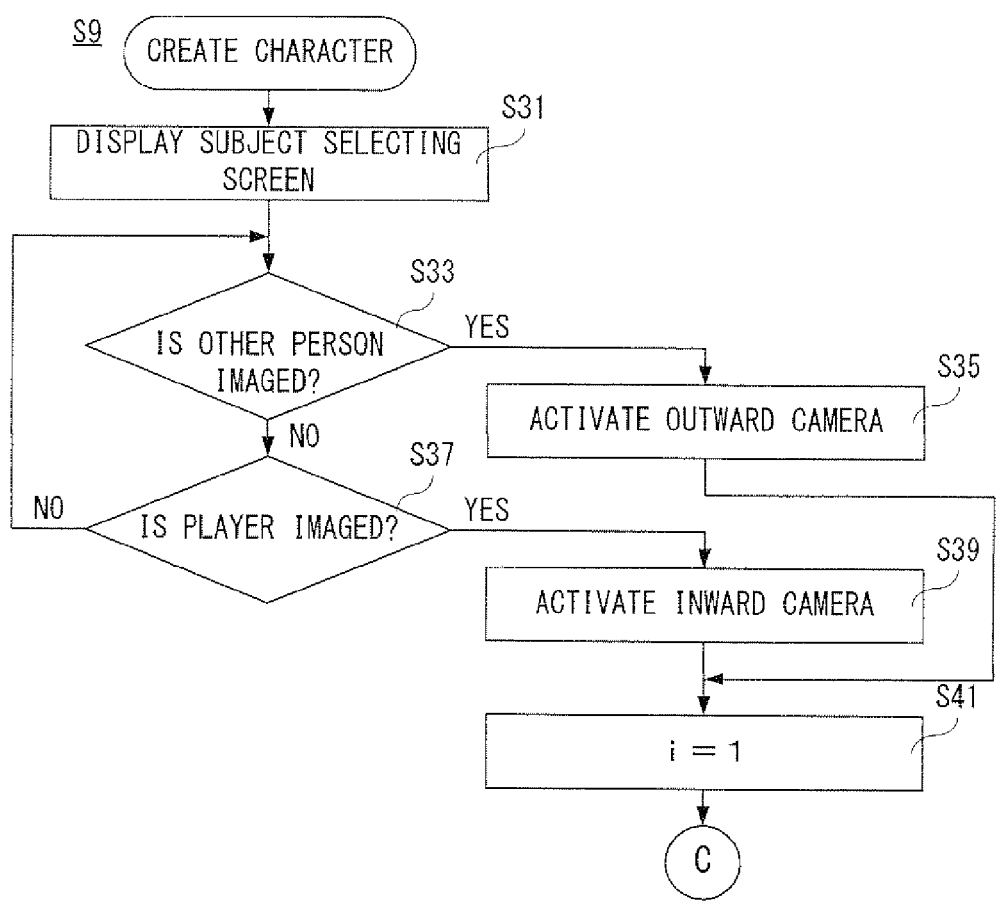
FIG. 28 is a flowchart showing a part of character creating processing by the CPU shown in FIG. 3.

FIG. 28-FIG. 33 is a flowchart of the character creating processing in the step S9 shown in FIG. 26. As shown in FIG. 28, when starting the character creating processing, the CPU 50 displays a subject selecting screen (not illustrated) on the first LCD 16 and the second LCD 18 in a step S31. In a succeeding step S33, it is determined whether or not someone (other person) is to be imaged. If "YES" in the step S33, that is, if other person is imaged, the outward camera 34 is activated in a step S35, and the process proceeds to a step S41. On the other hand, if "NO" in the step S33, that is, if other person is not imaged, it is determined whether or not the player himself or herself is to be imaged in a step S37.

If "YES" in the step S37, that is, if the player himself or herself is imaged, the inward camera 32 is activated in a step S39, and the process proceeds to the step S41. On the other hand, if "NO" in the step S37, that is, if the player himself or herself is not imaged, it is determined that the subject is being selected, and the process returns to the step S33.

Figure 29:
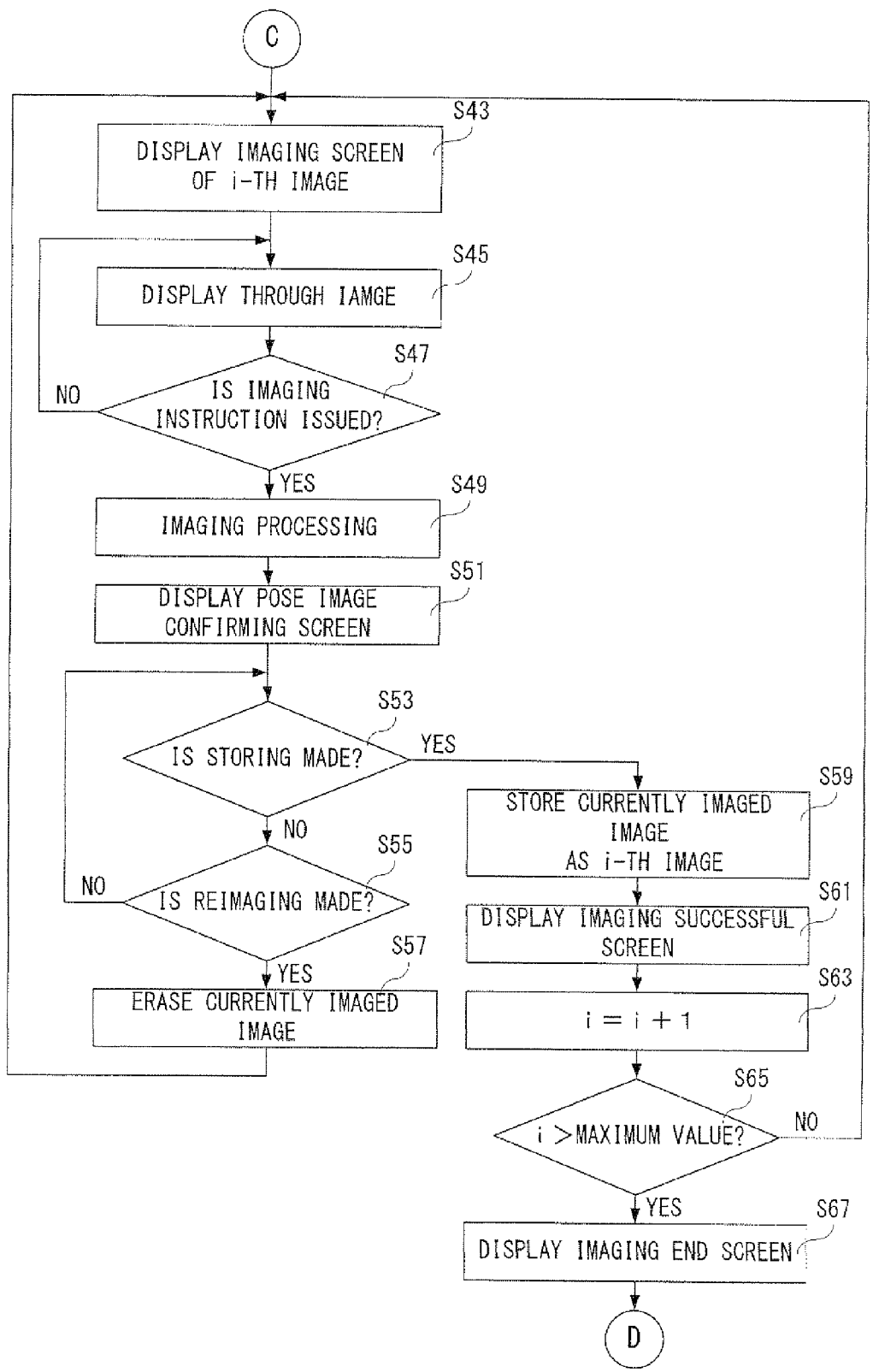
FIG. 29 is a flowchart showing a second part of the character creating processing by the CPU shown in FIG. 3, and being sequel to FIG. 28.
Figure 30:
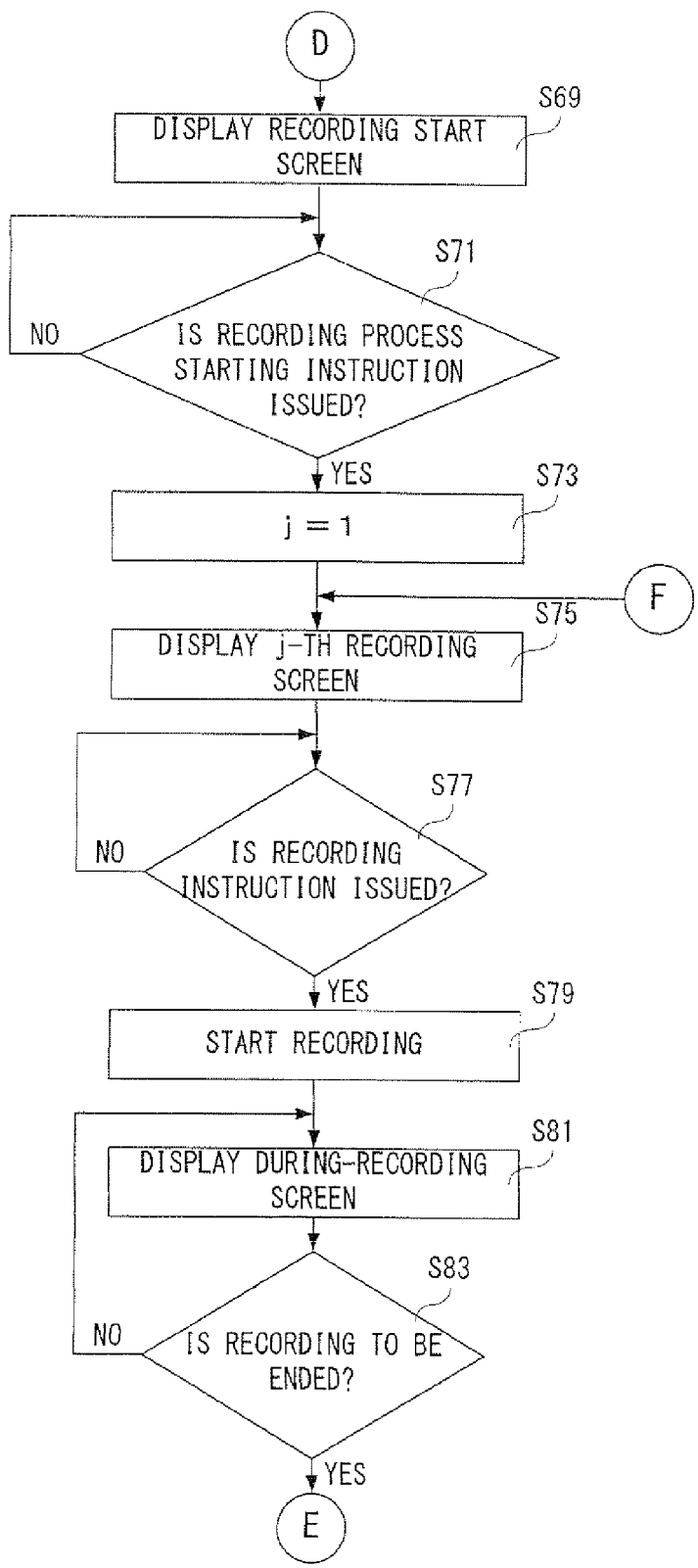
FIG. 30 is a flowchart showing a third part of the character creating processing by the CPU shown in FIG. 3, and being sequel to FIG. 29.
Figure 31:
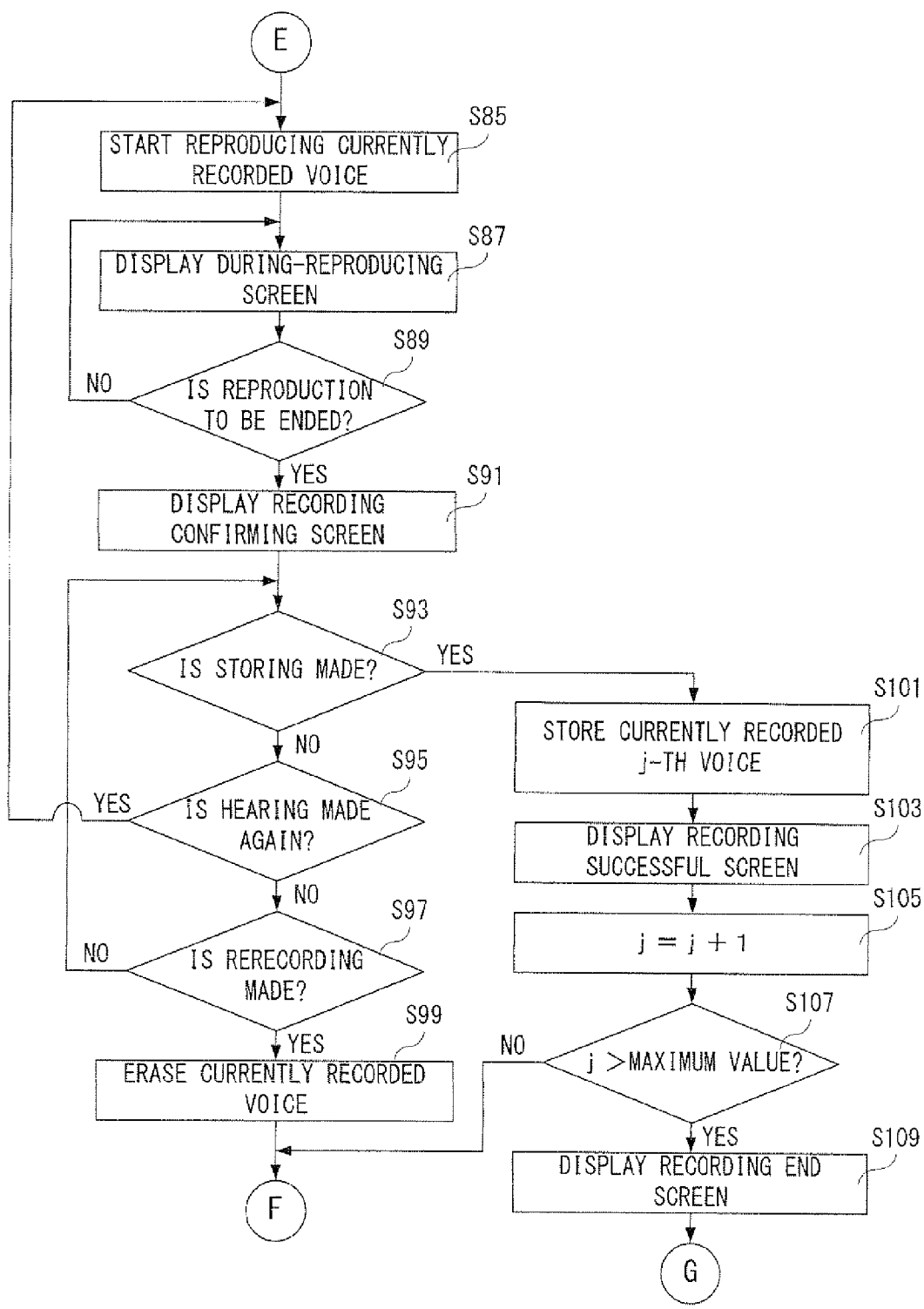
FIG. 31 is a flowchart showing a fourth part of the character creating processing by the CPU shown in FIG. 3, and being sequel to FIG. 30.
Figure 32:
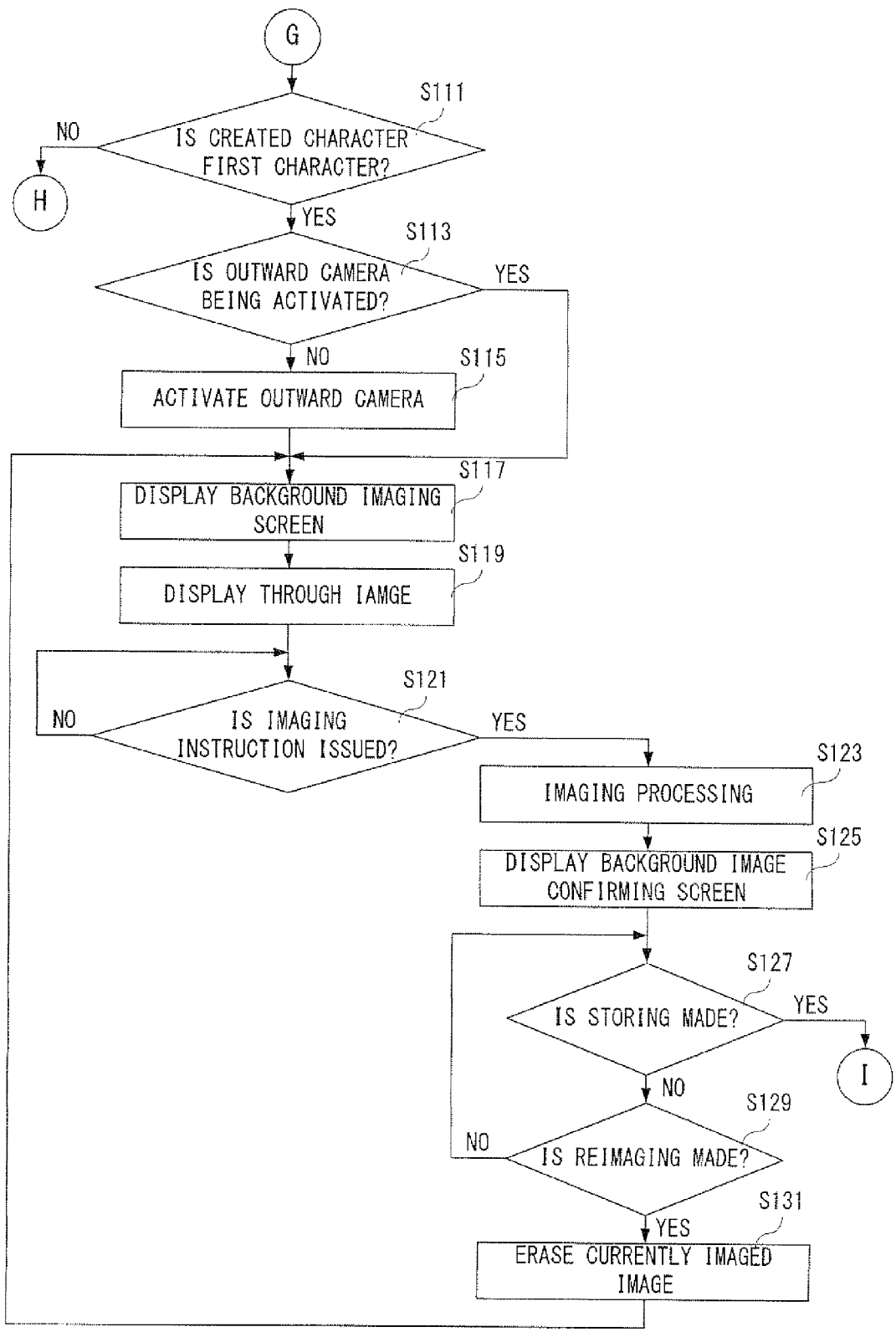
FIG. 32 is a flowchart showing a fifth part of the character creating processing by the CPU shown in FIG. 3, and being sequel to FIG. 31.

In the step S41, a variable i is initialized (i=1). The variable i is a variable for identifying an imaging order of a plurality of pose images, a plurality of face images and object images. As described above, the imaging order of the images, etc. is decided in advance. As shown in FIG. 29, in a next step S43, an imaging screen of the i-th image is displayed. For example, since at first time (i=1), an image as to a pose when a punch is struck is imaged as described above, a punching pose imaging screen 200 shown in FIG. 5(A) is displayed on the first LCD 16 and the second LCD 18 in the step S43.

In a next step S45, a through image is displayed. As described above, the first LCD 16 functions as a viewfinder, and in this embodiment, a through image is displayed at the back of the guide image (202a, 262a, 282a, 302a, 322a, etc.), and can be viewed through the cut-out portion (2020, 2620, 2820, 3020, 3220, etc.). Succeedingly, in a step S47, it is determined whether or not an imaging instruction is issued. That is, the CPU 50 determines whether or not the A button 20b is turned on, or whether or not the button image (204d, 264d, 284d, 304d, 324d, etc.) is turned on. If "NO" in the step S47, that is, if no imaging instruction is issued, the process returns to the step S45 as it is. Accordingly, the through image is updated. On the other hand, if "YES" in the step S47, that is, if an imaging instruction is issued, the imaging processing is executed in a step S49, and a pose image confirming screen (220) shown in FIG. 6(A) is displayed on the first LCD 16 and the second LCD 18 in a step S51. Here, in the step S49, a still image (imaged image) when an imaging instruction is issued is captured from the camera (32, 34), and image data corresponding to the imaged image is stored in the imaged image data buffer 92b.

Succeedingly, in a step S53, it is determined whether or not the pose image, the face image, or the object image (hereinafter referred to as "pose image or the like") is stored. That is, the CPU 50 determines whether or not the OK button (button image 224a) is turned on on the pose image confirming screen (220). If "NO" in the step S53, that is, if the OK button is not turned on, it is determined that the pose image or the like is not stored, and it is determined whether or not reimaging is made in a step S55. That is, the CPU 50 determines whether or not the reimaging button (button image 224b) is turned on on the pose image confirming screen (220). If "NO" in the step S55, that is, if the reimaging button is not turned on, it is determined whether the pose image is to be stored or reimaging is to be made is under consideration, and the process returns to the step S53. On the other hand, if "YES" in the step S55, that is, if the reimaging button is turned on, it is determined that reimaging is made, and in a step S57, the image data of the currently imaged image is erased from the imaged image data buffer 92b, and the process returns to the step S43.

Furthermore, if "YES" in the step S53, that is, if the OK button is turned on, it is determined that the pose image or the like is stored, and the currently imaged image is stored in the main memory 52 as the i-th pose image or the like in a step S59. Although illustration is omitted, as described above, the image data of the pose image is created by trimming the imaged image, performing thinning-out processing on the trimmed data, then cutting out the data with a mask image (mask image data 92f) in a predetermined pose, and is stored as the i-th image data of the character which is being created. In a next step S61, an imaging successful screen (240) shown in FIG. 7 is displayed on the first LCD 16 and the second LCD 18. In a succeeding step S63, the variable i is added by 1 (i=i+1). Then, in a step S65, it is determined whether or not the variable i is larger than a maximum value (13 in this embodiment). That is, the CPU 50 determines whether or not imaging of all the images (pose image, or the like) has been finished according to a predetermined order.

If "NO" in the step S65, that is, if the variable i is equal to or less than the maximum value, there is an image which has not yet been imaged, and the process returns to the step S43. That is, imaging processing of a next image is executed. On the other hand, if "YES" in the step S65, that is, if the variable i is larger than the maximum value, imaging of all the images has been finished, and an imaging end screen (not illustrated) is displayed on the first LCD 16 and the second LCD 18 in a step S67. Although illustration is omitted, when the button image on the right screen of the imaging end screen is turned on, that is, when it is notified that that the player confirms the end of imaging of all the images, a recording start screen (not illustrated) is displayed on the first LCD 16 and the second LCD 18 in a step S69 shown in FIG. 30.

In a next step S71, it is determined whether or not a recording process starting instruction is issued. That is, the CPU 50 determines whether or not the button image on the right screen of the recording start screen is turned on. If "NO" in the step S71, that is, if a record process starting instruction is not issued, the process returns to the step S71 as it is. On the other hand, if "YES" in the step S71, that is, if a record process starting instruction is issued, the variable j is initialized (j=1) in a step S73, and a recording screen (400) as to the j-th voice as shown in FIG. 12 is displayed on the first LCD 16 and the second LCD 18 in a step S75. As described above, the kind (content) of the voice to be recorded is decided in advance, and the recording order is also decided in advance. This recording order is counted by the variable j.

In a next step S77, it is determined whether or not a recording instruction is issued. That is, the CPU 50 determines whether or not the recording start button (button image 404d, etc.) is turned on. If "NO" in the step S77, that is, if a recording instruction is not issued, the process returns to the same step S77. On the other hand, if "YES" in the step S77, that is, if a recording instruction is issued, recording is started in a step S79. That is, the CPU 50 starts recording the audio data corresponding to the voice input through the microphone 84. Here, the audio data is stored in the sound data buffer 92c.

In a succeeding step S81, a during-recording screen (not illustrated) is displayed on the first LCD 16 and the second LCD 18. In a next step S83, it is determined whether recording is to be ended. That is, the CPU 50 determines whether or not a certain period of time (2 seconds in this embodiment) elapses from the start of recording.

If "NO" in the step S83, that is, if a certain period of time has not elapsed from the start of the recording, it is determined not to be a recording end, and the process returns to the step S81. Accordingly, the during-recording screen is updated. Here, the length of the bar indicating the recording time (recording length) displayed on the during-recording screen is mainly changed (lengthened) according to the elapse of time. On the other hand, if "YES" in the step S83, that is, if a certain period of time has elapsed from the start of recording, reproducing the (j-th) voice currently recorded is started in a step S85 shown in FIG. 31. In a next step S87, a during-reproducing screen (not illustrated) is displayed on the first LCD 16 and the second LCD 18. Successively, in a step S89, it is determined whether or not the reproduction is to be ended. That is, the CPU 50 determines whether or not all the audio data corresponding to the currently recorded voice is reproduced.

If "NO" in the step S89, that is, if reproducing the currently recorded audio data has not been finished, it is determined not to be the end of the reproduction, and the process returns to the step S87. Accordingly, the during-reproducing screen is updated. Here, the length of the bar indicating the reproducing time (the length of the voice) displayed on the during-reproducing screen mainly changes (lengthened) according to an elapse of time. On the other hand, if "YES" in the step S89, that is, if all the currently recorded audio data is reproduced, it is determined to be a reproduction end, and in a step S91, a recording confirming screen (not illustrated) is displayed on the first LCD 16 and the second LCD 18.

In a next step S93, it is determined whether or not the audio data corresponding to the currently recorded voice is to be stored. If "NO" in the step S93, that is, if the audio data corresponding to the currently recorded voice is not stored, it is determined whether or not the currently recorded voice is heard again in a step S95.

If "YES" in the step S95, that is, if the currently recorded voice is heard again, the process returns to the step S85. On the other hand, if "NO" in the step S95, that is, if the currently recorded voice is not heard again, it is determined whether or not rerecording is made in a step S97.

If "NO" in the step S97, it is determined that the player considers whether the currently recorded voice is to be stored, is to be rerecorded, or is to be heard again, and the process returns to the step S93. On the other hand, if "YES" in the step S97, that is, if the currently recorded voice is rerecorded, the audio data corresponding to the currently recorded voice is erased from the sound data buffer 92c in a step S99, and the process returns to the step S75 shown in FIG. 30.

Furthermore, if "YES" in the step S93, that is, if the audio data corresponding to the currently recorded voice is stored, the audio data corresponding to the currently recorded j-th voice is stored in the main memory 50 in a step S101. In a next step S103, a recording successful screen (not illustrated) is displayed on the first LCD 16 and the second LCD 18. Successively, in a step S105, the variable j is added by 1 (j=j+1). Then, in a step S107, it is determined whether or not the variable j is larger than a maximum value (10 in this embodiment). That is, the CPU 50 determines whether or not recording of all the voices is ended.

If "NO" in the step S107, that is, if the variable j is equal to or less than the maximum value, it is determined that there is a voice which has not yet been recorded, and the process returns to the step S75. On the other hand, if "YES" in the step S107, that is, if the variable j is larger than the maximum value, it is determined that recording of all the voices is ended, and in a step S109, a recording end screen (not illustrated) is displayed on the first LCD 16 and the second LCD 18.

Although illustration is omitted, when the button image displayed on the right screen of the recording end screen is turned on, a name and a title of the character are decided. When creating the character is ended, it is determined whether or not the created character is the first character in a step S111 shown in FIG. 32. If "NO" in the step S111, that is, if the created character is the second character onward, the process proceeds to a step S137 shown in FIG. 33 as it is. On the other hand, if "YES" in the step S111, that is, if the created character is the first character, it is determined that stage background imaging processing is executed, and it is determined whether or not the outward camera 34 is being activated in a step S113.

If "YES" in the step S113, that is, if the outward camera 34 is being activated, the process proceeds to a step S117 as it is. On the other hand, if "NO" in the step S113, that is, if the outward camera 34 is not being activated, the outward camera 34 is activated in a step S115, and the process proceeds to the step S117. Here, when the CPU 50 executes the processing in the step S115, if the inward camera 32 is activated, the inward camera 32 is stopped.

In the step S117, a background imaging screen 500 as shown in FIG. 13 is displayed on the first LCD 16 and the second LCD 18. In a next step S119, a through image is displayed. That is, at the back of the guide image 502a of the background imaging screen 500, the through image imaged by the outward camera 34 is displayed and can be viewed through the cut-out portion 5020. Succeedingly, in a step S121, it is determined whether or not an imaging instruction is issued. That is, the CPU 50 determines whether or not the A button 20b or the button image 504c is turned on. If "NO" in the step S121, that is, if neither of the A button 20b nor the button image 504c is turned on, it is determined whether the subject is being selected, the focus is matched, or the positioning of the guide line 5022 and the subject is being made, and the process returns to the same step S121.

On the other hand, if "YES" in the step S121, that is, if the A button 20b or the button image 504c is turned on, it is determined that an imaging instruction is issued, imaging processing is executed in a step S123, and a background image confirming screen 520 as shown in FIG. 14 is displayed on the first LCD 16 and the second LCD 18 in a step S125. Here, when the imaging processing is executed, the image data corresponding to the imaged image is stored in the imaged image data buffer 92b. In a next step S127, it is determined whether or not the image data corresponding to the imaged image is to be stored. That is, the CPU 50 determines whether or not the button image 524a is turned on.

Figure 33:
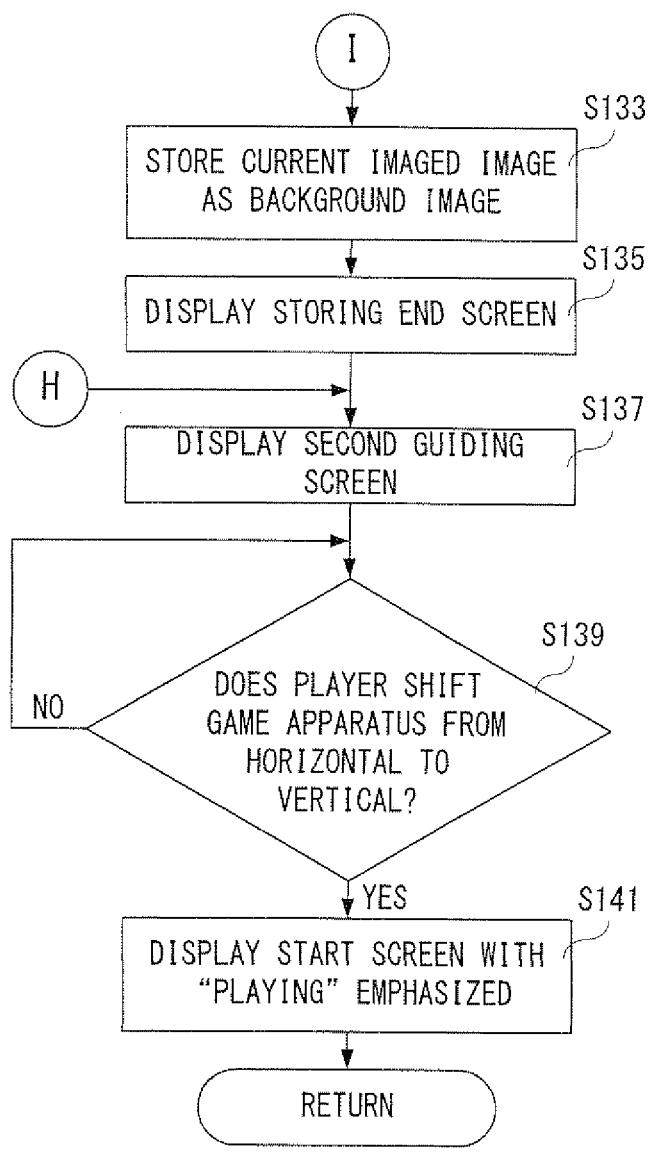
FIG. 33 is a flowchart showing a sixth part of the character creating processing by the CPU shown in FIG. 3, and being sequel to FIG. 32.

If "YES" in the step S127, that is, if the button image 524a is turned on, it is determined that the image data corresponding to the imaged image is stored, and the process proceeds to a step S133 shown in FIG. 33. On the other hand, if "NO" in the step S127, that is, if the button image 524a is not turned on, it is determined that the image data corresponding to the imaged image is not stored, and it is determined whether or not reimaging of the stage background is made in a step S129. That is, the CPU 50 determines whether or not the button image 524b is turned on.

If "NO" in the step S129, that is, if the button image 524b is not turned on, it is determined whether the current imaged image is to be stored or reimaging is made is under consideration, and the process returns to the step S127. On the other hand, if "YES" in the step S129, that is, if the button image 524b is turned on, reimaging the stage background is made, and in a step S131, the imaged data corresponding to the current imaged image is erased form the imaged image data buffer 92b, and the process returns to the step S117.

In the step S133 shown in FIG. 33, the imaged data corresponding to the current imaged image is stored as background image data 92i in the main memory 52. In a succeeding step S135, a storing end screen 540 as shown in FIG. 15 is displayed on the first LCD 16 and the second LCD 18. Thereafter, in the step S137, a second guiding screen (not illustrated) for prompting the player to shift the game apparatus 10 from vertical to horizontal is displayed on the first LCD 16 and the second LCD 18.

Then, in a step S139, it is determined whether or not the game apparatus 10 is shifted from vertical to horizontal. More specifically, the CPU 50 determines whether or not the button image displayed on the right screen of the second guiding screen is turned on. If "NO" in the step S139, that is, if the game apparatus 10 is not shifted from vertical to horizontal, the process returns to the same step S139. On the other hand, if "YES" in the step S139, that is, if the game apparatus 10 is shifted from vertical to horizontal, the start screen with the button image describing "playing" emphasized is displayed in a step S141, and the process returns to the entire processing.

Figure 34:
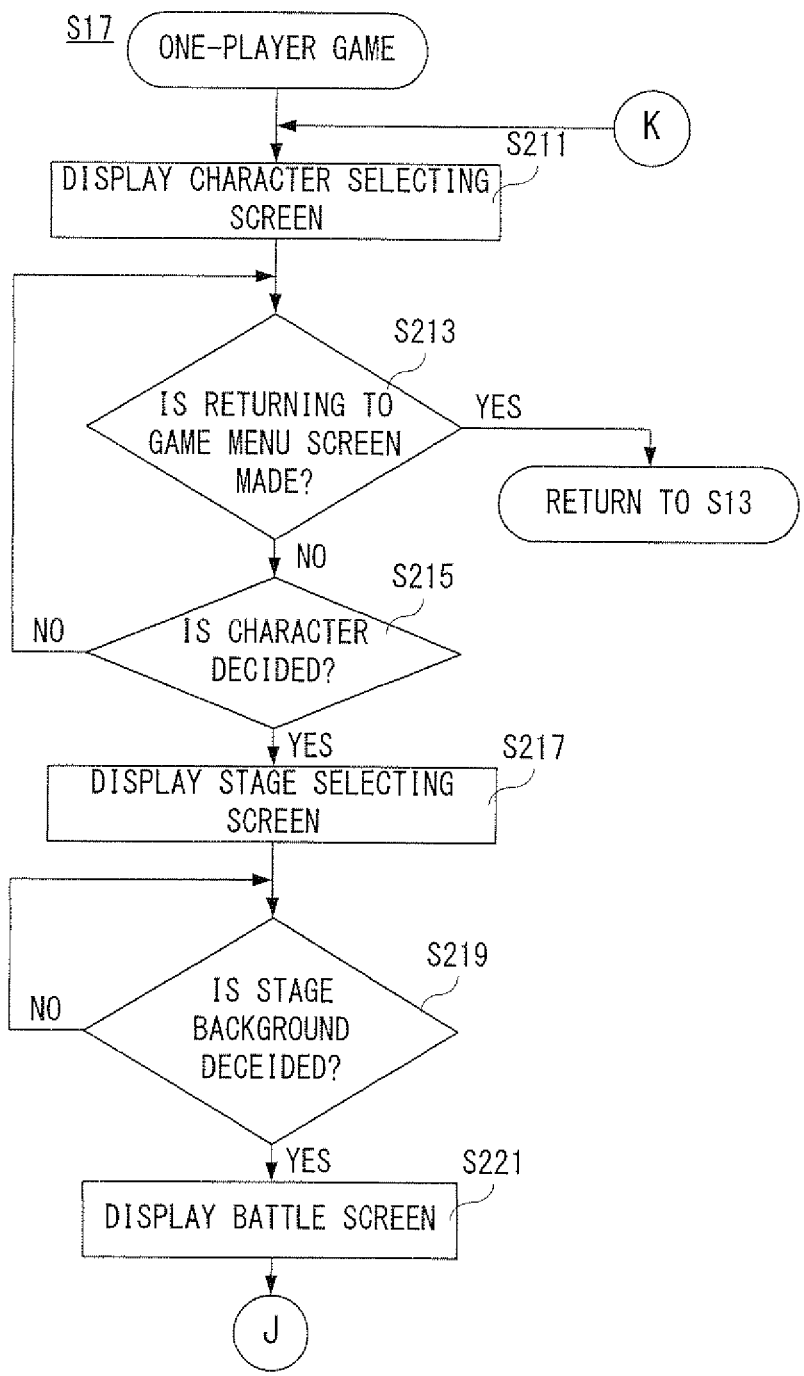
FIG. 34 is a flowchart showing a part of one-player game processing by the CPU shown in FIG. 3.
Figure 35:
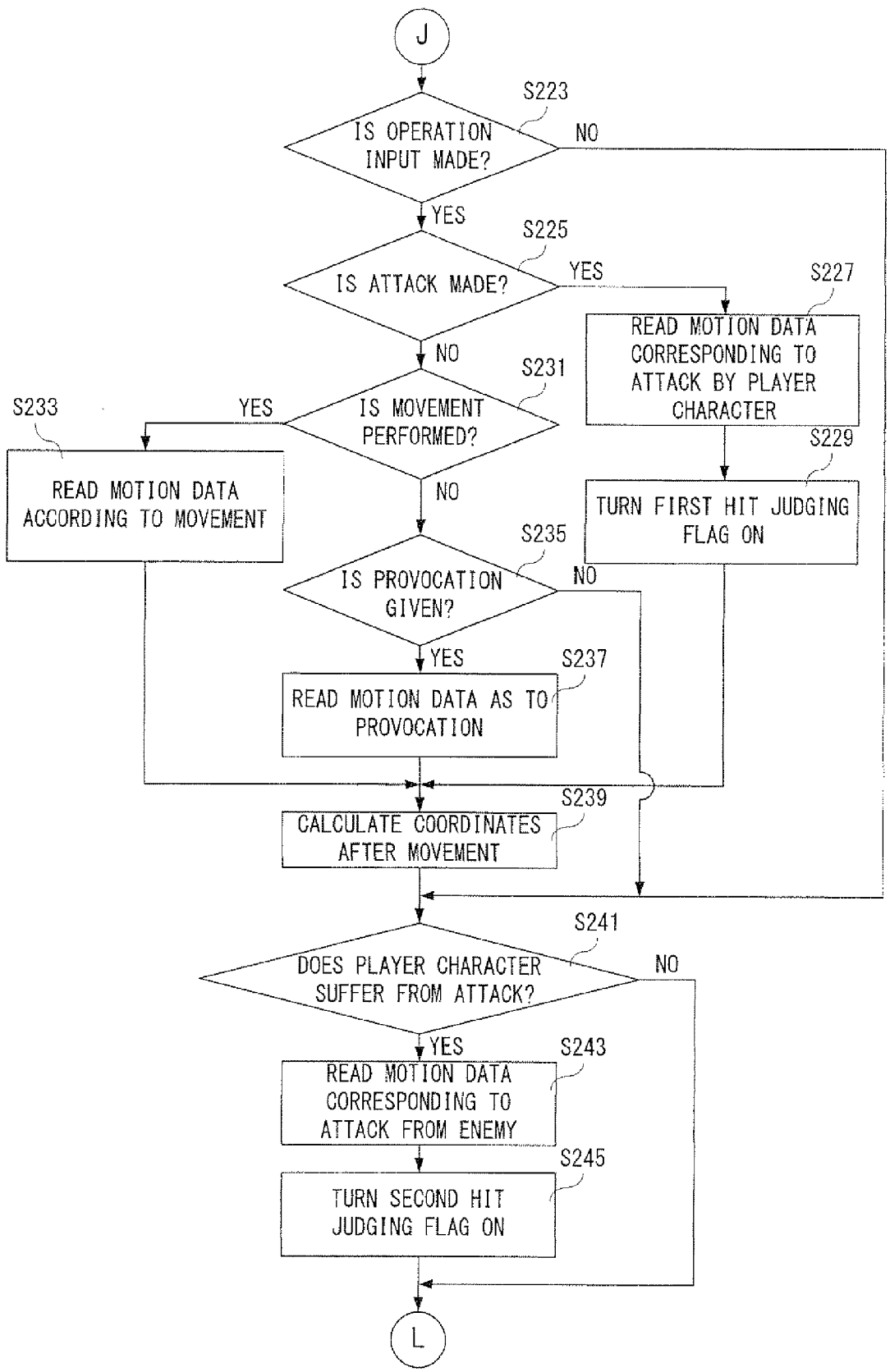
FIG. 35 is a flowchart showing a second part of the one-player game processing by the CPU shown in FIG. 3, and being sequel to FIG. 34.
Figure 36:
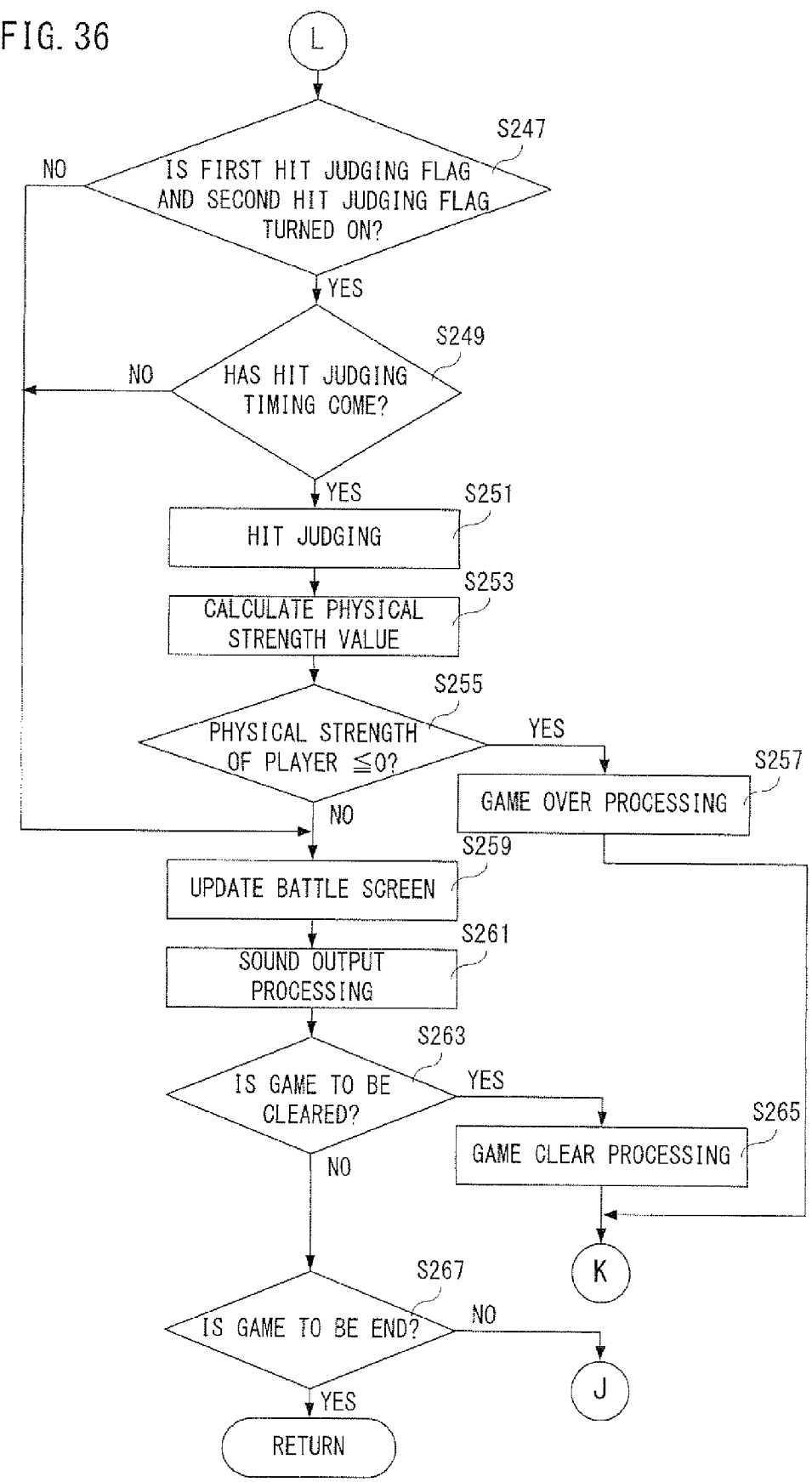
FIG. 36 is a flowchart showing a third part of the one-player game processing by the CPU shown in FIG. 3, and being sequel to FIG. 35.

FIG. 34-FIG. 36 is a flowchart of the one-player game processing in the step S17 shown in FIG. 27. As shown in FIG. 34, when starting the one-player game processing, the CPU 50 displays a character selecting screen 700 as shown in FIG. 16 on the first LCD 16 and the second LCD 18 in a step S211. In a succeeding step S213, it is determined whether or not the screen is to be returned to the game menu screen (not illustrated). That is, the CPU 50 determines whether or not the button image 704b is turned on.

If "YES" in the step S213, that is, if the button image 704b is turned on, it is determined that returning to the game menu screen is selected, the one-player game processing is ended, and the process returns to the entire processing in the step S13. On the other hand, if "NO" in the step S213, that is, if the button image 704b is not turned on, it is determined that the screen is not returned to the game menu screen, and it is determined whether or not the character to be used is decided in a step S215. That is, the CPU 50 determines whether or not the A button 20b is turned on, or whether or not the display area 704a where the reduced image is displayed is touched.

If "NO" in the step S215, that is, if the A button 20b is not turned on, or if no display area 704a is touched, it is determined that the player character is being selected, and the process returns to the step S213. Although illustration is omitted, as described above, on the character selecting screen 700, the cross key 20a is operated to move the cursor 7040 of the lower screen 704 on the display area 704a, to accordingly change the face image of the character displayed (referred to) on the display area 702a of the upper screen 702. Furthermore, in accordance therewith, the name and the title of the character to be displayed in the display area 702b are also changed. Here, the cursor 7040 can be moved only in the display area 704a where the reduced image is displayed.

On the other hand, if "YES" in the step S215, that is, if the A button 20b is turned on, or if the display area 704a where the reduced image is displayed is touched, it is determined that the character is decided, and a stage selecting screen 720 as shown in FIG. 17 is displayed on the first LCD 16 and the second LCD 18 in a step S217.

In a succeeding step S219, it is determined whether or not the stage background is decided. The CPU 50 here determines whether or not the A button 20b is turned on, or whether or not the display area 724a where the reduced image is displayed is touched. If "NO" in the step 219, that is, if the A button 20b is not turned on, and if the display area 724a where the reduced image is displayed is not touched, it is determined that the stage background is being selected, and the process returns to the same step S219.

Although illustration is omitted, as described above, on the stage selecting screen 720, the cross key 20a is operated to move the cursor 7240 on the lower screen 704 on the display area 724a, to thereby change the image of the stage background which is being displayed on the display area 722a of the upper screen 722. Here, the cursor 7240 can be moved only in the display area 724a where the reduced image is being displayed.

Although illustration is omitted, when the button image 724c is turned on on the stage selecting screen 720, processing of imaging a disposable stage background is executed, and the process proceeds to a step S221. In such a case, a battle screen by using the disposable stage image is displayed on the first LCD 16 in the step S221 described later.

Although illustration is omitted, when the button image 724b is turned on on the stage selecting screen 720, the screen returns to the character selecting screen 700.

On the other hand, if "YES" in the step S219, that is, if the A button 20b is turned on, or if the display area 724a where the reduced image is displayed is touched, it is determined that the stage background (background image) is decided, and a battle screen 740 as shown in FIG. 18 is displayed on the first LCD 16 and the second LCD 18 in the step S221. Thus, the battle game is started. Although detailed explanation is omitted, at this time, the stage background or disposable stage background selected (decided) on the stage selecting screen 720 is displayed at the rearmost of the first LCD 16. Furthermore, at the beginning of the battle screen 740 being displayed, the player character 742a and the enemy character 742b are displayed by using the fighting stance pose images. At this time, the player character 742a and the enemy character 742b are displayed so as to stand up at the position corresponding to the ground of the stage background.

As shown in FIG. 35, in a next step S223, it is determined whether or not an operation input is made. That is, it is determined whether or not the cross key 20a or the A button 20b is turned on, or whether or not the touch panel 22 is turned on (touched). More specifically, the CPU 50 determines whether or not operation data from the operation button 20 or touch position data from the touch panel 22 is input with reference to the operation data buffer 92a. If "NO" in the step S223, that is, if an operation input is not made, the process proceeds to a step S241 as it is. On the other hand, if "YES" in the step S223, that is, if an operation input is made, it is determined whether or not the player character 742a is caused to make an attack in a step S225. That is, the CPU 50 determines whether or not the A button 20b is turned on, or whether or not the button image 744b is turned on. Here, in a case that the player character 742a is caused to make an attack with a killer technique, the cross key 20a is also turned on as well as the A button 20b.

If "YES" in the step S225, that is, if the player character 742a is caused to make an attack, the motion data 92h corresponding to the attack by the player character 742a is read in a step S227, the first hit judging flag 92k is turned on in a step S229, and the process proceeds to a step S239. On the other hand, if "NO" in the step S225, that is, if the player character 742a is not caused to make an attack, it is determined whether or not the player character 742a is caused to move in a step S231. That is, the CPU 50 determines whether or not the cross key 20a is turned on.

If "YES" in the step S231, that is, if the player character 742a is caused to move, the motion data 92h corresponding to the movement of the player character 742a is read in a step S233, and the process proceeds to the step S239.

On the other hand, if "NO" in the step S231, that is, if the player character 742a is not caused to move, it is determined that the player character 742a is caused to give provocation in a step S235. That is, the CPU 50 determines whether or not the button image 744a is turned on. If "NO" in the step S235, that is, if the player character 742a is not caused to give provocation, it is determined that an operation input as to attack, movement, and provocation is not made, and the process proceeds to the step S241. On the other hand, if "YES" in the step S235, that is, if the player character 742a is caused to give provocation, the motion data 92h as to the provocation is read in a step S237, and the process proceeds to the step S239.

In the step S239, the coordinates after movement of the player character 742a which attacks, moves, or provokes are calculated. For example, the moved position of the player character 742a is decided (calculated) at a position advanced from the current position by a predetermined distance in the designated direction. Here, in this embodiment, if the downward is instructed, the player character 742a only sits, so that in such a case, the moved position is the current position. In a case of making an attacking or provocation, the moved position (coordinates) is calculated so as to be close to the enemy character 742b by the distance decided in advance.

In the step S241, it is determined whether or not the player character 742a suffers from an attack by the enemy character 742b. That is, the CPU 50 determines whether or not the enemy character 742b is instructed to make an attack on the player character 742a. If "NO" in the step S241, that is, if the player character 742a does not suffer from the enemy character 742b, the process proceeds to a step S247 shown in FIG. 36 as it is. On the other hand, if "YES" in the step S241, that is, if the player character 742a suffers from an attack from the enemy character 742b, the motion data 92h corresponding to the attack from the enemy character 742b is read in a step S243, the second hit judging flag 92m is turned on in a step S245, and the process proceeds to the step S247.

Although illustration is omitted, the CPU 50 may cause the enemy character 742b to move, make provocation, and so forth. In such a case, the motion data 92h as to the movement and provocation are read. Although illustration is omitted, the CPU 50 calculates the moved coordinates in a case that it causes the enemy character 742b to make an attack, move, and make provocation.

As shown in FIG. 36, in the step S247, it is determined whether or not at least one of the first hit judging flag 92k and the second hit judging flag 92m is turned on. If "NO" in the step S247, that is, if the first hit judging flag 92k and the second hit judging flag 92m are turned off, the process proceeds to a step S259. On the other hand, if "YES" in the step S247, that is, if at least one of the first hit judging flag 92k and the second hit judging flag 92m is turned on, it is determined whether or not a hit judging processing executing timing has come in a step S249. That is, the CPU 50 determines whether or not a timing when the punching or kicking pose images is displayed. As described above, the pose image is updated according to the motion data 92h, so that the hit judging processing is executed when an attack is actually made (the number of frames).

Here, in the one-player game processing, the scan time in the steps S223 to S267 is one frame. Furthermore, the number of frames from the start of the motion is counted by a frame counter not shown. The CPU 50 executes updating the pose image and outputting the voice and judges a hit judging timing with reference to the count value by the frame counter.

If "NO" in the step S249, that is, if the hit judging timing has not come, the process proceeds to the step S259 as it is. On the other hand, if "YES" in the step S249, that is, if the hit judging timing has come, the hit judging processing is executed in a step S251.

Here, if the first hit judging flag 92k is turned on, the hit judging area when the player character attacks that is described in correspondence with the timing (the number of frames) of the attack indicated by the motion data 92h which is read as to the player character 742a is set to the pose image of the player character 742a. Alternatively, the hit judging area when the enemy character is attacked in an attacked timing indicated by the motion data 92h read as to the enemy character 742b is set to the pose image of the enemy character 742b. Then, it is determined that whether or not these hit judging areas are in contact or overlapped with each other.

On the other hand, if the second hit judging flag 92m is turned on, the hit judging area when the enemy character attacks that is described in correspondence with the attacking timing (the number of frames) indicated by the motion data 92h read as to the enemy character 742b is set to the pose image of the enemy character 742b. Alternatively, the hit judging area when the player character is attacked in the attacked timing (the number of frames) indicated by the motion data 92h read as to the player character 742a is set to the pose image of the player character 742a. Then, it is determined whether or not these hit judging areas are in contact or overlapped with each other.

Here, if both of the first hit judging flag 92k and the second hit judging flag 92m are turned on, the hit judging of both parties is executed.

In a next step S253, the physical strength values of the player character 742a and the enemy character 742b are calculated. That is, if the player character 742a and the enemy character 742b suffer from an attack by each other, each of the physical strength value is subtracted. For example, the physical strength value to be subtracted is different from the kind of the technique.

In a succeeding step S255, it is determined whether or not the physical strength value of the player character 742a is equal to or less than 0. If "YES" in the step S255, that is, if the physical strength value of the player character 742a is equal to or less than 0, the game over processing is executed in a step S257, and then, the process returns to the step S211 shown in FIG. 34. Although detailed explanations are omitted, in a step S257, a message to say that the game is over is displayed, and a sound (sound effect) and music to indicate that the game is over are output.

On the other hand, if "NO" in the step S255, that is, if the physical strength value of the player character 742a is more than 0, the battle screen 740 is updated in the step S259. That is, the CPU 50 updates the pose images of the player character 742a and the enemy character 742b according to the motion data 92h previously read with reference to the frame counter, moves the player character 742a and the enemy character 742b to the calculated positions, or updates the display area 742d.

Although detailed explanations are omitted, when the motion data 92h is read once according to an operation input by the player, a next (new) operation input is ignored or hold until the processing according to the motion data 92h (image updating, sound outputting, hit judging) is entirely ended, that is, a series of processing is ended.

In a next step S261, sound output processing is executed. For example, in a case that the index number of the audio data is described in the motion data 92h in correspondence with the number of frames that is indicated by the updating timing of the battle screen 740, sound data corresponding to the voices of the player character 742a and the enemy character 742b are reproduced. Furthermore, sound data corresponding to a sound like a sound effect in the fighting scene can be reproduced.

Succeedingly, in a step S263, it is determined whether or not to be a game clear. The CPU 50, here, determines whether or not the player character 742a defeats the predetermined number of enemy characters 742b. If "YES" in the step S263, that is, if the game is to be cleared, game clearing processing is executed in a step S265, and the process returns to the step S211. Although detailed explanations are omitted, a message to say that the game is cleared is displayed, and a sound (sound effect) and music to indicate that the game is to be cleared are output in the step S265.

Alternatively, if "NO" in the step S263, that is, if the game is not to be cleared, it is determined whether or not to be a game end in a step S267. The CPU 50, here, determines whether or not a game end is instructed by the player (button image 744c is turned on). If "NO" in the step S267, that is, if the game is not to be ended, the process returns to the step S223 shown in FIG. 35. On the other hand, if "YES" in the step S267, that is, if the game is to be ended, the process returns to the entire processing.

FIG. 37-FIG. 41 is a flowchart showing the two-player game processing in the step S21 shown in FIG. 27. Although detailed explanation is made below, the content similar to that in the above-described one-player game processing is simply explained.

Figure 37:
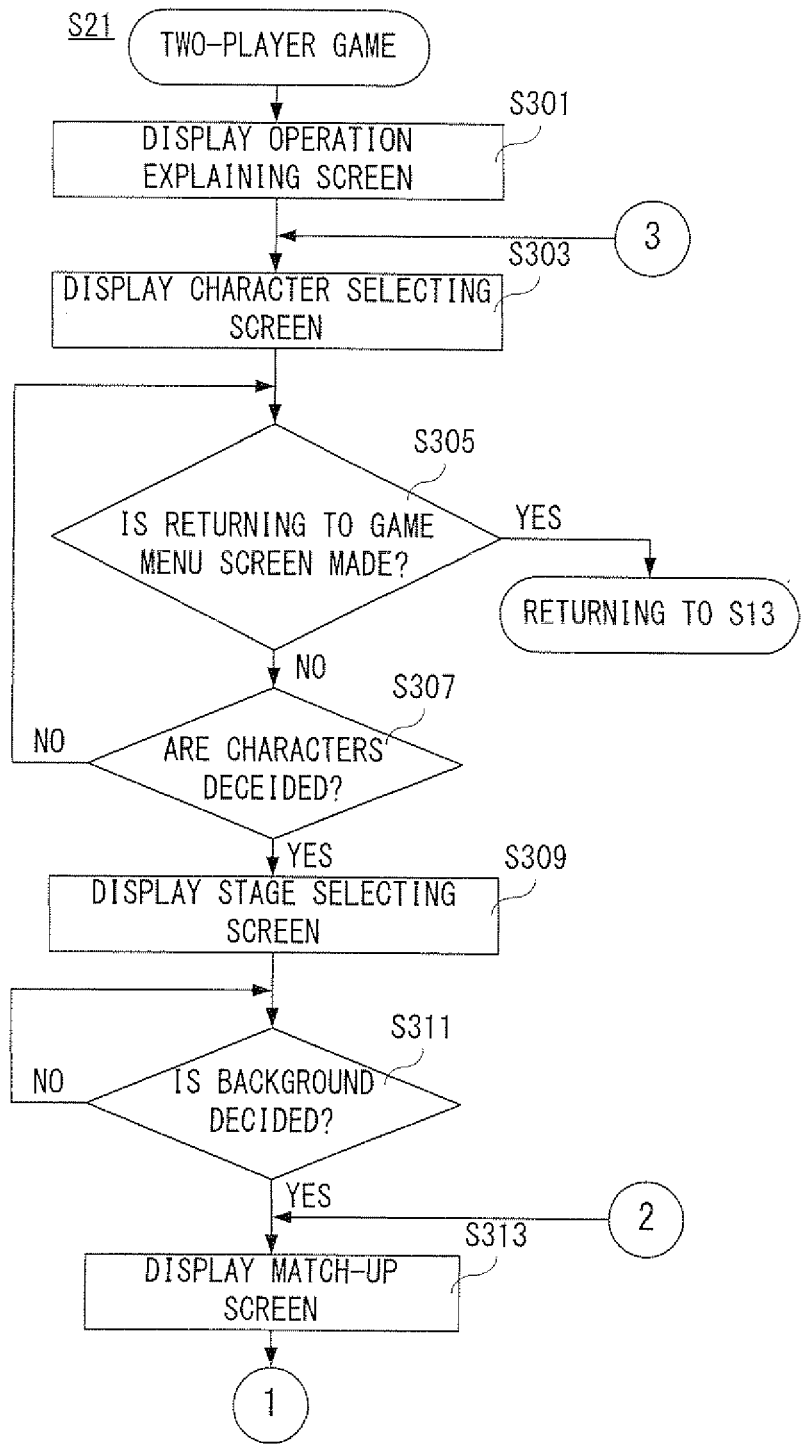
FIG. 37 is a flowchart showing a part of two-player game processing by the CPU shown in FIG. 3.

As shown in FIG. 37, when starting the two-player game processing, the CPU 50 displays the operation explaining screen 760 shown in FIG. 19 on the first LCD 16 and the second LCD 18 in a step S301. In a next step S303, a character selecting screen for two players (not illustrated) is displayed on the first LCD 16 and the second LCD 18.

Although illustration is omitted, in a case that the operation explaining screen 760 is displayed, when the A button 20b is turned on, or the area except for the area the button image 764c is displayed out of the lower screen 764 is touched, the character selecting screen is displayed. Here, when button image 764c is turned on on the operation explaining screen 760, the screen returns to the game menu screen (S13).

Returning to FIG. 37, in a next step S305, it is determined whether or not to return to the game menu screen. If "YES" in the step S305, that is, if the screen returns to the game menu screen, the two-player game processing is ended, and the process returns to the step S13 in the entire processing. On the other hand, if "NO" in the step S305, that is, if the screen does not return to the game menu screen, it is determined whether or not the characters are decided in a step S307. Here, the CPU 50 determines whether or not both of the 1P player character 802*a* and the 2P player character 802*b* are decided.

If "NO" in the step S307, that is, if the characters are not decided, the process returns to the step S305. On the other hand, if "YES" in the step S307, that is, if the characters are decided, a two player stage selecting screen (not illustrated) is displayed on the first LCD 16 and the second LCD 18 in a step S309. In a next step S311, it is determined whether or not the stage background is decided. If "NO" in the step S311, that is, if the stage background is not decided, the process returns to the same step S311. On the other hand, if "YES" in the step S311, that is, if the stage background is decided, a match-up screen 800 as shown in FIG. 20 is displayed on the first LCD 16 and the second LCD 18 in a step S313. Accordingly, the match-up game is started. Here, at the beginning of the match-up screen 800 being displayed, the 1P player character 802*a* and the 2P player character 802*b* are displayed by using the fighting stance pose images.

Figure 38:
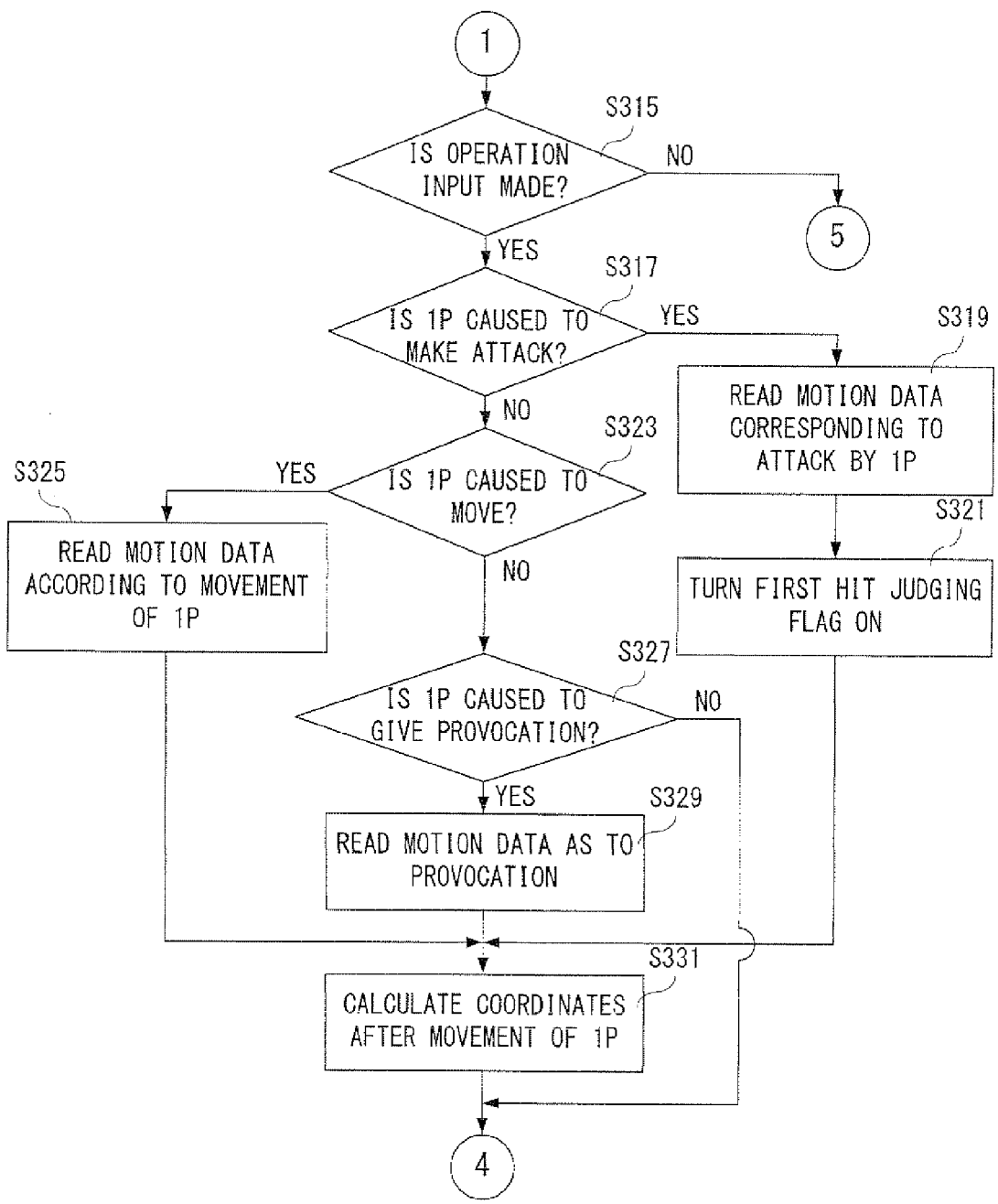
FIG. 38 is a flowchart showing a second part of the two-player game processing by the CPU shown in FIG. 3, and being sequel to FIG. 37.

As shown in FIG. 38, in a next step S315, it is determined whether or not an operation input is made. If "NO" in the step S315, that is, if an operation input is not made, the process proceeds to a step S367 in FIG. 40. On the other hand, if "YES" in the step S315, that is, if an operation input is made, it is determined whether or not the 1P player character 802*a* is caused to make an attack in a step S317. That is, the CPU 50 determines whether or not the L button 20*i* is turned on, or whether or not the button image 804*b* is turned on. Here, in a case that the 1P player character 802*a* is caused to make an attack with a killer technique, the cross key 20*a* is turned on in addition to the L button 20*i*.

If "YES" in the step S317, that is, if the 1P player character 802*a* is caused to make an attack, the motion data 92*h* corresponding to the attack by the 1P player character 802*a* is read in a step S319, the first hit judging flag 92*k* is turned on in a step S321, and the process proceeds to a step S331. On the other hand, if "NO" in the step S317, that is, if the 1P player character 802*a* is not caused to make an attack, it is determined whether or not the 1P player character 802*a* is caused to move in a step S323. That is, the CPU 50 determines whether or not the cross key 20*a* is turned on.

If "YES" in the step S323, that is, if the 1P player character 802*a* is caused to move, the motion data 92*h* according to the movement of the 1P player character 802*a* is read in a step S325, and the process proceeds to the step S331. On the other hand, if "NO" in the step S323, that is, if the 1P player character 802*a* is not caused to move, it is determined whether or not the 1P player character 802*a* is caused to give provocation in a step S327. That is, the CPU 50 determines whether or not the button image 804*a* is turned on.

If "YES" in the step S327, that is, if the 1P player character 802*a* is caused to give provocation, the motion data 92*h* for provocation as to the 1P player character 802*a* is read in a step S329, and the process proceeds to the step S331. In the step S331, the coordinates (world coordinates) after movement of the 1P is calculated, and the process proceeds to a step S333 shown in FIG. 39. On the other hand, if "NO" in the step S327, that is, if the 1P player character 802*a* is not caused to make provocation, the process proceeds to the step S333 as it is.

Figure 39:
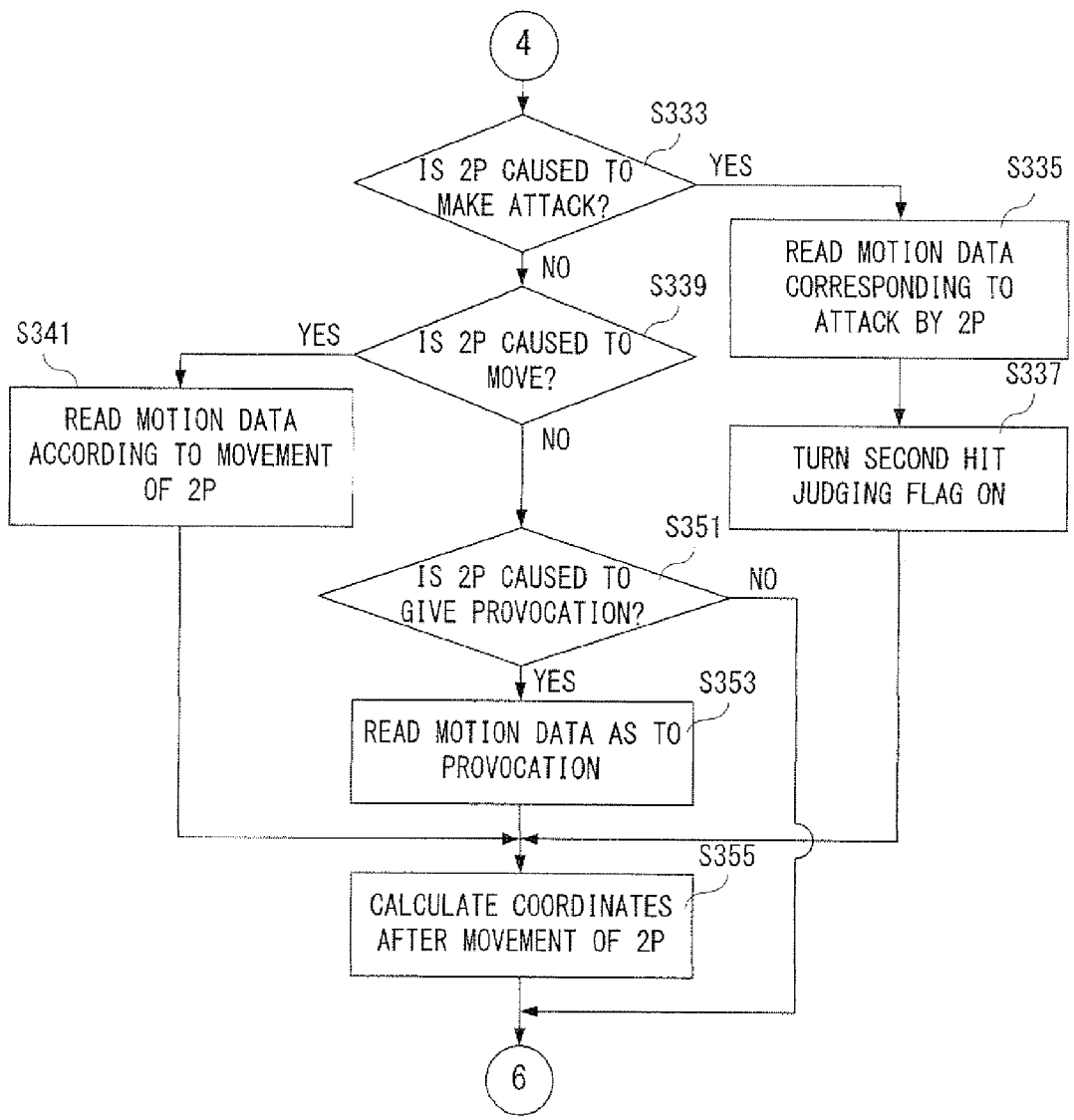
FIG. 39 is a flowchart showing a third part of the two-player game processing by the CPU shown in FIG. 3, and being sequel to FIG. 38.

As shown in FIG. 39, in the step S333, it is determined whether or not the 2P player character 802*b* is caused to make an attack. That is, the CPU 50 determines whether or not the R button 20*j* is turned on, or whether or not the button image 804*d* is turned on. Here, in a case of making an attack with the killer technique, the A button 20*b*, the B button 20*c*, the X button 20*d* or the Y button 20*e* is turned on in addition to the R button 20*j*.

If "YES" in the step S333, that is, if the 2P player character 802*b* is caused to make an attack, the motion data 92*h* corresponding to the attack by the 2P player character 802*b* is read in a step S335, the second hit judging flag 92*m* is turned on in a step S337, and the process proceeds to the step S335. On the other hand, if "NO" in the step S333, that is, if the 2P player character 802*b* is not caused to make an attack, it is determined whether or not the 2P player character 802*b* is caused to move in a step S339. That is, the CPU 50 determines whether or not the A button 20*b*, the B button 20*c*, the X button 20*d* or the Y button 20*e* is turned on.

If "YES" in the step S339, that is, if the 2P player character 802*b* is caused to move, the motion data 92*h* according to the movement of the 2P player character 802*b* is read in a step S341, and the process proceeds to a step S355. On the other hand, if "NO" in the step S339, that is, if the 2P player character 802*b* is not caused to move, it is determined whether or not the 2P player character 802*b* is caused to make provocation in a step S351. That is, the CPU 50 determines whether or not the button image 804*c* is turned on.

If "YES" in the step S351, that is, if the 2P player character 802*b* is caused to make provocation, the motion data 92*h* for the provocation as to the 2P player character 802*b* is read in a step S353, and the process proceeds to the step S355. In the step S355, the coordinates (world coordinates) after movement of the 2P player character 802*b* are calculated, and the process proceeds to a step S357 shown in FIG. 40. On the other hand, if "NO" in the step S351, that is, if the 2P player character 802*b* is not caused to make provocation, the process proceeds to the step S357 as it is.

Figure 40:
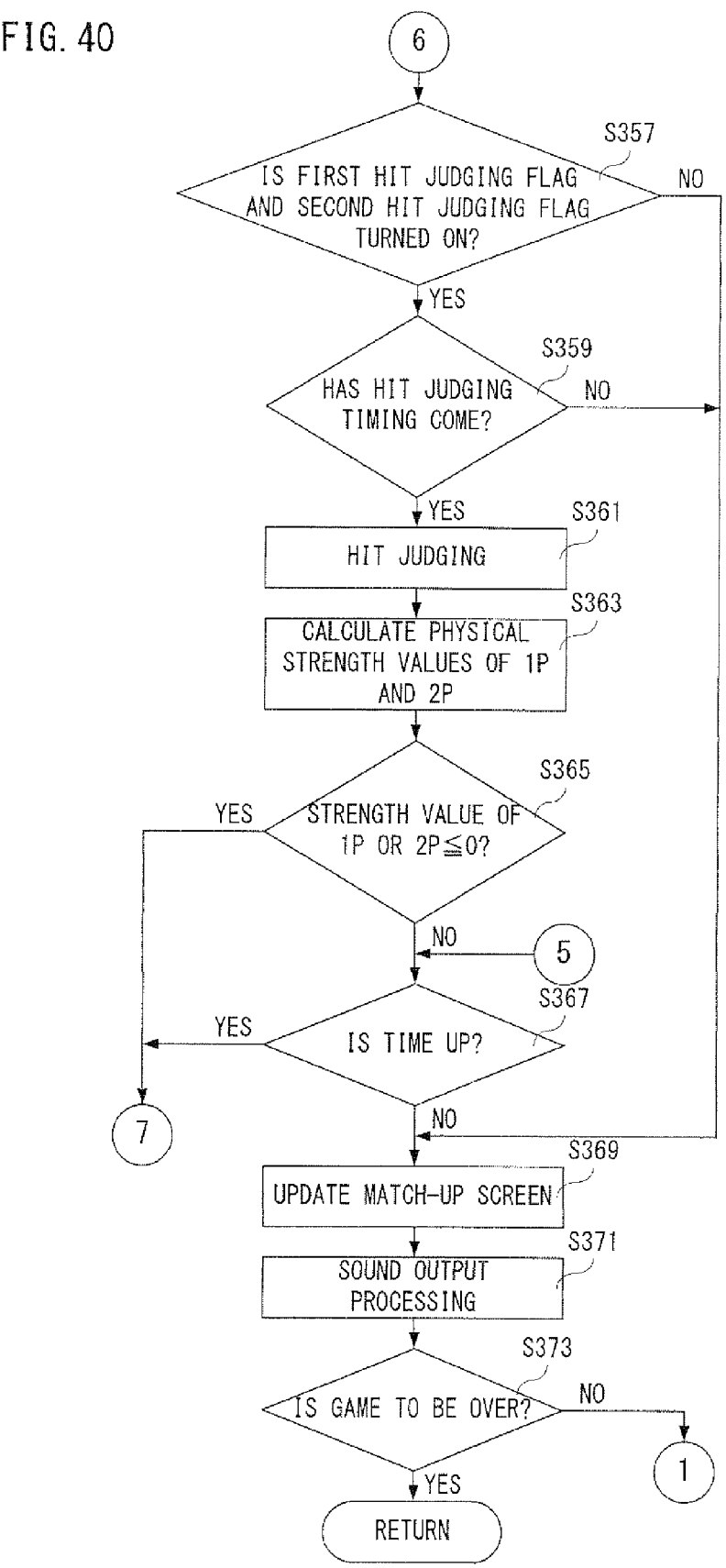
FIG. 40 is a flowchart showing a fourth part of the two-player game processing by the CPU shown in FIG. 3, and being sequel to FIG. 39.

In the step S357 shown in FIG. 40, it is determined whether or not at least one of the first hit judging flag 92*k* and the second hit judging flag 92*m* is turned on. If "NO" in the step S357, that is, if the first hit judging flag 92*k* and the second hit judging flag 92*m* are turned off, the process proceeds to a step S369 as it is. On the other hand, if "YES" in the step S357, that is, if at least one of the first hit judging flag 92*k* and the second hit judging flag 92*m* is turned on, it is determined whether the hit judging timing has come in a step S359.

If "NO" in the step S359, that is, if the hit judging timing has not come, the process proceeds to the step S369 as it is. On the other hand, if "YES" in the step S359, that is, if the hit judging timing has come, the hit judging is made in a step S361, and the physical strength values of the 1P player character 802*a* and the 2P player character 802*b* are calculated in a step S363.

In a next step S365, it is determined whether or not the physical strength value of the 1P player character 802*a* or the physical strength value of the 2P player character 802*b* is equal to or less than 0. If "YES" in the step S365, that is, if the physical strength value of the 1P player character 802*a* or the physical strength value of the 2P player character 802*b* is equal to or less than 0, the process proceeds to a step S375 in FIG. 41. On the other hand, if "NO" in the step S365, that is, if the physical strength value of the 1P player character 802*a* or the physical strength value of the 2P player character 802*b* is more than 0, it is determined whether or not the time is up in the step S367. That is, the CPU 50 determines whether or not a certain period of time elapses from the start of the match-up game.

If "YES" in the step S367, that is, if the time is up, the process proceeds to the step S375. On the other hand, if "NO" in the step S367, that is, if the time is not up, the match-up screen 800 is updated in the step S369. The CPU 50 updates the pose images of the player characters 802a, 802b according to the motion data 92h, moves the player characters 802a, 802b to the calculated position, and updates the display areas 802c-802e. In a next step S371, the sound output processing is executed. Accordingly, when the match-up screen 800 is updated, the audio data of the player characters 802a, 802b are reproduced according to the motion data 92h, the sound data of the sound effect, etc. is reproduced, and so forth.

Succeedingly, in a step S373, it is determined whether or not the game is to be ended. That is, the CPU 50 determines whether or not the button image 804e is turned on. If "NO" in the step S373, that is, if the game is not to be ended, the process returns to a step S315 shown in FIG. 38. On the other hand, if "YES" in the step S373, that is, if the game is to be ended, the process returns to the entire processing. It should be noted that in the two-player game processing, the scan time in steps S315 to S373 is one frame. Furthermore, the point that the number of frames from the start of the motion of the player characters 802a, 802b is counted by the frame counter is the same as that in the one-player game processing.

Figure 41:
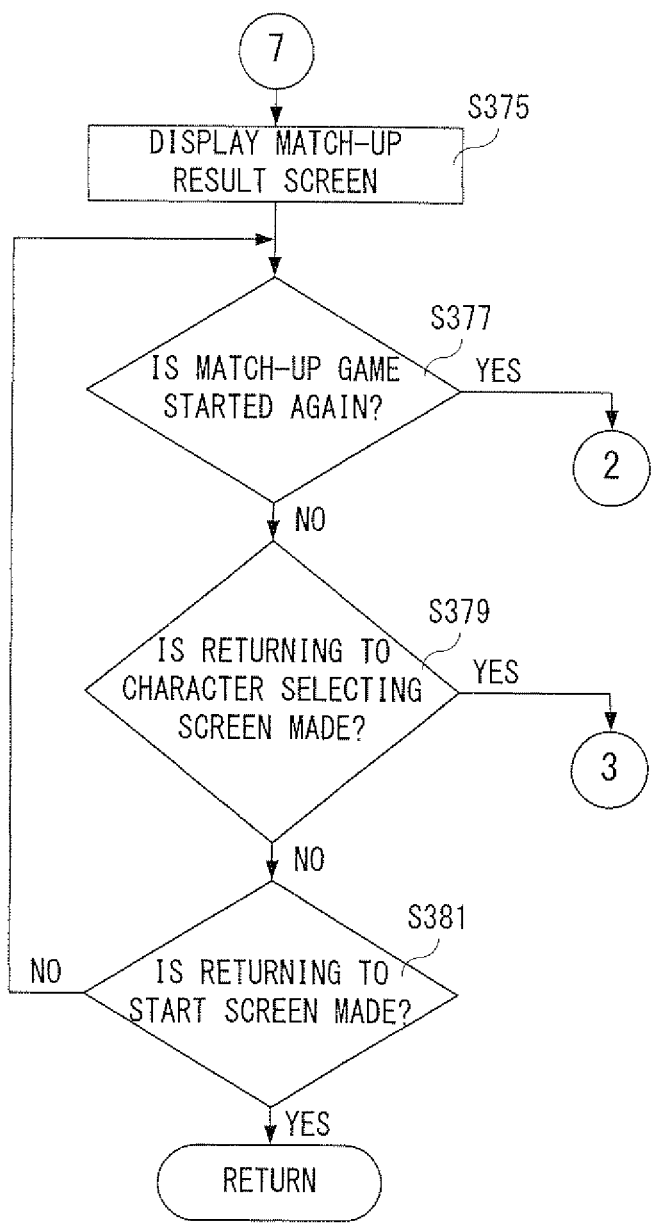
FIG. 41 is a flowchart showing a fifth part of the two-player game processing by the CPU shown in FIG. 3, and being sequel to FIG. 40.

In the step S375 shown in FIG. 41, a match-up result screen (not illustrated) is displayed on the first LCD 16 and the second LCD 18. In a next step S377, it is determined whether or not the match-up game is started again. If "YES" in the step S377, that is, if the match-up game is started again, the process returns to the step S313 shown in FIG. 37. On the other hand, if "NO" in the step S377, that is, if the match-up game is not started again, it is determined whether or not to return to the character selecting screen (not illustrated) in a step S379.

If "YES" in the step S379, that is, if the screen returns to the character selecting screen, the process returns to the step S303 shown in FIG. 37. On the other hand, if "NO" in the step S379, that is, if the process does not return to the character selecting screen, it is determined whether or not to return to the start screen in a step S381.

If "NO" in the step S381, that is, if the screen does not return to the start screen, the process returns to the step S377. On the other hand, if "YES" in the step S381, that is, if the screen returns to the start screen, the process returns to the entire processing as it is.

According to this embodiment, by using the images in various poses imaged by the player, in the battle game and in the match-up game like a fighting game, the image imaged according to the operation by the player is displayed, so that it is possible to offer a wide range of variations in the display content and display timing of the subject image obtained by imaging. Accordingly, it is possible to increase interest of the game.

Additionally, in this embodiment, the voices recorded by the player as well as the images imaged by the player are used, but the voices recorded or created in advance may be used. Furthermore, only the stage background which is created by a developer, etc. in advance may be used.

In addition, in the above-described embodiment, the guide image for imaging is made up of the mask image colored with predetermined color other than the cut-out portion, but there is no need of being restricted thereto. For example, as to the mask image, the shape of the punching pose need not be formed by one cut-out portion, and mask images representing the position of the head and the position of the hands, and the position of the legs may be used as shown in FIG. 42(A). In such a case, it is possible to create the cut-out portion by the graphics being made up of one or more simple drawings such as circles, quadrangles, triangles. In addition, without illustrating the shape of the punching pose, a guide image for imaging which describes a message to say that the punching pose is to be imaged may be displayed as shown in FIG. 42(B). Although illustration is omitted, in the guide image 202a shown in FIG. 5(A), a mere line drawing of a shape of a pose or a mere illustration taking a shape of pose may be displayed without providing the cut-out portion 2020.

In addition, the configurations of the game apparatus need not to be restricted to this embodiment. For example, one display (LCD) and one camera may be appropriate. Furthermore, touch panels may be provided on the two LCDs.

Although the present embodiments have been described and illustrated in detail, it is clearly understood that the same is by way of illustration and example only and is not to be taken by way of limitation, the spirit and scope of the present embodiments being limited only by the terms of the appended claims.

What is claimed is:

1. A non-transitory storage medium storing a game program to cause a computer of a hand-held game apparatus to at least perform:
    imaging, via a camera of the hand-held game apparatus, a subject corresponding to each of a plurality of postures;
    selecting at least one image out of said plurality of subject images on the basis of operation information according to an operation by a user;
    displaying the selected subject image on a display,
    selecting one motion from a plurality of motions on the basis of the operation information according to the operation by the user, and
    selecting the image corresponding to the selected motion out of said plurality of subject images.

2. The non-transitory storage medium storing a game program according to claim 1, wherein said game program causes said computer to further perform:
    predetermined game processing, and
    selecting at least one image out of said plurality of subject images on the basis of the operation information according to the operation by the user during execution of said predetermined game.

3. The non-transitory storage medium storing a game program according to claim 1, wherein
    said imaging images said plurality of postures for each person of said plurality of subjects, and
    said image selecting selects one subject person from persons of said plurality of subjects, and selects at least one image from the subject images in correspondence with said plurality of imaged postures as the one selected subject.

4. The non-transitory storage medium storing a game program according to claim 1, wherein
    said game program causes said computer to further perform notifying the user of an instruction corresponding to each of said plurality of postures when said imaging images said subject.

5. The non-transitory storage medium storing a game program according to claim 4, wherein
    said notifying displays a guide image corresponding to each of said plurality of postures on said display.

6. The non-transitory storage medium storing a game program according to claim 5, wherein
    said guide image includes a mask image which transmits a part corresponding to each of said plurality of postures, and
    said game program causes said computer to further perform through image displaying which displays a through image of the imaged subject at the back of said mask image on said display.

7. The non-transitory storage medium storing a game program according to claim 4, wherein said game program causes said computer to further display the imaged subject on said display.

8. The non-transitory storage medium storing a game program according to claim 1, wherein
said game program causes said computer to further perform:
storing a voice corresponding to each of said plurality of postures, and
when the selected image of said subject is displayed on said display, reading the stored voice corresponding to the posture indicated by said image and outputting the same.

9. The non-transitory storage medium storing a game program according to claim 8, wherein
said game program causes said computer to further perform:
inputting the voice corresponding to each of said plurality of postures by using a microphone, and
storing the voice input.

10. The non-transitory storage medium storing a game program according to claim 1, wherein
said game program causes said computer to further perform:
imaging a background representing a background image to be displayed on said display together with the image of said object when the image of said subject is displayed on said display, and
displaying an index as to a reference position for displaying the image of said subject on said display when the background is imaged.

11. The non-transitory storage medium storing a game program according to claim 1, wherein
said hand-held game apparatus comprises a hit judging area storage which stores a hit judging area set to each subject images in advance in correspondence with each of said plurality of postures, and
said game program causes said computer to further perform hit judging processing by utilizing the hit judging area set to the posture corresponding to the one selected image on the basis of the operation information in correspondence with the operation by at least said user.

12. The non-transitory storage medium storing a game program according to claim 11, wherein
said hit judging area includes a first judging area in a case that a hit judging is made on the basis of the operation information according to the operation by said user and a second judging area in a case that a hit judging is made on the basis of the operation information according to an operation by a user different from said user or an operation by said computer.

13. The non-transitory storage medium storing a game program according to claim 11, wherein
said hit judging area is changed in at least one of a position, a shape and a size depending on a display manner of said image.

14. The non-transitory storage medium storing a game program according to claim 1, wherein
said game program said computer to further perform:
executing a one-player game or a two-player game according to a selection by a user, and
changing a content of an instruction to be input between said one-player game and said two-player game.

15. The non-transitory storage medium storing a game program according to claim 1, wherein
the imaged subject is a portrait image, and
said game program causes said computer to further perform image processing for displaying said portrait image on said display.

16. The non-transitory storage medium storing a game program according to claim 15, wherein
said game program causes said computer to perform displaying a through image of said imaged subject on said display.

17. A hand-held game apparatus comprising:
an imager which images a subject corresponding to each of a plurality of postures;
an image selector which selects at least one image out of said plurality of subject images imaged by said imager, via a camera of the hand-held game apparatus, on the basis of operation information according to an operation by a user; and
a selected image displayer which displays the subject image selected by said image selector on a display, wherein
the image selector selects one motion from a plurality of motions on the basis of the operation information according to the operation by the user, and selects the image corresponding to the selected motion out of said plurality of subject images.

18. A game controlling method comprising:
(a) imaging, via a camera of a hand-held game apparatus, a subject corresponding to each of a plurality of postures,
(b) selecting at least one image out of said plurality of subject images created in (a) on the basis of operation information according to an operation by a user,
(c) displaying the subject image selected in (b) on a display;
(d) selecting one motion from a plurality of motions on the basis of the operation information according to the operation by the user, and
(e) selecting the image corresponding to the selected motion out of said plurality of subject images.

19. A hand-held game system comprising:
an imager which images a subject corresponding to each of a plurality of postures;
an image selector which selects at least one image out of said plurality of subject images imaged by said imager, via a camera of the hand-held game system, on the basis of operation information according to an operation by a user; and
a selected image displayer which displays the subject image selected by said image selector on a display, wherein
the image selector selects one motion from a plurality of motions on the basis of the operation information according to the operation by the user, and selects the image corresponding to the selected motion out of said plurality of subject images.

* * * * *